US012050000B1

(12) United States Patent
Dahan

(10) Patent No.: US 12,050,000 B1
(45) Date of Patent: Jul. 30, 2024

(54) LIGHT WITH ADJUSTABLE TAIL FOR ARTICLES

(71) Applicant: Giyora Dahan, Tarzana, CA (US)

(72) Inventor: Giyora Dahan, Tarzana, CA (US)

( * ) Notice: Subject to any disclaimer, the term of this patent is extended or adjusted under 35 U.S.C. 154(b) by 0 days.

(21) Appl. No.: 18/383,336

(22) Filed: Oct. 24, 2023

(51) Int. Cl.
*F21V 21/32* (2006.01)
*F21V 21/08* (2006.01)

(52) U.S. Cl.
CPC .............. *F21V 21/32* (2013.01); *F21V 21/08* (2013.01)

(58) Field of Classification Search
CPC ................................. F21V 21/32; F21V 21/08
USPC ................................. 362/190, 191, 418, 430
See application file for complete search history.

(56) References Cited

U.S. PATENT DOCUMENTS

| | | | | | |
|---|---|---|---|---|---|
| 5,385,500 | A * | 1/1995 | Schmidt | F21V 21/32 | 446/485 |
| 8,646,156 | B2 | 2/2014 | Brightman | | |
| D728,351 | S | 5/2015 | Martinson | | |
| 9,295,314 | B2 * | 3/2016 | McClees | A45C 1/024 | |
| D774,879 | S | 12/2016 | Martinson | | |
| D781,687 | S | 3/2017 | Martinson | | |
| 2002/0118535 | A1 * | 8/2002 | Nostrant | A63H 3/006 | 362/124 |
| 2003/0035285 | A1 * | 2/2003 | Huang | F21V 21/0885 | 362/396 |
| 2017/0130942 | A1 * | 5/2017 | Lafleur | F21V 21/32 | |

OTHER PUBLICATIONS

Jameson Multi-Flex Yellow Jacket Splinter Shield Coated Fish Rod Kit, sold at Amazon.com, last visited on Jul. 31, 2023.
Steelman 11-Inch Mini Automotive Bend-A-Light Pro, 6-inch Flexible Gooseneck, sold at Amazon.com, last visited on Jul. 31, 2023.
Glocusent LED Neck Reading Light, sold at Amazon.com, last visited on Jul. 31, 2023.
NextLED NT-7647 20-Inch Goosneck Flashlight Cree LED with Magnetic Base, sold at Amazon.com, last visited on Jul. 31, 2023.
Lamomo White Led Strip Lights, sold at Amazon.com, last visited on Jul. 31, 2023.
Bucice 3W UV Nail Lamp, Hands Free Gel LED Dryer Polish Curing Lamps Rotated with Fixed Clip for Nails, sold at Amazon.com, last visited on Jul. 31, 2023.

(Continued)

*Primary Examiner* — Laura K Tso
(74) *Attorney, Agent, or Firm* — Eric Kelly

(57) ABSTRACT

A light assembly has a light-module portion and an attached tail portion. The tail is flexible, elongate, and self-supporting such that the tail may be configured to be repeatably bent into various shapes, such as, but not limited to, spirals. By bending the tail, the tail may be removably attached to various articles, such as, but not limited to, various hand-held tools and/or implements. Thus, any such articles without preexisting lights may be simply modified to include a light source. The tail may be at least mostly covered in a soft and comfortable protective sheathing. The entire light assembly may be readily portable (mobile) with the light-module being battery powered and with the light assembly having an overall length often being from twenty-four (24) inches to eight (8) inches. The light assembly may be small, compact, and lightweight.

22 Claims, 44 Drawing Sheets

(56) References Cited

OTHER PUBLICATIONS

Customized Bendable Book Light, from 4allpromos.com, SKU 313-2010, last visited on Aug. 11, 2023.
Bearcom red handle flashlight, from 4allpromos.com, SKU 313-2010, last visited on Aug. 11, 2023.
Blue handle flex light with magnet, from 4allpromos.com, SKU 313-2010, last visited on Aug. 11, 2023.
5.0MP Borescope, DEPSTECH 5" IPS Screen Inspection Camera, Waterproof Dual Lens Endoscope Camera with Light, 10FT Flexible Gooseneck Camera for Automotive, HVAC Ducts, sold from Amazon.com, last visited on Jul. 31, 2023.
Endoscope Camera with Light, 1920P Hd Borescope with 8 Adjustable LED Lights, Endoscope with 16.4ft Semi-Rigid Snake Cable, 7.9mm IP67 Waterproof Inspection Camera for iPhone, iPad, sold from Amazon.com, last visited on Jul. 31, 2023.

* cited by examiner

LIGHT WITH ADJUSTABLE TAIL FOR ARTICLES

TECHNICAL FIELD OF THE INVENTION

The present invention relates in general to portable (mobile) light sources and more specifically to portable (mobile) light sources that have adjustable and self-supporting tails that are configured to removably attach to various physical articles.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Often various articles are without a light source. Often various articles do not include a light source or do not have an integral light source. For example, often many articles, such as, but not limited to, at least some hand tools, marking implements, pencils, pens, markers, brushes, makeup brushes, nail clippers, nail polish containers (including their lids), eyelash curlers, spray bottles, cutting implements, scissors, shears, pliers, screwdrivers, chisels, wrenches, saws, power tools, drills, eyeglasses, sunglasses, hats, portions thereof, combinations thereof, and/or the like, may be without light sources. Often use of such articles, without light sources, are used in suboptimal lighting conditions where it may be beneficial and/or desirable if such articles had attached light sources.

But many preexisting (prior art) light devices, light apparatus, light assemblies, flashlights (torches), headlamps, lamps, and/or the like are not configured to be removably attached to such articles. Often such preexisting (prior art) light devices, light apparatus, light assemblies, flashlights (torches), headlamps, lamps, and/or the like: do not have attachment means for removable attachment to the given article; are too heavy for removable attachment to the given article; are too bulky for removable attachment to the given article; are not portable (mobile) to be removably attached to the given article; need wired electricity supplied from a building structure receptable; are not battery powered; have undesirable attachment means (such as, but not limited to, having attachment means of moving parts, being too weak, being too strong, being permanent instead of removable, and/or the like); portions thereof; combinations thereof; and/or the like.

It would be desirable if a new type of light assembly was developed that overcame one or more of these weaknesses and/or problems of the preexisting (prior art) light devices, light apparatus, light assemblies, flashlights (torches), headlamps, lamps, and/or the like.

There is a need in the art for a new light assembly (light-with-adjustable-tail-for-articles) that may be: portable (mobile); small; compact; lightweight; comfortable to use; comfortable to wear; battery powered; having an attachment means that facilitates removable attachment with a wide variety of handheld articles, (implements and/or tools) and/or at least some types of clothing, apparel, garments, headwear, and/or footwear; wherein these characteristics of such a new light assembly may be relative (comparable) to the prior art and/or the article; portions thereof; combinations thereof; and/or the like.

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention describe "lights-with-adjustable-tail-for-articles," also referred to herein as "light assemblies."

In some embodiments, a given light assembly (light-with-adjustable-tail-for-articles) may comprise: a light-module portion, an attached tail portion, and a sheathing (covering). In some embodiments, the tail may be referred to herein as a "self-supporting-elongate-member." In some embodiments, the self-supporting-elongate-member may be flexible, elongate, and self-supporting such that the self-supporting-elongate-member (tail) may be configured to be repeatably bent into various shapes, such as, but not limited to, spirals (helixes). In some embodiments, by a person, using their hands, bending the self-supporting-elongate-member (tail), the self-supporting-elongate-member (tail) may be removably attached to various articles, such as, but not limited to, various hand-held tools and/or implements. Thus, any such articles without preexisting lights, may be simply modified to include a light source, namely the light assembly as shown and described herein, by attaching the self-supporting-elongate-member of the light assembly to the given article. In some embodiments, the self-supporting-elongate-member (tail) may be at least mostly covered in a soft and comfortable protective sheathing (covering). In some embodiments, at least a portion of the light-module may also be covered in this sheathing. In some embodiments, the entire light assembly may be readily portable (mobile) with the light-module being battery powered and with the light assembly having an overall (non-variable) length often being from twenty-four (24) inches to eight (8) inches. In some embodiments, the light assembly may be small, compact, and/or lightweight.

In some embodiments, the article that may removably receive attachment of a given light assembly may be selected from: a hand tool, a marking implement, a pencil, a pen, a marker, a nail clipper, a lid of a nail polish container, an eyelash curler, a spray bottle, a cutting implement, scissors, shears, pliers, a screwdriver, a chisel, a wrench, a saw, a power tool, a drill, eyeglasses, sunglasses, a hat, animal tack, animal collar, animal harness, a bicycle, a scooter, a door handle, a door knob, a door lever, a hand-held-mirror, a makeup compact case, a wallet, a portion thereof, combinations thereof, and/or the like. Such articles have some structure, geometry, elongate-portion, handle, hole, and/or the like that is shaped, sized, and/or dimensioned to receive the removable attachment of the self-supporting-elongate-member (tail) (which may be bent to facilitate the removable attachment to the given article). For example, and without limiting the scope of the present invention, having at least a portion of the self-supporting-elongate-member (tail) being bent into a spiral (helix) shape around some structure, geometry, elongate-portion, handle, hole, and/or the like of the given article often facilitates such removable attachment to the given article. In this manner, this light assembly may be used to shine light onto target regions (areas) that may traditionally lack sufficient lighting. In some embodiments, this target regions (areas) where lighting is desired may vary from about twelve-by-twelve inches to one-by-one millimeter (mm) that may receive light from this light assembly.

It is an objective of the present invention to provide a portable (mobile), small, compact, and/or lightweight light assembly that may be removably attached to a wide variety of different handheld articles, tools, and/or implements.

It is another objective of the present invention to provide a portable (mobile), small, compact, and/or lightweight light assembly that may be removably attached to some types of clothing, apparel, garments, headwear, and/or footwear.

It is another objective of the present invention to provide a light assembly that may comprise a flexible, elongate, and self-supporting tail (self-supporting-elongate-member) portion.

It is another objective of the present invention to provide a light assembly that may comprise a flexible, elongate, and self-supporting tail (self-supporting-elongate-member) portion that is configured for removable attachment to a wide variety of different handheld articles, tools, and/or implements.

It is another objective of the present invention to provide a light assembly that may comprise a flexible, elongate, and self-supporting tail (self-supporting-elongate-member) portion that is configured for removable attachment to some types of apparel, garments, headwear, and/or footwear.

It is another objective of the present invention to provide a light assembly that may comprise a sheathing (cover) that may be configured to at least mostly cover over the flexible, elongate, and self-supporting tail (self-supporting-elongate-member) of the light assembly.

It is another objective of the present invention to provide a light assembly that may comprise a sheathing (cover) that may be configured to at least mostly cover over the flexible, elongate, and self-supporting tail (self-supporting-elongate-member) of the light assembly; and that may also be configured to cover over at least some of a light-module portion of the light assembly.

It is another objective of the present invention to provide a sheathing (cover) for at least some of the light assembly that may be soft, flexible, and/or comfortable to be touched by human hand(s).

It is another objective of the present invention to provide a light assembly that may comprise a (single) light-module portion in addition to the tail portion (and the sheathing portion).

It is another objective of the present invention to provide a light assembly with the (single) light-module portion that may be battery powered.

It is another objective of the present invention to provide a light assembly with the (single) light-module portion, where the light-module portion may comprise at least one light-source.

It is another objective of the present invention to provide a light assembly with the (single) light-module portion, where the light-module portion may comprise at least one light-source that may be of at least one light emitting diode (LED).

It is another objective of the present invention to provide a light assembly that provides safety to its users by shining needed light to a desired target location, region, and/or area.

It is yet another objective of the present invention to provide a light assembly that provides safety to its users, such as, but limited to, children, small children, babies, infants, toddlers, the elderly, those who benefit from corrective eyewear, and/or the like.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 5U shows the light assembly from FIG. 1 that is removably attached to a given article, namely, to tack for an animal, such as, but not limited to, a leash, a lead, a gentle lead, a collar, a harness, a bridle, a halter, a saddle, a saddlebag, a stirrup, a strap, a girth, a yoke, a muzzle, or the like.

FIG. 5W shows two side by side makeup compact cases (or wallets) (a rectangular one and a circular one) or the like, with each having its own light assembly that is removably attached to the given makeup compact case (or the wallet) or the like.

REFERENCE NUMERAL SCHEDULE

Figure 1:
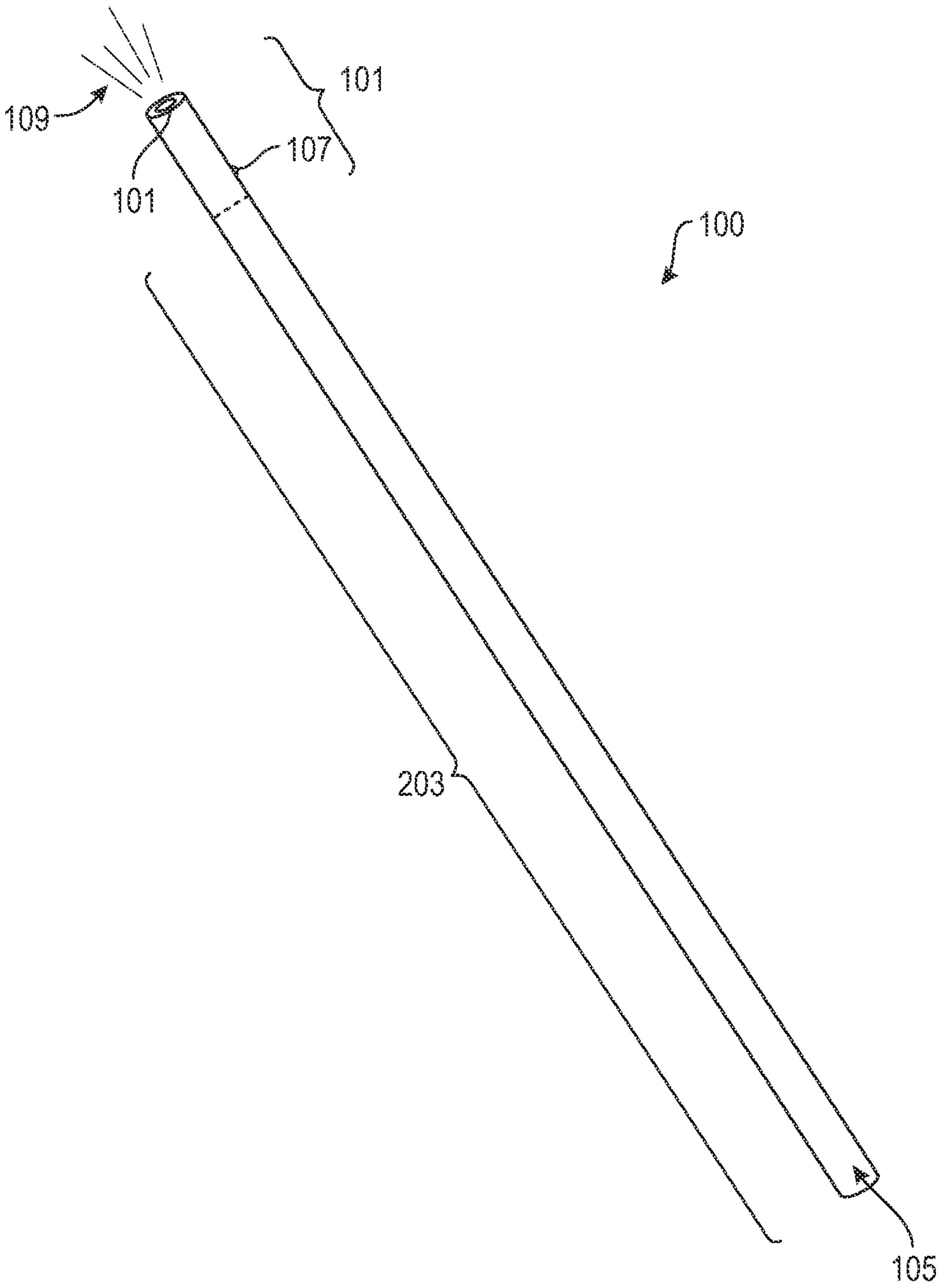
FIG. 1 depicts a perspective view of a given "light-with-adjustable-tail-for-articles" ("light assembly") in its normal assembled configuration.

With regard to the reference numerals used herein, the following numbering is used throughout the various drawing figures.

100 light-with-adjustable-tail-for-articles (light assembly) 100
101 light-module 101
105 covering (sheath) 105
107 interface 107
109 emitted light 109
203 self-supporting-elongate-member 203
301 light-source(s) 301
303 circuit(s) 303
305 power-source 305
307 interface 307
309 enclosure (housing) 309
311 port 311
501 marking implement 501
503 nail clippers 503
505 nail polish 505
507 eye lash curling tool 507
509 spray bottle 509
511 scissors 511
513 shears (snips) 513
515 pliers 515
517 pliers 517
519 screw driver or chisel 519
521 wrench 521
523 saw 523
525 drill 525
527 eyeglasses 527
529 hat (cap) 529
531 door handle-or-knob 531
532 door-lock 532
533 vehicle 533
535 elongate-member 535
537 animal-tack 537
539 elongate-member 539
541 hand-held-mirror (or brush) 541
543 makeup compact case (or a wallet) 543
601 first-configuration 601
603 second-configuration 603
605 third-configuration 605
607 fourth-configuration 607
609 fifth-configuration 609

611 diameter of light module 611
613 diameter of covering 613
701 light device 701
703 light-source 703
705 telescoping-neck 705
707 base-member 707
709 flexible-neck 709
711 light device 711
721 light device 721
731 light device 731
733 clamp 733
741 light device 741
743 first-light-source 743
745 second-light-source 745
747 middle-portion 747
749 flexible-neck 749
751 prior art light device 751
753 flexible-elongate-member 753
755 plurality of LEDs 755
761 prior art light device 761
763 elongate-flexible-member 763
765 video-and-light 765
767 screen (display) 767
800 prior art electrical-fish-rod (with light) 800
801 light-source 801
803 rod 803
803 (thickest) rod 803*a*
803*b* rod 803*b*
803*c* (thinnest) rod 803*c*
901 tool (attachment or cover) 901
903 lid 903
905 nail polish container 905
907 twisting motion 907

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 depicts a perspective view of a given light-with-adjustable-tail-for-articles 100 (hereinafter, just "light assembly 100") in its normal assembled configuration. In some embodiments, light assembly 100 may comprise three (3) main components, namely, a (single) light-module 101, a (single) self-supporting-elongate-member 203, and a covering (sheath) 105. Note, in FIG. 1, the light-module 101 may be at least mostly covered over by the covering (sheath) 105. Note, in FIG. 1, the self-supporting-elongate-member 203 may be at least mostly to entirely covered over by the covering (sheath) 105. Thus, in FIG. 1, its mostly the covering (sheath) 105 that is visible.

Continuing discussing FIG. 1, in some embodiments, the covering (sheath) 105 may be configured to at least partially cover over the light-module 101. In some embodiments, the covering (sheath) 105 may be configured to at least partially to entirely cover over the self-supporting-elongate-member 203. In some embodiments, the covering (sheath) 105 may be a hollow elongate member that is flexible and/or pliable. In some embodiments, the covering (sheath) 105 may be closed at one of its terminal ends and open at its other oppositely disposed terminal end. In some embodiments, the covering (sheath) 105 may or may not be self-supporting. In some embodiments, the covering (sheath) 105 may be made at least substantially (mostly) from at least one of: an elastomer, a silicone, a rubber, a natural rubber, a synthetic rubber, a soft plastic, a flexible plastic, a pliable plastic, a foam, a dry foam (e.g., a foam that is not wet and/or has already cured into a dry state), a foam made from a plastic, a foam made from an elastomer, a portion thereof, combinations thereof, and/or the like. In some embodiments, the covering (sheath) 105 may be manufactured from one or more of the following processes (methods): injection molding, extrusion, 3D (three dimensional) printing, and/or a dip process. In some embodiments, an exterior surface of the covering (sheath) 105 may be configured to be soft and/or comfortable to be held by an uncovered human hand, finger, and/or thumb.

Figure 3:
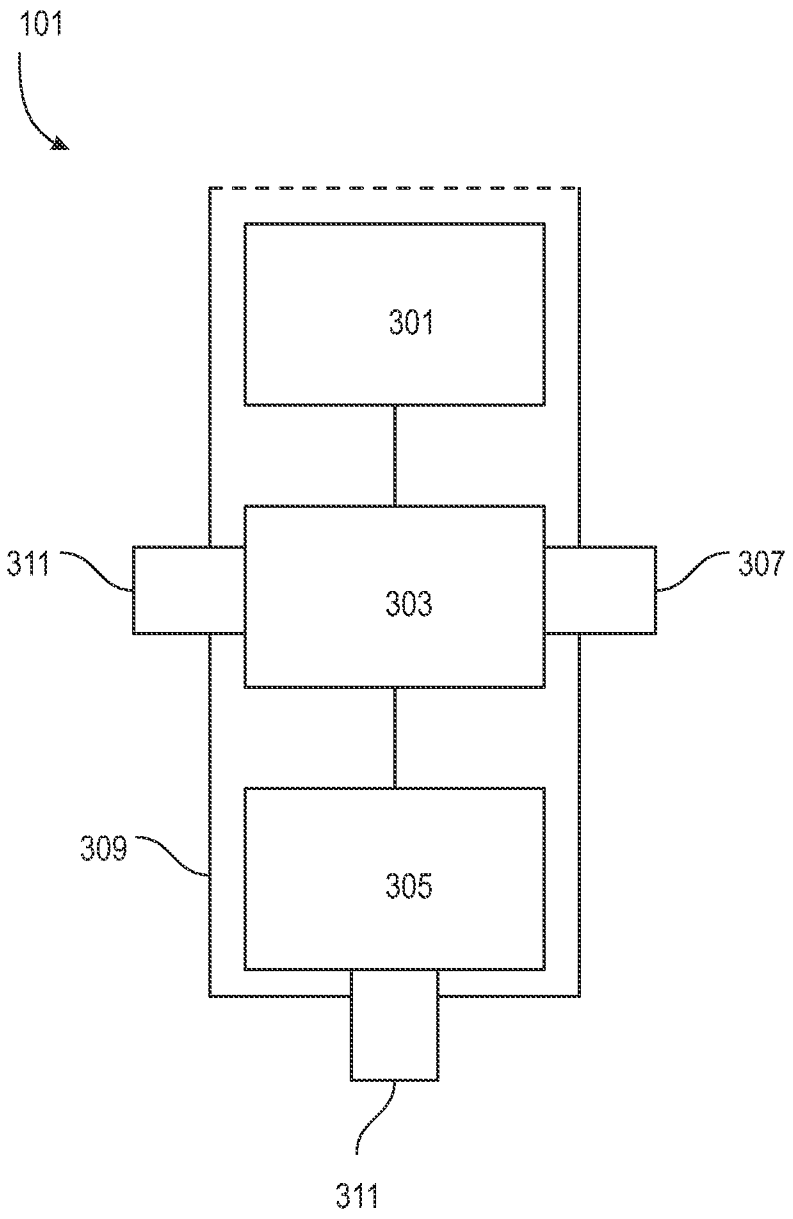
FIG. 3 is a block diagram of just a single light-module (with electronics for emitting light) from the light assembly from FIG. 1.

FIG. 1 may also show a bulge 107 on an exterior portion of the covering (sheath) 105 in the light-module 101 region of light assembly 100. In some embodiments, bulge 107 may be a portion of the covering (sheath) 105 that covers over an interface 307 for operating the light-module 101. Note, interface 307 is shown in FIG. 3. In some embodiments, interface 307 and/or bulge 107 may be selected from at least one of: a switch, a membrane switch, a button, a toggle, a slide, a dial, a touch interface, a twist button (twist switch), combinations thereof, and/or the like.

FIG. 1 also shows emitted light 109 that is being emitted from one terminal end of light-module 101. Emitted light 109 is also shown for a given light-module 101 of a given light assembly 100 in many other figures of this patent application. In some embodiments, light emitted from light-module 101 does not emit from sidewalls of light-module 101; that is, emitted light 109 only exits from one terminal end of light-module 101, namely its terminal end that disposed opposite from self-supporting-elongate-member 203.

Figure 2:
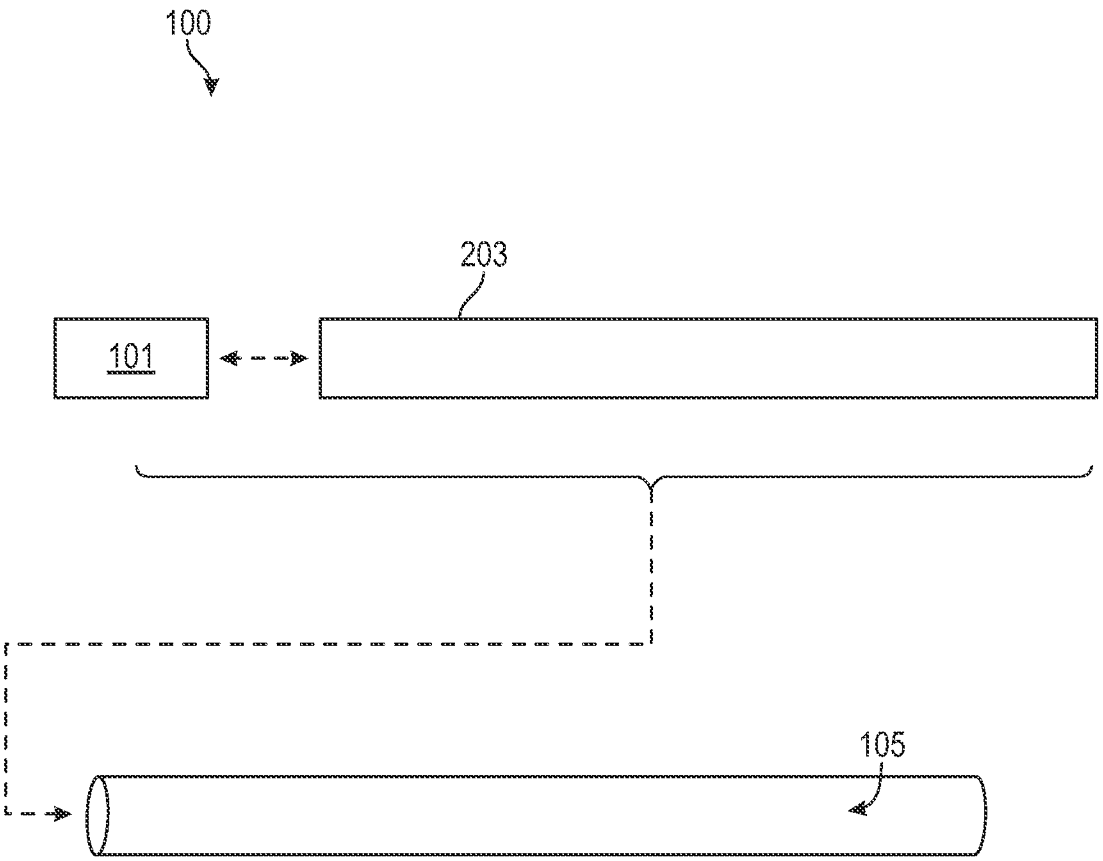
FIG. 2 depicts an exploded view of the light assembly from FIG. 1.

FIG. 2 depicts an exploded view of light assembly 100. FIG. 2 shows light-module 101 separated from self-supporting-elongate-member 203 and separated from covering (sheath) 105. In some embodiments, a given light assembly 100 (light-with-adjustable-tail-for-articles 100) may comprise: a (single) light-module 101, a (single) self-supporting-elongate-member 203, and at least one (1) covering (sheathing) 105. In some embodiments, light-module 101 may be configured to emit light out of one terminal end of the light-module 101. In some embodiments, self-supporting-elongate-member 203 may form a tail of the light-withadjustable-tail-for-articles 100 (light assembly 100). In some embodiments, the self-supporting-elongate-member 203 may be flexible and may be configured to be repeatably bent into shapes, wherein a particular shape of the self-supporting-elongate-member 203 that resulted from bending of the self-supporting-elongate-member 203 may be self-supporting without external sources of support. In some embodiments, self-supporting-elongate-member 203 may be configured to be removably attached to a given article. In some embodiments, covering (sheathing) 105 may cover over at least some of the light-module 101 and also covers over at least most of the self-supporting-elongate-member 203. In some embodiments, with respect to lengths of the light-module 101 and of the self-supporting-elongate-member 203, the light-module 101 and the self-supporting-elongate-member 203 may be arranged end-to-end in the light-with-adjustable-tail-for-articles 100 (light assembly 100), such that when the self-supporting-elongate-member 203 may be in a linear configuration, these two individual lengths combine to form an overall length for the light-with-adjustable-tail-for-articles 100 (light assembly 100). In some embodiments, light-module 101 may be an electrically powered device that is configured to emit light. In some embodiments, light-module 101 may be an electrically powered device that is configured to emit light out only one terminal end of that particular light assembly light assembly 100 and/or of that particular light-module 101. In some embodiments, light-module 101 may not emit light out of its sidewalls, nor out of portions of light-module 101 that may be covered over by covering (sheath) 105.

Continuing discussing FIG. 2, in some embodiments, self-supporting-elongate-member 203 may be flexible, bendable, articulable, combinations thereof, and/or the like. In some embodiments, the self-supporting-elongate-member 203 may have a bend radius that is less than two and half (2.5) inches (i.e., this may define the flexibility of self-supporting-elongate-member 203 for some embodiments). In some embodiments, self-supporting-elongate-member 203 may be repeatably flexible, bendable, articulable, combinations thereof, and/or the like. In some embodiments, self-supporting-elongate-member 203 may be repeatably flexible, bendable, articulable, combinations thereof, and/or the like, up to at least a predetermined quantity of cycles of such flexing, bending, articulation, combinations thereof, and/or the like. In some embodiments, this predetermined quantity of cycles may be selected from a range of at least: 500 cycles to 10,000 cycles, with at least a one (1) minute rest between successive flexes, bends, and/or articulations. In some embodiments, self-supporting-elongate-member 203 may be bent, articulated, folded, and/or the like into a variety of different shapes. In some embodiments, self-supporting-elongate-member 203 may be bent, articulated, folded, and/or the like into a mostly helix or spiral shape. In some embodiments, self-supporting-elongate-member 203 may be bent, articulated, folded, and/or the like from shape into another shape. In some embodiments, at least a portion of the self-supporting-elongate-member 203 may be configured to be repeatably bent into a spiral shape. In some embodiments, with respect to a length of the spiral shape (of self-supporting-elongate-member 203), six (6) centimeters (cm) of the length of that spiral shape may have at least six (6) turns to that particular spiral shape.

In some embodiments, self-supporting-elongate-member 203 may be self-supporting. In some embodiments, self-supporting-elongate-member 203 may be (repeatably) bent, articulated, folded, and/or the like into a variety of different shapes, that once formed may be self-supporting (self-maintaining), i.e., once a given shape of self-supporting-elongate-member 203 has been formed (e.g., by flexing, bending, articulation, folding, and/or the like), that particular formed shaped may maintain itself without outside (external) forces being applied to light assembly 100 and/or to self-supporting-elongate-member 203; and that is how "self-supporting" may be defined as used herein. For example, if a particular bent shape of self-supporting-elongate-member 203 (and/or light assembly 100) was dropped in freefall through Earth's atmosphere (or through vacuum) that particular bent shape would be maintained. And/or, in some embodiments, "self-supporting" in this context (and as used herein) may mean if a person (or tool) were to hold one terminal end of self-supporting-elongate-member 203 and regardless of a particular bent shape for that self-supporting-elongate-member 203, and if no other portion of self-supporting-elongate-member 203 was physically being supported, that whatever shape self-supporting-elongate-member 203 may be in, that shape would be maintained.

In some embodiments, self-supporting-elongate-member 203 may comprise at least one elongate-member that is fixed, finite, non-variable, non-extendable, non-telescoping, and/or predetermined with respect to an overall length, outside diameter (gauge), and/or the like, of that particular self-supporting-elongate-member 203. However, such parameters, characteristics, and/or dimensions may vary across different self-supporting-elongate-members 203 of different light assemblies 100. In some embodiments, self-supporting-elongate-member 203 may be a solid cylindrical and elongate member. In some embodiments, the self-supporting-elongate-member 203 may be comprised of at least one wire. In some embodiments, the at least one wire may be made from at least one: metal and/or alloy. In some embodiments, self-supporting-elongate-member 203 may be comprise of at least one wire of at least one metal and/or of at least one alloy. In some embodiments, the metal and/or the alloy of self-supporting-elongate-member 203 may be selected from: aluminum, copper, steel, iron, tin, bronze, a portion thereof, combinations thereof, and/or the like. In some embodiments, the at least one wire may not be not operatively connected to any electronics. In some embodiments, the self-supporting-elongate-member 203 has no electronics. In some embodiments, the self-supporting-elongate-member 203 does not have parts that move with respect to each other.

In some embodiments, a given light assembly 100 may comprise only a single self-supporting-elongate-member 203 and not multiple separate self-supporting-elongate-members 203. In some embodiments, self-supporting-elongate-member 203 is not formed from a plurality of linked articulable joints. In some embodiments, self-supporting-elongate-member 203 may be flexed, bent, articulated, folded, and/or the like anywhere along its length and not at distinct joint members, since self-supporting-elongate-member 203 does not have distinct joint members. In some embodiments, the self-supporting-elongate-member 203 may be devoid of (missing) separately distinct articulable joints (segments); wherein separately distinct articulable joints (segments) may be used in prior art tripods that have flexible (articulable) tripod legs. In some embodiments, for at least most of the length of self-supporting-elongate-member 203, self-supporting-elongate-member 203 may have a uniform, consistent, fixed, non-variable outside diameter.

In some embodiments, the terminal end of light assembly 100 opposite the light-module 101 does not have at least one of: a spherical shape, semi-spherical shape, a hemispherical shape, combinations thereof, and/or the like.

In some embodiments, the terminal end of light assembly 100 opposite the light-module 101 does not have at least one of: a spherical shape, semi-spherical shape, a hemispherical shape, combinations thereof, and/or the like, wherein a diameter of the spherical shape, the semi-spherical shape, and/or the hemispherical shape is larger than a diameter of most of a length of self-supporting-elongate-member 203 with its covering (sheathing) 105. In other words, if a diameter of the spherical shape, the semi-spherical shape, and/or the hemispherical shape is the same or smaller than a diameter of most of a length of self-supporting-elongate-member 203 with its covering (sheathing) 105, then such of the spherical shape, the semi-spherical shape, and/or the hemispherical shape of that diameter same or smaller size, may be located at the terminal end of light assembly 100 opposite the light-module 101.

In embodiments, where self-supporting-elongate-member 203 may be formed from two or more wires, those two or more wires may be substantially parallel with each other and all located at least substantially (mostly) within a same covering (sheath) 105; i.e., when those two or more wires are flexed, bent, articulated, folded, and/or the like, those two or more wires move together as a single unit of a flexible elongate member. In embodiments, where self-supporting-elongate-member 203 may be formed from two or more wires, those two or more wires may be helixed (spiraled) each other and all located at least substantially (mostly) within a same covering (sheath) 105; i.e., when those two or more wires are flexed, bent, articulated, folded, and/or the like, those two or more wires move together as a single unit of a flexible elongate member. In embodiments, where self-supporting-elongate-member 203 may be formed from two or more wires, those two or more wires are not configured in an end-to-end configuration with respect to each other.

In some embodiments, in the overall normal assembled configuration for light assembly 100, light-module 101 may be held abutting a terminal end of the self-supporting-elongate-member 203 by virtue of the covering (sheath) 105 that may be at partially covering the light-module 101 and that may be totally covering the self-supporting-elongate-member 203.

In some embodiments, in the overall normal assembled configuration for light assembly 100, light-module 101 may be initially and/or temporarily held abutting a terminal end of the self-supporting-elongate-member 203 by virtue an adhesive, glue, epoxy, mechanical attachment, combinations thereof; and then may be permanently held abutting that terminal end of the self-supporting-elongate-member 203 by virtue of the covering (sheath) 105 being installed to at partially cover the light-module 101 and to totally cover the self-supporting-elongate-member 203.

In some embodiments, the light-module 101 and the self-supporting-elongate-member 203 may be held together (at least temporarily) in an end-to-end fashion, via an attachment means, and then a fixed length of extruded covering (sheath) 105 may be passed over that union of the light-module 101 and the self-supporting-elongate-member 203, and then using a heat source (e.g., a heat gun, oven, and/or heat tunnel), that extruded section of covering (sheath) 105 that is covering over the light-module 101 and the self-supporting-elongate-member 203 may be heat shrunk to form a final assembled configured of light assembly 100. In some embodiments, the attachment means between the light-module 101 and the self-supporting-elongate-member 203, when they are being held together (at least temporarily) in an end-to-end fashion, may be selected from at least one of: an adhesive, a glue, an epoxy, a mechanical attachment, combinations thereof.

In some embodiments, the light-module 101 and the self-supporting-elongate-member 203 may be placed together within an injection mold cavity, in their desired final assembled configuration positions with respect to each other, and then the covering (sheath) 105 may be formed around the light-module 101 and the self-supporting-elongate-member 203 in that mold cavity via an injection molding process that generates the final assembled configured of light assembly 100.

In some embodiments, the light-module 101 and the self-supporting-elongate-member 203 may be held together (at least temporarily) in an end-to-end fashion, via an attachment means, and then that (at least temporarily) union of the light-module 101 and the self-supporting-elongate-member 203 may be dipped, together as a unit, into a bath of a liquid version of covering (sheath) 105, that upon removal from that bath may cure to form a final assembled configured of light assembly 100. In some embodiments, the curing may be accelerated and/or promoted via exposure to UV light and/or by exposure to heat from a heat source. In some embodiments, the attachment means between the light-module 101 and the self-supporting-elongate-member 203, when they are being held together (at least temporarily) in an end-to-end fashion, may be selected from at least one of: an adhesive, a glue, an epoxy, a mechanical attachment, combinations thereof.

FIG. 3 is a block diagram of just a single light-module 101. In some embodiments, light-module 101 may be all of the electronics of light assembly 100. In some embodiments, light-module 101 may house all of the electronics of light assembly 100. In some embodiments, light-module 101 may be a subassembly. In some embodiments, light-module 101 may be an off the shelf component. In some embodiments, light-module 101 may comprise at least one of: a light-source(s) 301, a circuit(s) 303, a power-source(s) 305, interface(s) 307, an enclosure (housing) 309, a port(s) 311, electrical wire(s), electrical cable(s), a portion thereof, combinations thereof, and/or the like. In some embodiments, light-module 101, light-source(s) 301, circuit(s) 303, power-source(s) 305, interface(s) 307, enclosure (housing) 309, and/or port(s) 311, may be listed, certified, registered, and/or in compliance with applicable UL (Underwriters Laboratories) and/or NEC (National Electric Code) requirements, standards, codes, and/or the like. In some embodiments, the light-module 101 may comprise at least one: lightsource(s) 301, circuit(s) 303, and power-source(s) 305. In some embodiments, the circuit(s) 303 may be operatively connected to both the light-source(s) 301 and to the power-source(s) 305. In some embodiments, the power-source(s) 305 may be configured to electrically power the light-source(s) 301. In some embodiments, the light emitted from the light-module 101 may only exit from the one terminal end of the light-module 101 and not from sidewalls nor an other terminal end of the light-module 101. In some embodiments, all electronics of the light-with-adjustable-tail-for-articles 100 (light assembly 100) may be housed at least partially within the light-module 101, with the only electronics that optionally partially protrudes from the light-module 101 being a user-interface 307 of the light-module 101. In some embodiments, electronics of light assembly 100 may be found in only one location of light assembly 100, that of light-module 101. In some embodiments, the light-module 101 may have a consistent and non-varying outside diameter along the length of the light-module 101.

Continuing discussing FIG. 3, in some embodiments, light-source(s) 301 may be at least one light emitting diode (LED). In some embodiments, light-source(s) 301 may be one or more light emitting diode(s) (LED[s]). In some embodiments, light-source(s) 301 may be configured to emit light in one direction only. In some embodiments, light-source(s) 301 may not be configured to simultaneously emit light in orthogonal and/or perpendicular directions. In some embodiments, light-source(s) 301 may be operationally linked (connected) to at least one of: circuit(s) 303, power-source(s) 305, interface(s) 307, enclosure (housing) 309, port(s) 311, electrical wire(s), electrical cable(s), a portion thereof, combinations thereof, and/or the like.

Continuing discussing FIG. 3, in some embodiments, circuit(s) 303 may be at least one electronic circuit. In some embodiments, circuit(s) 303 may be at least one printed circuit board (PCB) or a portion thereof. In some embodiments, circuit(s) 303 may comprise, at least one electronic circuit, at least one PCB, at least one electrical wire, at least one electrical cable, a least one resistor, at least one transistor, at least one capacitor, at least one inducer, a portion thereof, combinations thereof, and/or the like. In some embodiments, circuit(s) 303 may be operationally linked (connected) to at least one of: light-source(s) 301, power-source(s) 305, interface(s) 307, enclosure (housing) 309, port(s) 311, electrical wire(s), electrical cable(s), a portion thereof, combinations thereof, and/or the like.

Continuing discussing FIG. 3, in some embodiments, power-source(s) 305 may be configured to electrically power at least some of the electronics of light-module 101. In some embodiments, power-source(s) 305 may be configured to electrically power the electronics of light-module 101. In some embodiments, power-source(s) 305 may be configured to electrically power the light-module 101. In some embodiments, power-source(s) 305 may be configured to electrically power at least one of: light-source(s) 301, circuit(s) 303, interface(s) 307, port(s) 311, electrical wire(s), electrical cable(s), a portion thereof, combinations thereof, and/or the like, of the light-module 101. In some embodiments, power-source(s) 305 may be selected from at least one: a battery, rechargeable battery, a non-rechargeable battery, a N sized battery, a A11 sized battery, a A23 sized battery, a A27 sized battery, a AAAA sized battery, a AAA sized battery, a ½/AA sized battery, a AA sized battery, a 4SR44 sized battery, a CR2 sized battery, a CR123A sized battery, a NiCad battery, a lithium ion based battery, one or more LR632 cells, one or more LR932 cells, a graphene battery, a structural battery, a solid-state battery, a semi-solid-state battery, an off the shelf battery, capacitor, a portion thereof, combinations thereof, and/or the like. In some embodiments, power-source(s) 305 may be operationally linked (connected) to at least one of: light-source(s) 301, circuit(s) 303, interface(s) 307, enclosure (housing) 309, port(s) 311, electrical wire(s), electrical cable(s), a portion thereof, combinations thereof, and/or the like. In some embodiments, in terms of battery 305 form factor, battery 305 may be cylindrical, coin (button), combinations thereof, and/or the like.

Figure 9:
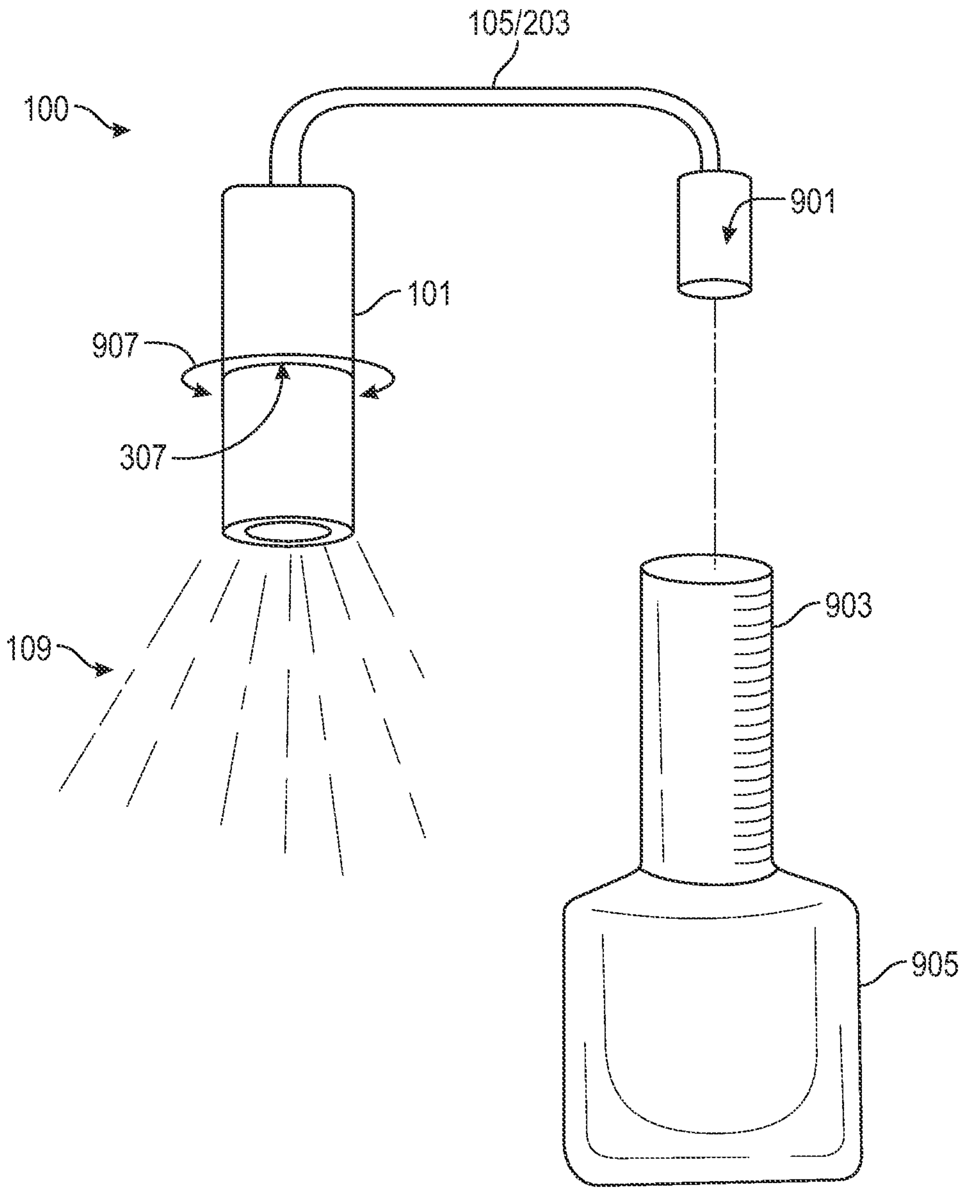
FIG. 9 may depict a schematic block diagram of a light assembly (light-withadjustable-tail-for-articles) whose terminal end that is disposed opposite from its light-module terminal end region, may terminated in a tool and/or an attachment; or that may comprise a tool and/or an attachment.

Continuing discussing FIG. 3, in some embodiments, interface 307 may be how a user (person) interfaces, engages with, operates, turns on, turns off, adjusts light intensity, adjusts light focus, combinations thereof, and/or the like the given light-module 101 and/or the lightsource(s) 301. In some embodiments, interface 307 (and/or bulge 107) may be configured to operate as at least one of: a switch, a membrane switch, a button, a slide, a dial, a toggle, a touch interface, twist button (and/or switch), combinations thereof, and/or the like. In some embodiments, interface 307 (and/or bulge 107) may be selected from at least one of: a switch, a membrane switch, a button, a slide, a dial, a toggle, a touch interface, twist button (and/or switch), combinations thereof, and/or the like. In some embodiments, bulge 107 may be a portion of covering (sheath) 105 that may at least partially cover over interface 307. In some embodiments, interface 307 may be accessible from an exterior surface of enclosure 309 and/or from an exterior surface of light-module 101. In some embodiments, at least some of interface 307 may protrude (and/or project) outwardly from an exterior surface of enclosure 309 and/or from an exterior surface of light-module 101. In some embodiments, interface(s) 307 may be operationally linked (connected) to at least one of: light-source(s) 301, circuit(s) 303, powersource(s) 305, enclosure (housing) 309, port(s) 311, electrical wire(s), electrical cable(s), a portion thereof, combinations thereof, and/or the like. In some embodiments, interface 307 may be interfaced by twisting (e.g., clockwise or counterclockwise) one terminal end of light-module 101 in an opposite direction from the other end of light-module 101 (such a twisting operation of interface 307 is also shown in FIG. 9).

Continuing discussing FIG. 3, in some embodiments, enclosure 309 (housing 309) may be an electronics enclosure and/or an electronics housing. In some embodiments, enclosure 309 (housing 309) may be configured to operate as an electronics enclosure and/or as an electronics housing. In some embodiments, enclosure 309 (housing 309) may (entirely) enclose and/or house at least some of the electronics of light-module 101. In some embodiments, enclosure 309 (housing 309) may (entirely) enclose and/or house at least most (a majority) of the electronics of light-module 101. In some embodiments, enclosure 309 (housing 309) may be water resistant and/or water proof to a predetermined depth. In some embodiments, at least most of enclosure 309 (housing 309) may be rigid. In some embodiments, enclosure 309 (housing 309) may be a hollow cylindrical elongate member. In some embodiments, enclosure 309 (housing 309) may be at least partially to mostly constructed from at least one of: a metal, an alloy, a plastic, a wood, a ceramic, a laminate, a portion thereof, combinations thereof, and/or the like. In some embodiments, enclosure 309 (housing 309) may be constructed from at least one of: CNC machining, lathe and/or milling, injection molding, diecast molding, extrusion, 3D printing, combinations thereof, and/or the like. In some embodiments, an exterior of enclosure 309 (housing 309) may be powder coated, anodized, painted, combinations thereof, and/or the like. In some embodiments, enclosure 309 (housing 309) may comprise one or more gaskets, O-rings, sealants, combinations thereof, and/or the like.

Continuing discussing FIG. 3, in some embodiments, port(s) 311 may be at least one port that is configured to transfer (receive) electrical power from an exterior source for a purpose of charging at least one rechargeable battery 305 of light-module 101. In some embodiments, port(s) 311 may be configured as an industry accepted form factor, such as, but not limited to, a USB port, a USB micro port, a barrel connector port, an APPLE connector port, and/or the like. In some embodiments, port(s) 311 may be accessible from an exterior surface of enclosure 309 and/or from an exterior surface of light-module 101. In some embodiments, port(s) 311 may be optional and/or omitted from light-module 101. In some embodiments, port(s) 311 may be operationally linked (connected) to at least one of: light-source(s) 301, circuit(s) 303, power-source(s) 305, interface(s) 307, enclosure (housing) 309, electrical wire(s), electrical cable(s), a portion thereof, combinations thereof, and/or the like.

Figure 4A:
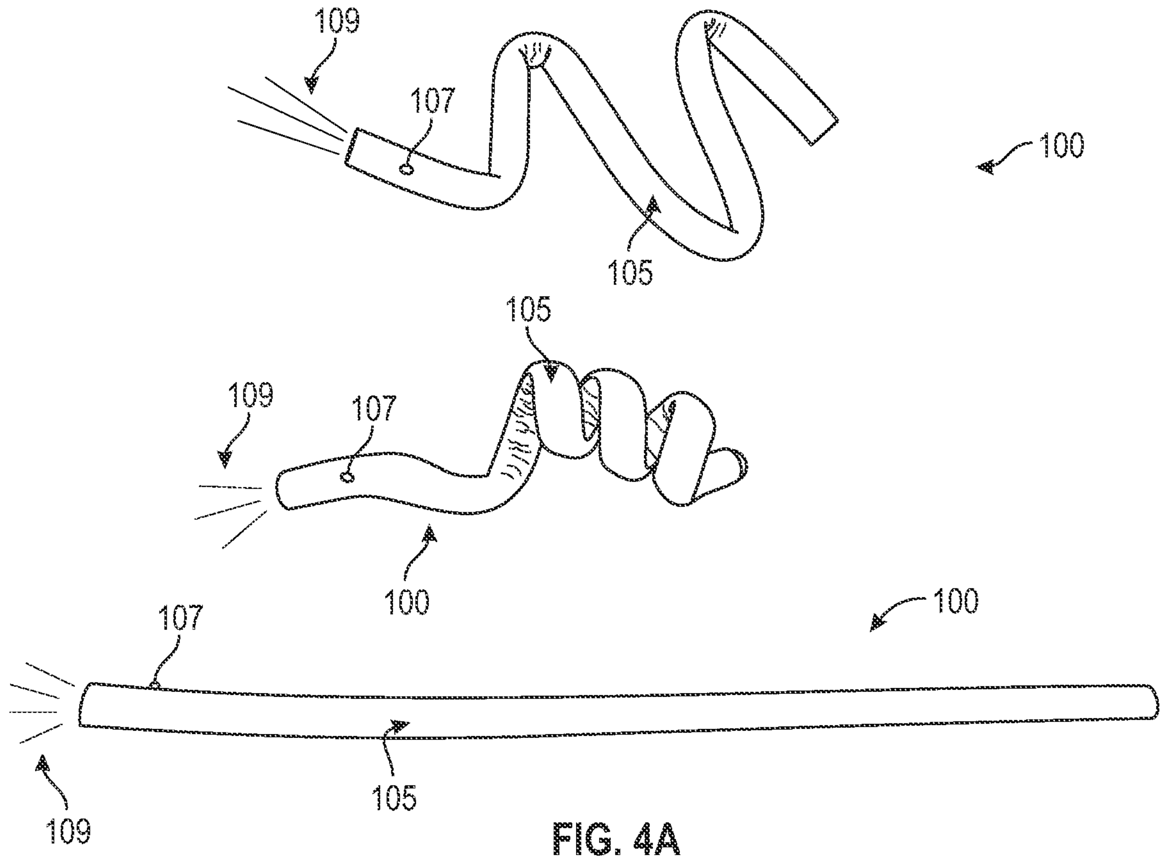
FIG. 4A the light assembly from FIG. 1 in a variety of example different bent shape configurations.
Figure 4B:
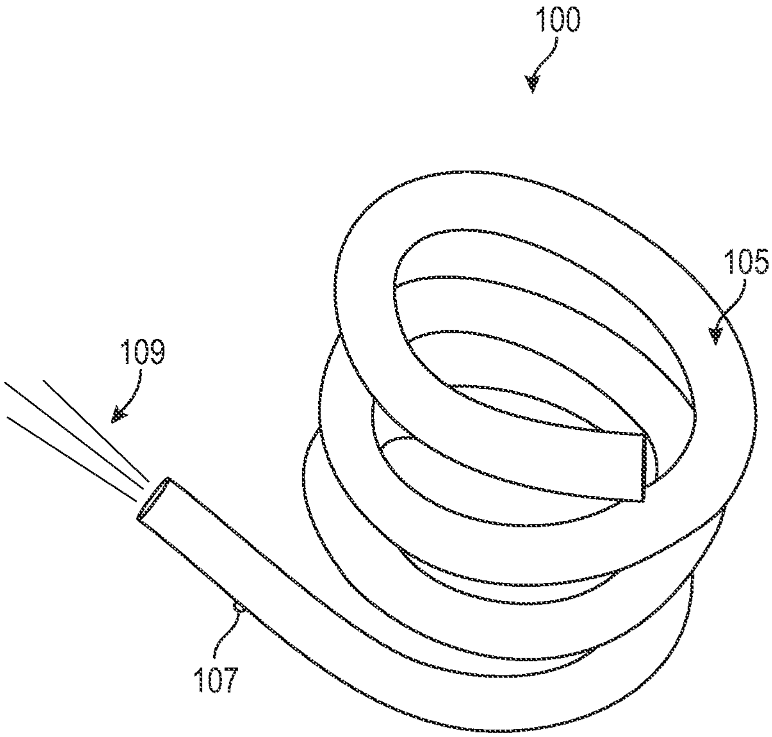
FIG. 4B shows the light assembly from FIG. 1 in a bent loose spiral (helix) shape configuration.
Figure 4C:
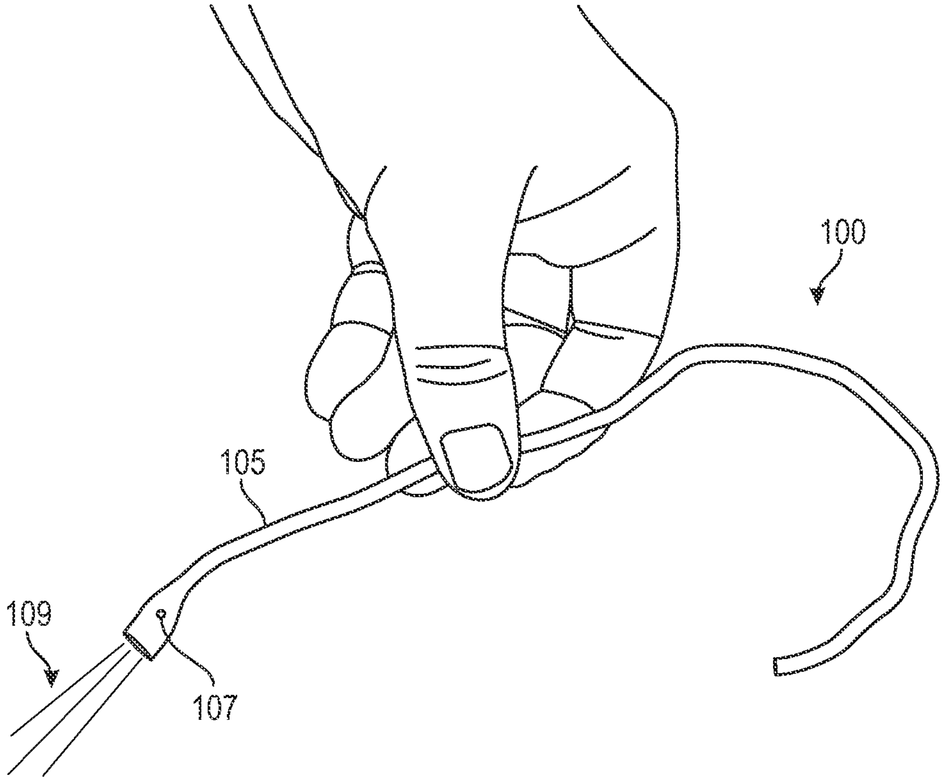
FIG. 4C shows the light assembly from FIG. 1 in a bent curved shape configuration.

FIG. 4A, FIG. 4B, and FIG. 4C all show light assembly 100 in a variety of example different shape configurations. FIG. 4A shows three (3) different light assembly 100 side-byside and all in three (3) different shape configurations, such as, but not limited to, a linear configuration, a spiral (or helix) configuration, and in a zig-zag like configuration. FIG. 4B shows another (different) spiral (or helix) configuration of a given light assembly 100. FIG. 4C shows a given light assembly 100. In a shape configuration that is at least mostly linear in one section (region) and curved (bent) in other sections (regions). In some embodiments, any given light assembly 100 may be bent, articulated, manipulated, and/or the like into any of the different shape configurations shown in FIG. 4A, in FIG. 4B, and/or in FIG. 4C. In some embodiments, any given light assembly 100 may be bent, articulated, manipulated, and/or the like into any of the different shape configurations shown in FIG. 4A, in FIG. 4B, and/or in FIG. 4C and then re-bent, re-articulated, re-manipulated, and/or the like into any of the other different shape configurations shown in FIG. 4A, in FIG. 4B, and/or in FIG. 4C. In some embodiments, when light assembly 100 may be bent, articulated, manipulated, and/or the like into any of the different shape configurations shown in FIG. 4A, in FIG. 4B, and/or in FIG. 4C, that particular shape configuration may be self-supporting. In some embodiments, that light assembly 100 may be bent, articulated, manipulated, and/or the like into a variety of different shape configurations, may be enabled by self-supporting-elongate-member 203. Note, the different shape configurations of light assembly 100 shown in FIG. 4A, in FIG. 4B, and in FIG. 4C are merely non-exhaustive examples. It should be understood that light assembly 100 (because of self-supporting-elongate-member 203) may be bent, articulated, manipulated, and/or the like into a variety of other different shape configurations that are not shown herein, but that still fall within the scope of the present invention.

In some embodiments, when light assembly 100 may be bent into a helix (spiral) shape, that resulting helix (spiral) shape may be self-supporting, i.e., once that light assembly 100 may be bent into such a helix (spiral) shape, that particular helix (spiral) shape may be freely maintained without the influence of any external (outside) forces upon light assembly 100. In some embodiments, with respect to a six (6) centimeters (cm) length of that overall helix (spiral) shape of that given light assembly 100, there may be at least six (6) separate turns of that particular helix (spiral) shape. In some embodiments, the repeatably different bendable shape configurations of a given light assembly 100 may result from and/or be imparted from its self-supporting-elongate-member 203. See e.g., FIG. 4A to FIG. 4C and FIG. 5A to FIG. 5W.

In some embodiments, FIG. 4A to FIG. 4C (and FIG. 5A to FIG. 5W) may show self-supporting-elongate-member 203 (of light assembly 100) being self-supporting in a variety of different bent shapes, wherein at least one such bent shape of light assembly 100 (of self-supporting-elongate-member 203) may have one or more angles in that particular bent shape. (Note, some bent shapes of self-supporting-elongate-member 203 may be devoid of angles.) In some embodiments, a given bent shape of self-supporting-elongate-member 203 may be self-supporting in that the given bent shape may be freely maintained by self-supporting-elongate-member 203 (without outside [external] intervention).

Figure 5A:
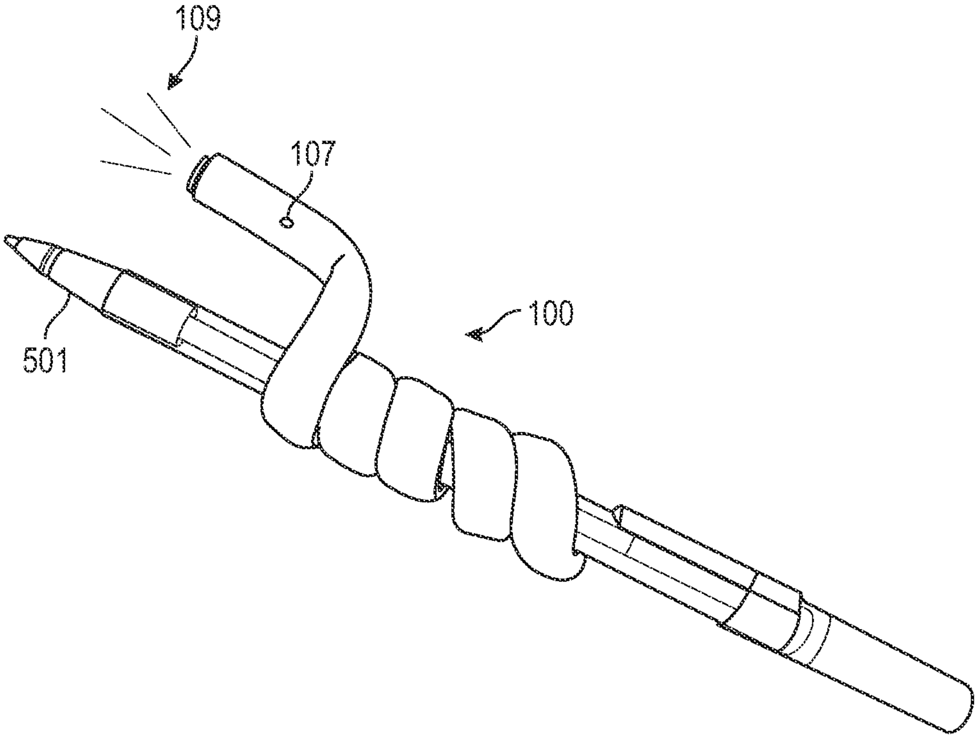
FIG. 5A shows the light assembly from FIG. 1 that is removably attached to a given article, namely, a marking implement.
Figure 5B:
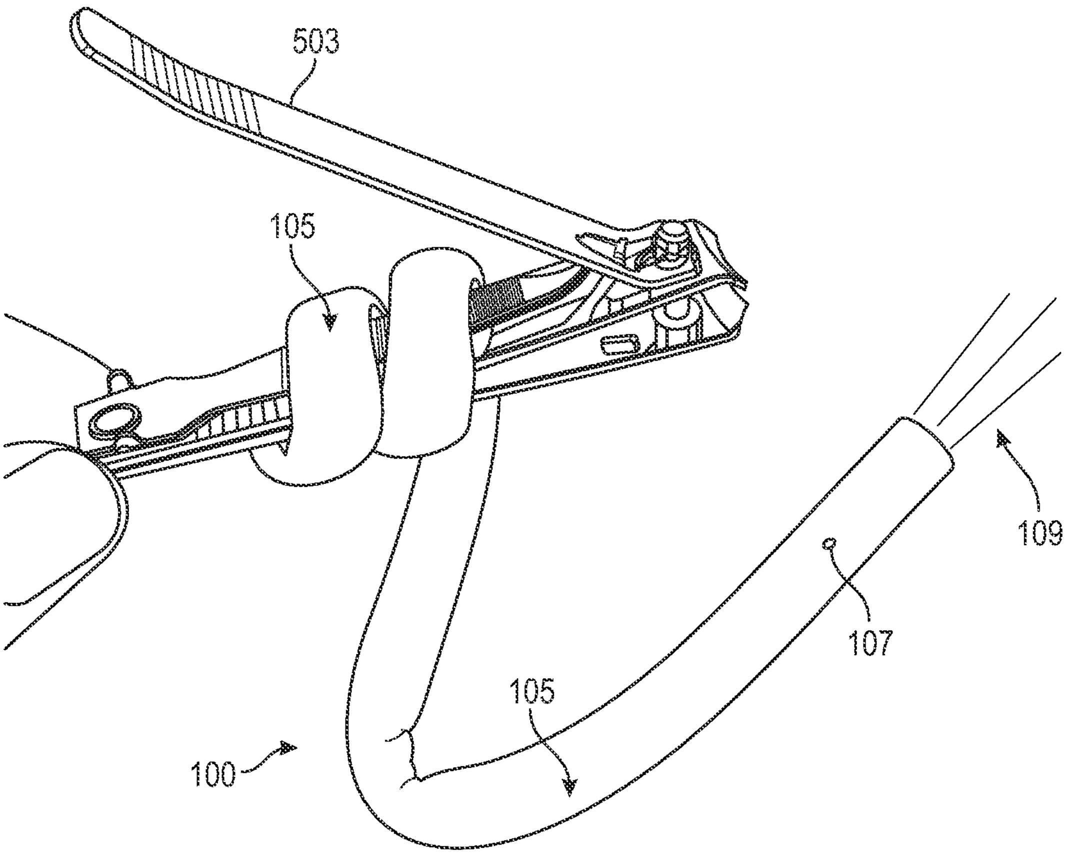
FIG. 5B shows the light assembly from FIG. 1 that is removably attached to a given article, namely, a nail clippers.
Figure 5C:
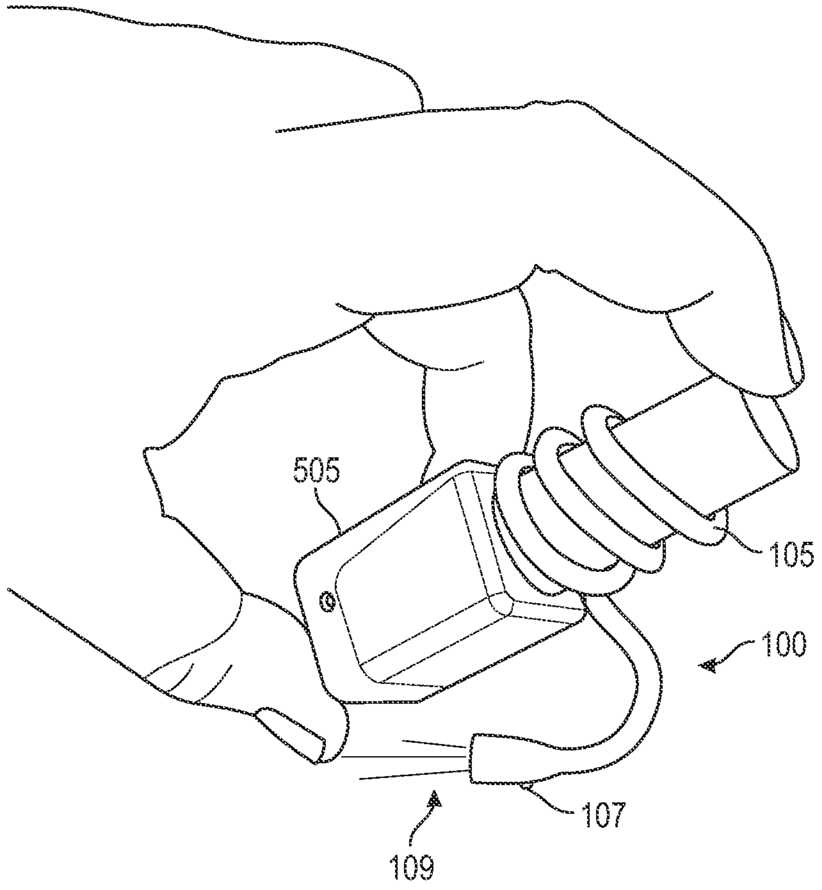
FIG. 5C shows the light assembly from FIG. 1 that is removably attached to a given article, namely, a lid for nail polish.
Figure 5D:
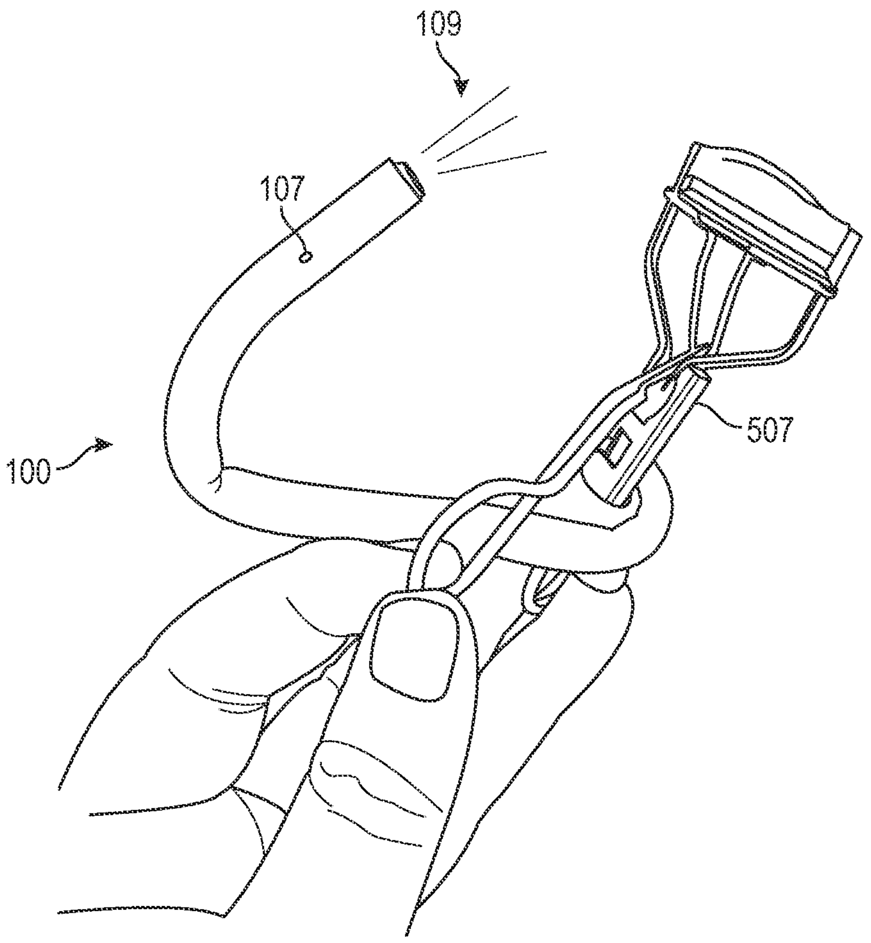
FIG. 5D shows the light assembly from FIG. 1 that is removably attached to a given article, namely, an eye lash curling tool.
Figure 5E:
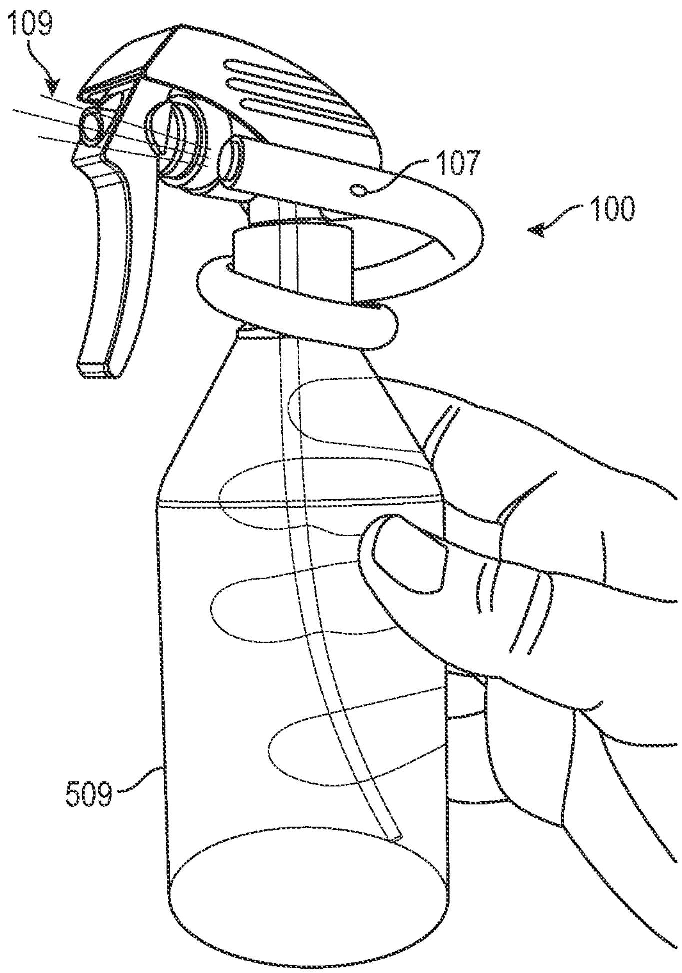
FIG. 5E shows the light assembly from FIG. 1 that is removably attached to a given article, namely, a spray bottle.
Figure 5F:
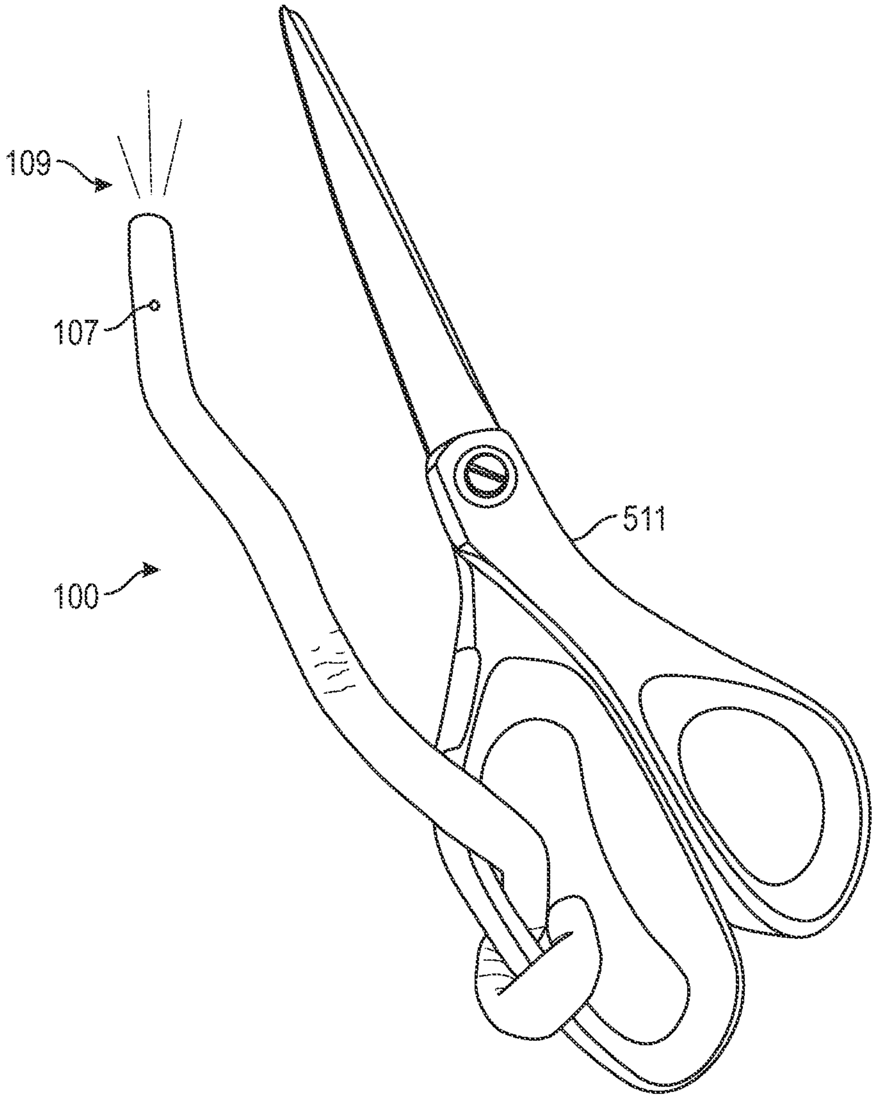
FIG. 5F shows the light assembly from FIG. 1 that is removably attached to a given article, namely, scissors.
Figure 5G:
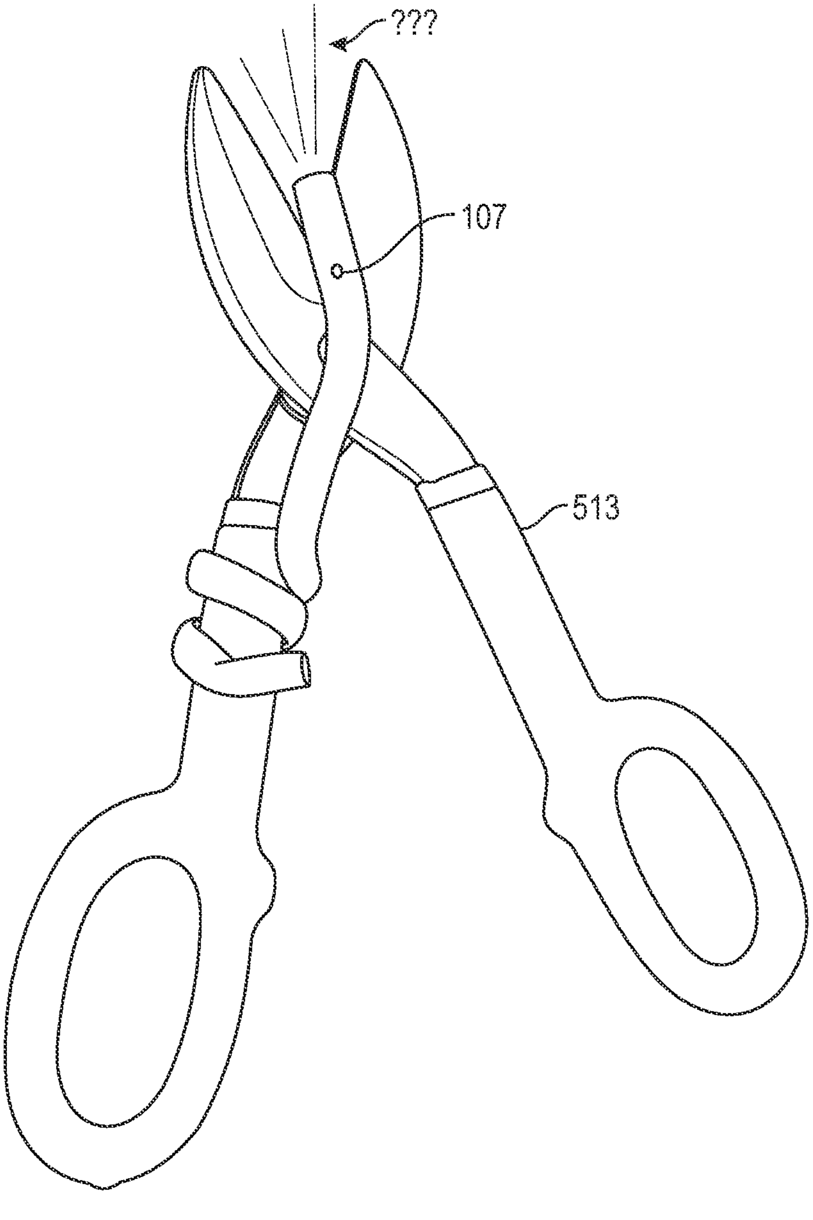
FIG. 5G shows the light assembly from FIG. 1 that is removably attached to a given article, namely, shears (snips).
Figure 5H:
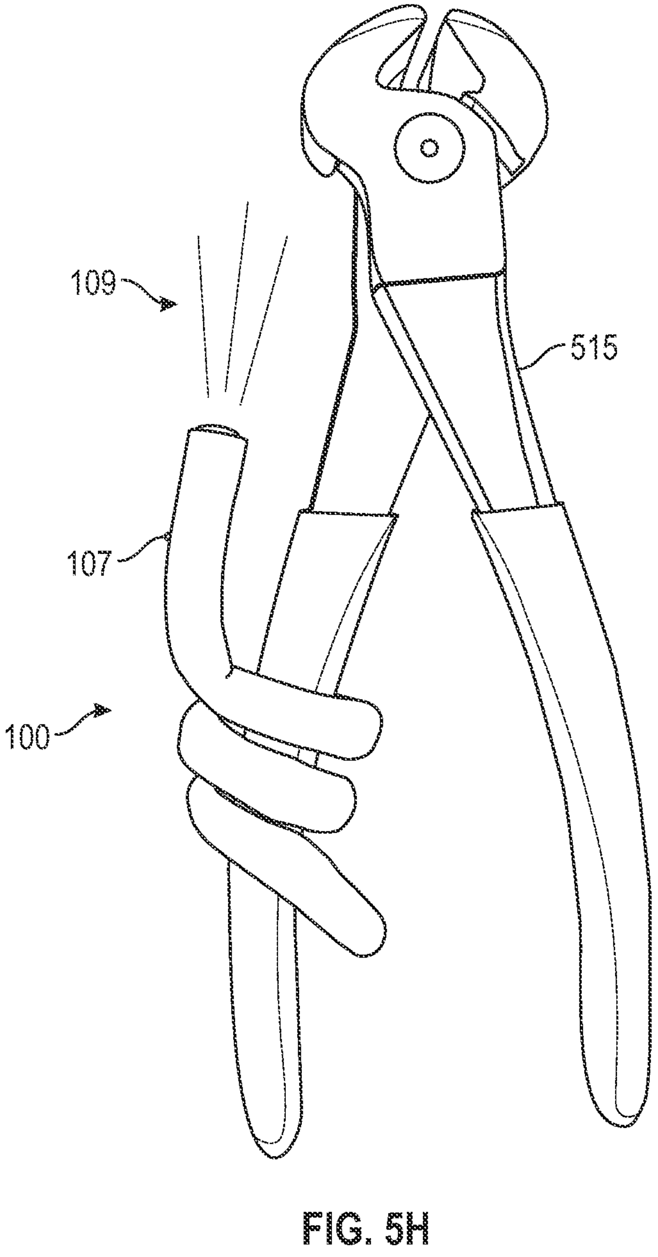
FIG. 5H shows the light assembly from FIG. 1 that is removably attached to a given article, namely, (cutting) pliers.
Figure 5I:
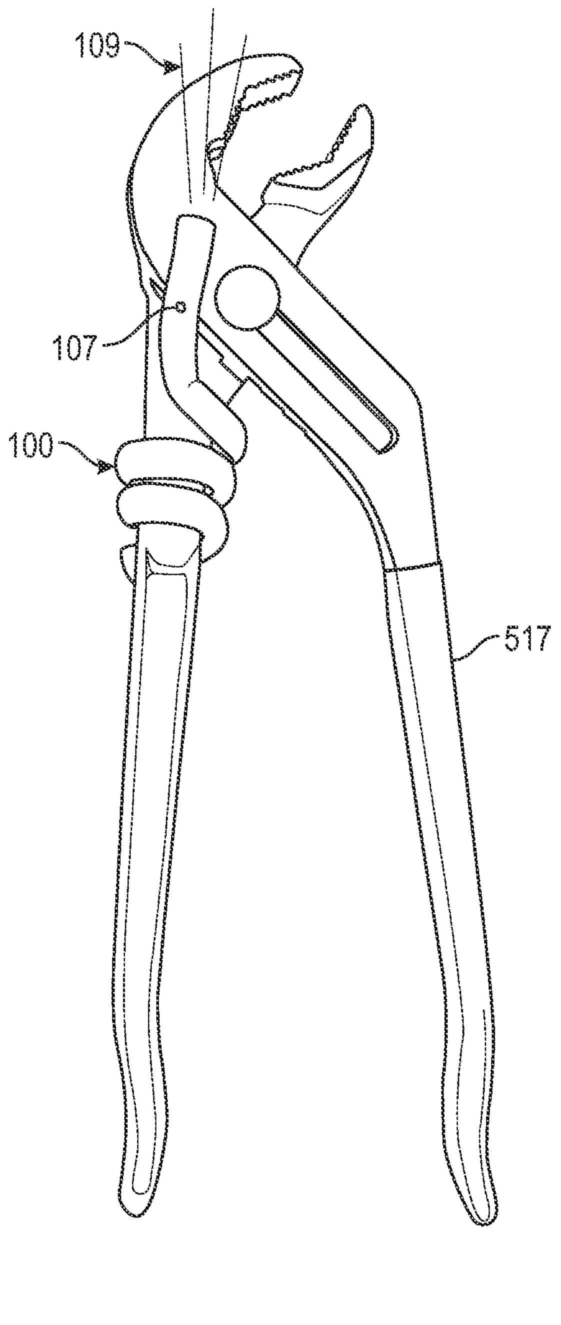
FIG. 5I shows the light assembly from FIG. 1 that is removably attached to a given article, namely, (gripping) pliers.
Figure 5J:
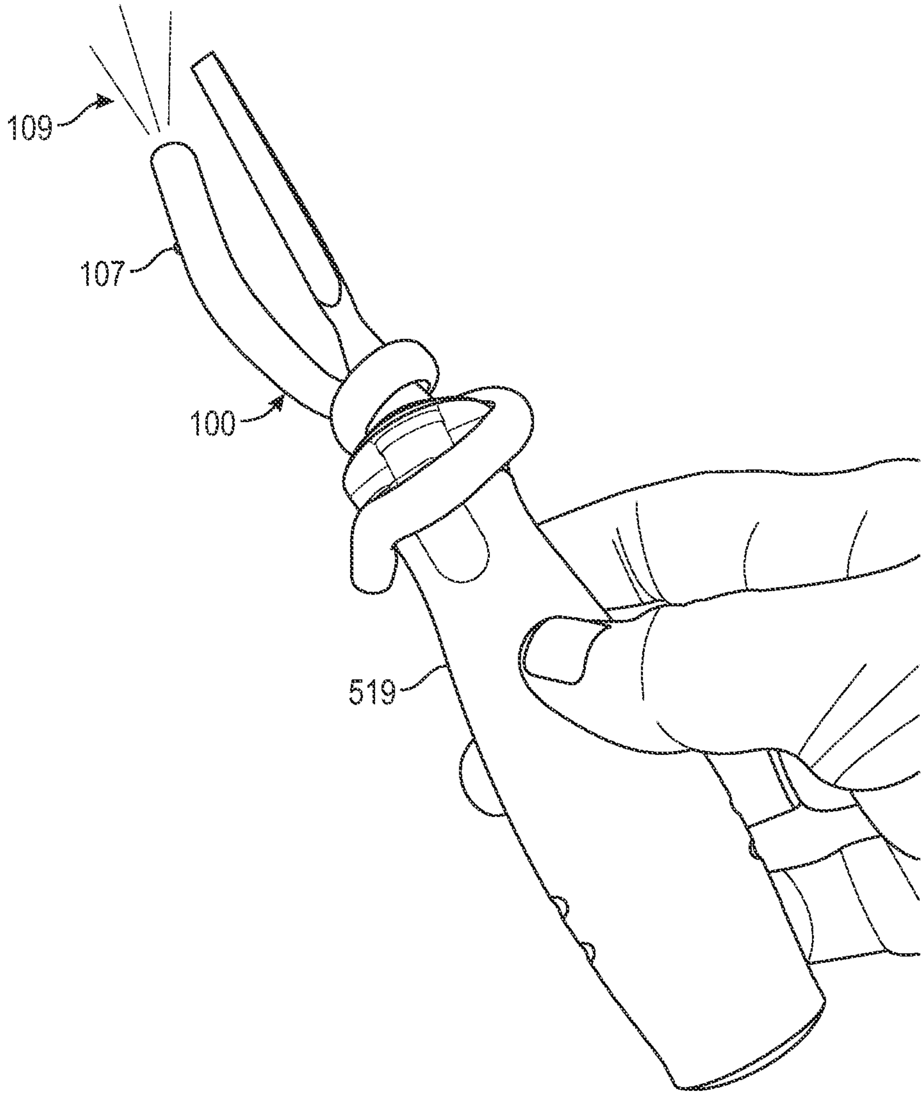
FIG. 5J shows the light assembly from FIG. 1 that is removably attached to a given article, namely, an elongate handheld tool (such as, but not limited to, a screwdriver or a chisel).
Figure 5K:
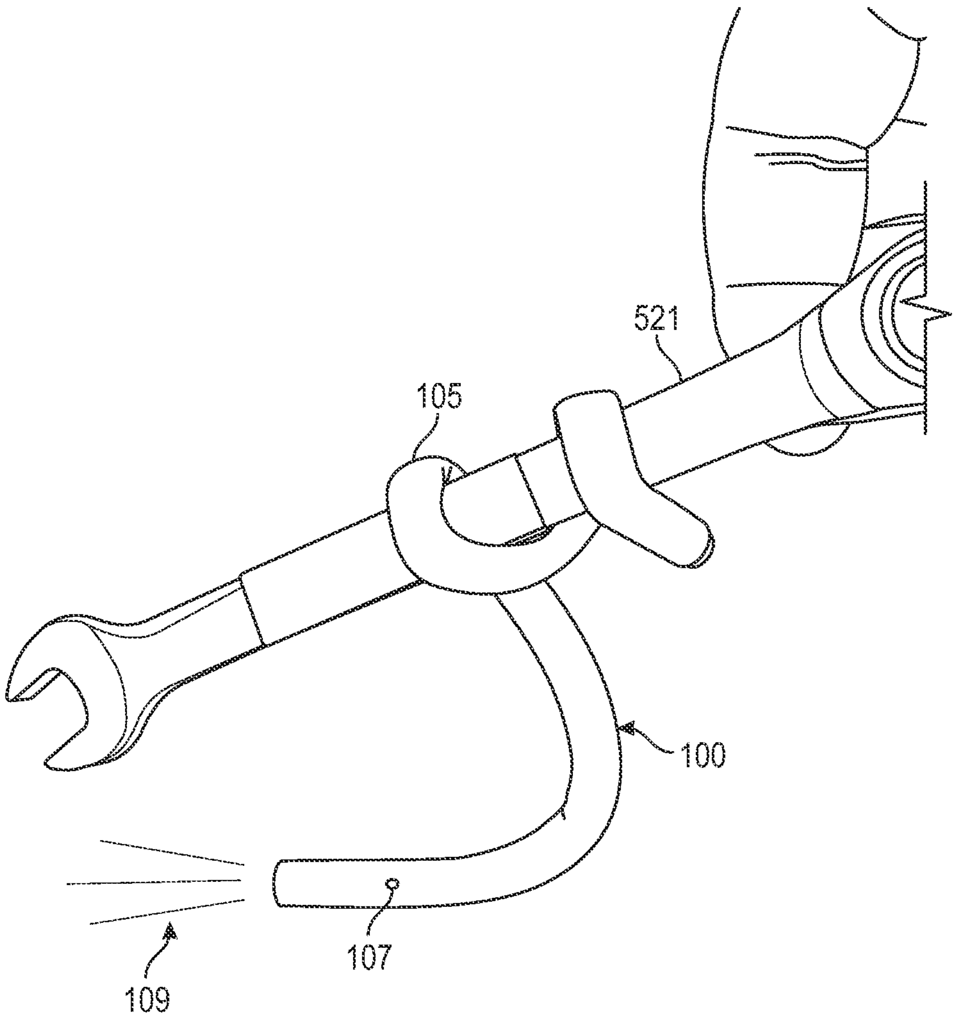
FIG. 5K shows the light assembly from FIG. 1 that is removably attached to a given article, namely, a wrench.
Figure 5L:
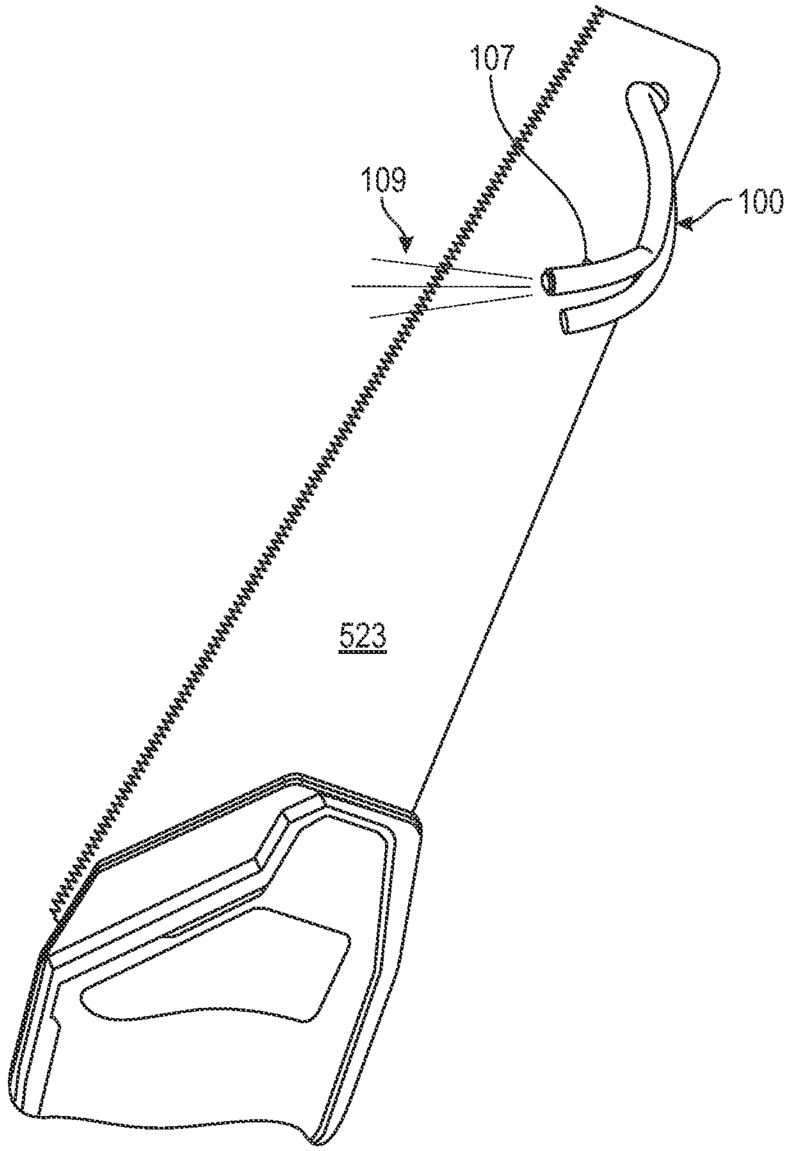
FIG. 5L shows the light assembly from FIG. 1 that is removably attached to a given article, namely, a saw.
Figure 5M:
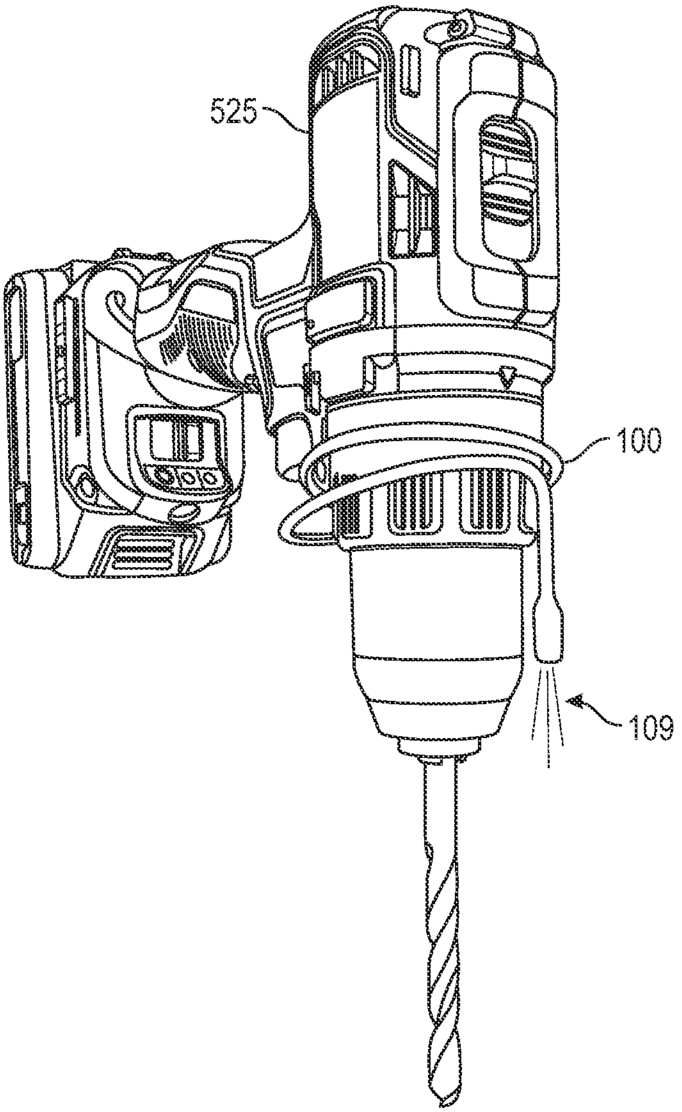
FIG. 5M shows the light assembly from FIG. 1 that is removably attached to a given article, namely, a drill.
Figure 5N:
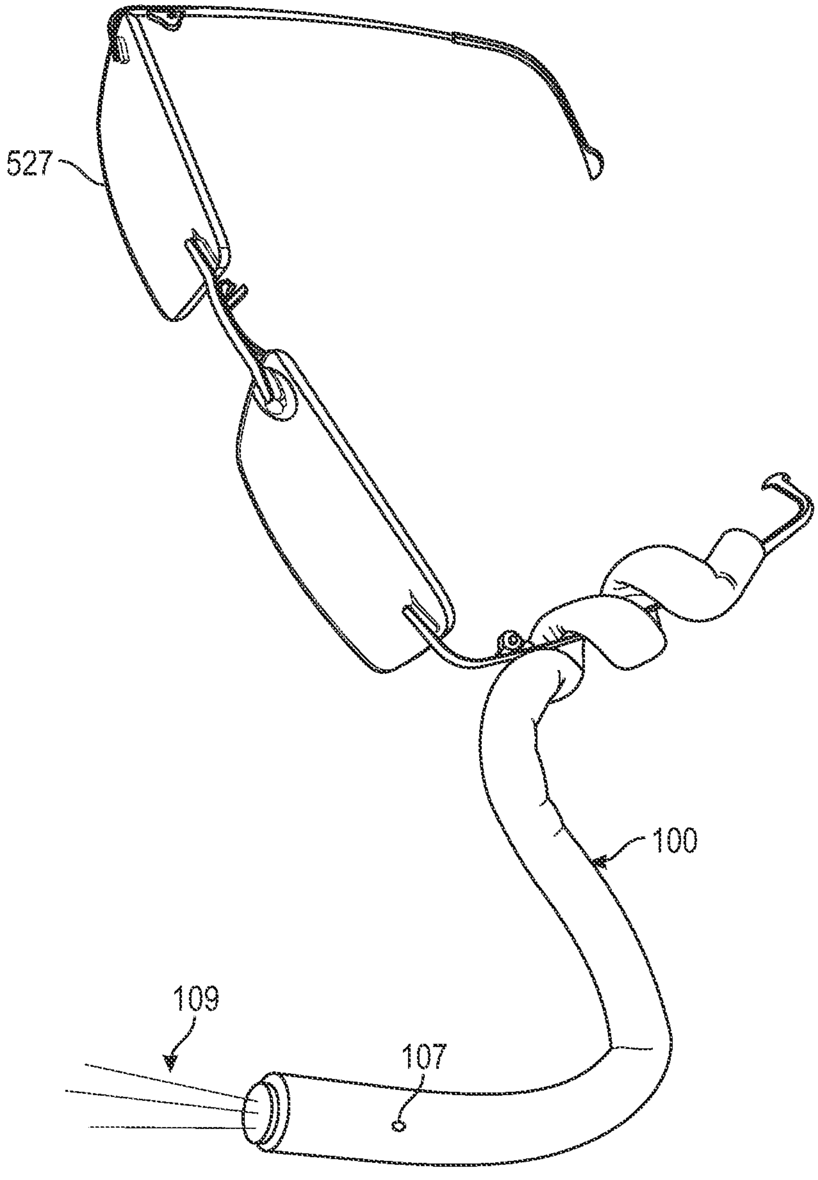
FIG. 5N shows the light assembly from FIG. 1 that is removably attached to a given article, namely, eyeglasses.
Figure 5O:
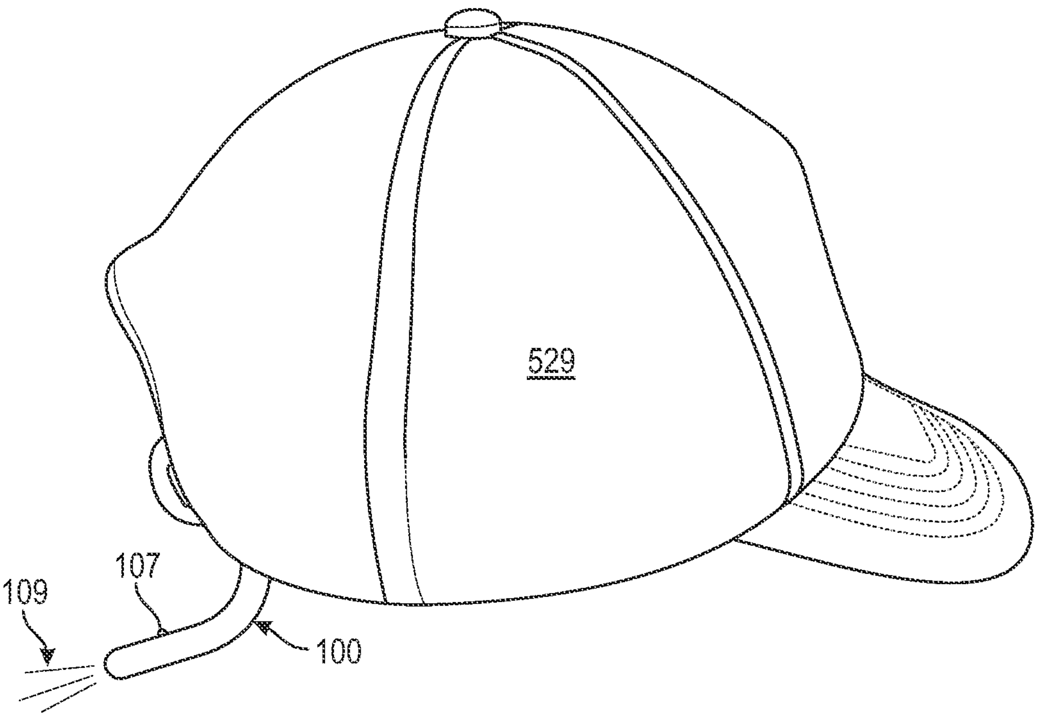
FIG. 5O shows the light assembly from FIG. 1 that is removably attached to a given article, namely, a hat (cap).
Figure 5P:
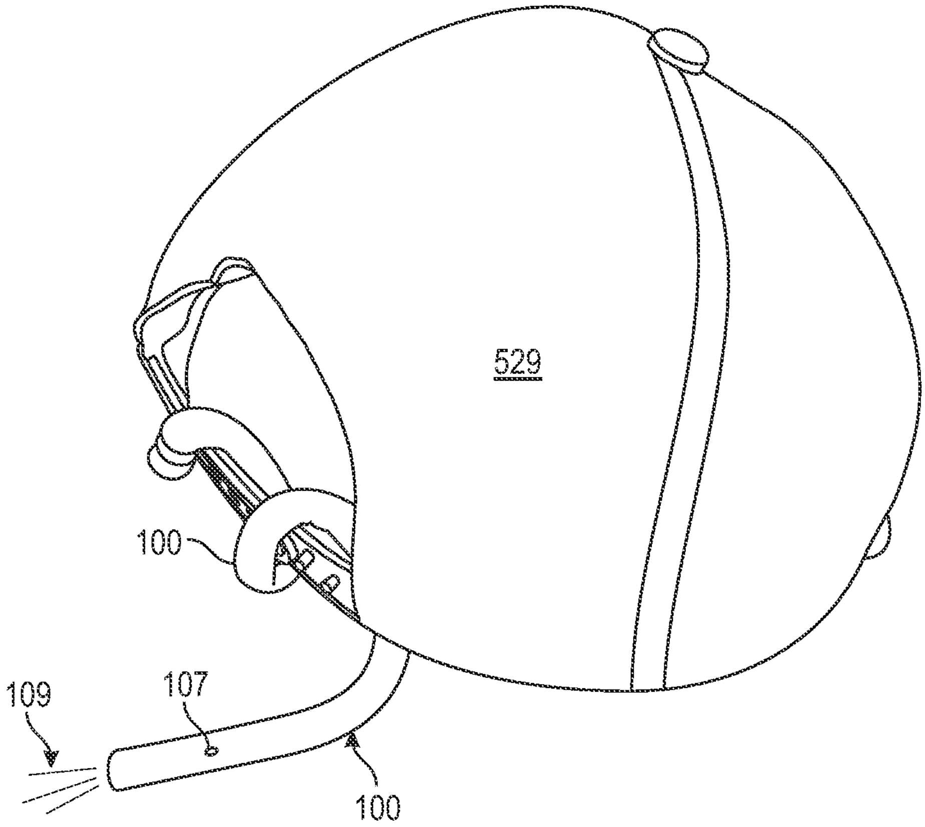
FIG. 5P shows the light assembly from FIG. 1 that is removably attached to a given article, namely, the hat (cap) of FIG. 5O.
Figure 5Q:
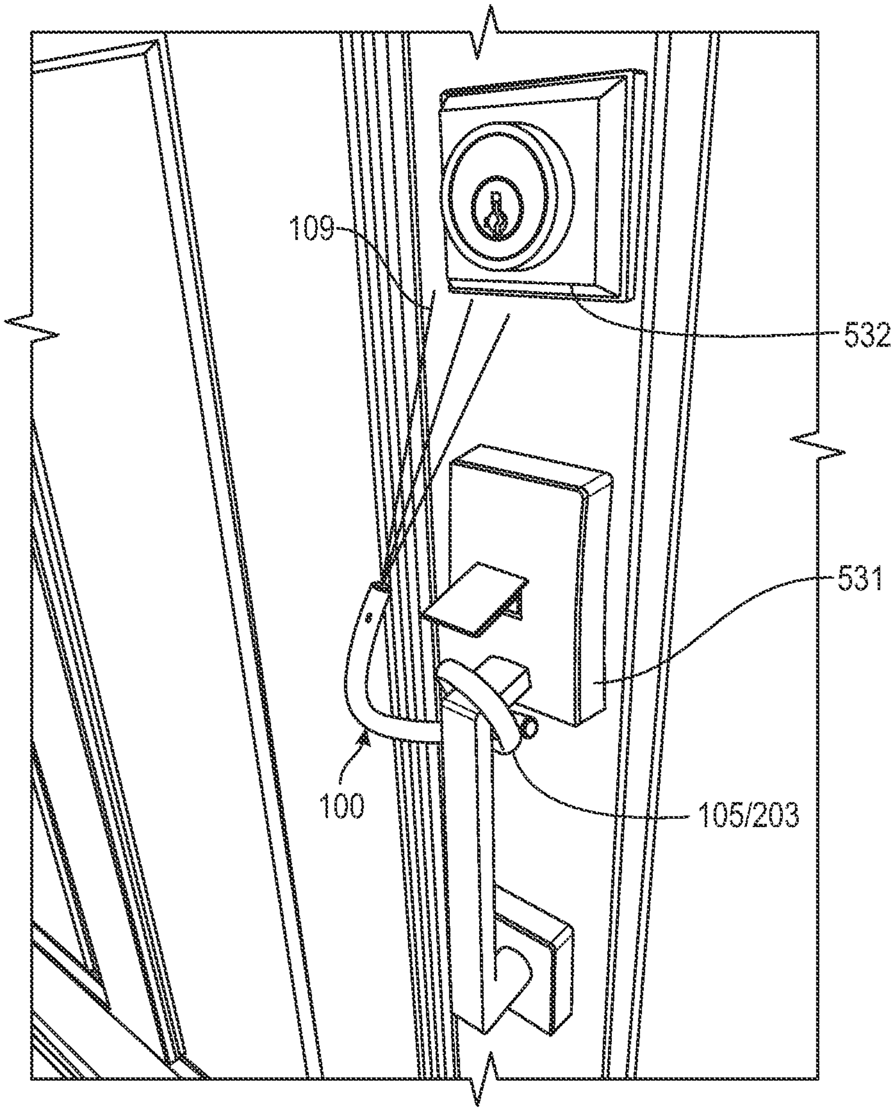
FIG. 5Q shows the light assembly from FIG. 1 that is removably attached to a given article, namely, a door handle.
Figure 5R:
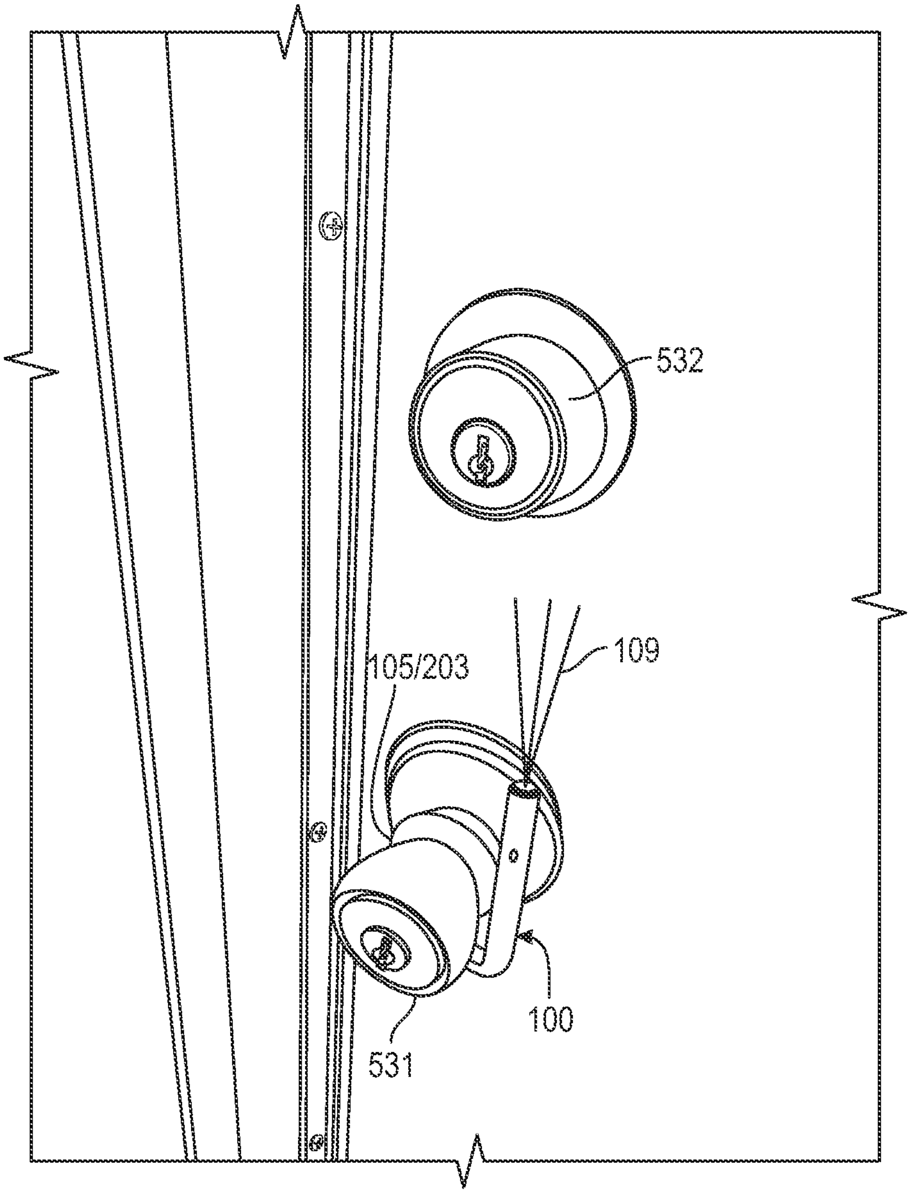
FIG. 5R shows the light assembly from FIG. 1 that is removably attached to a given article, namely, a door knob.
Figure 5S:
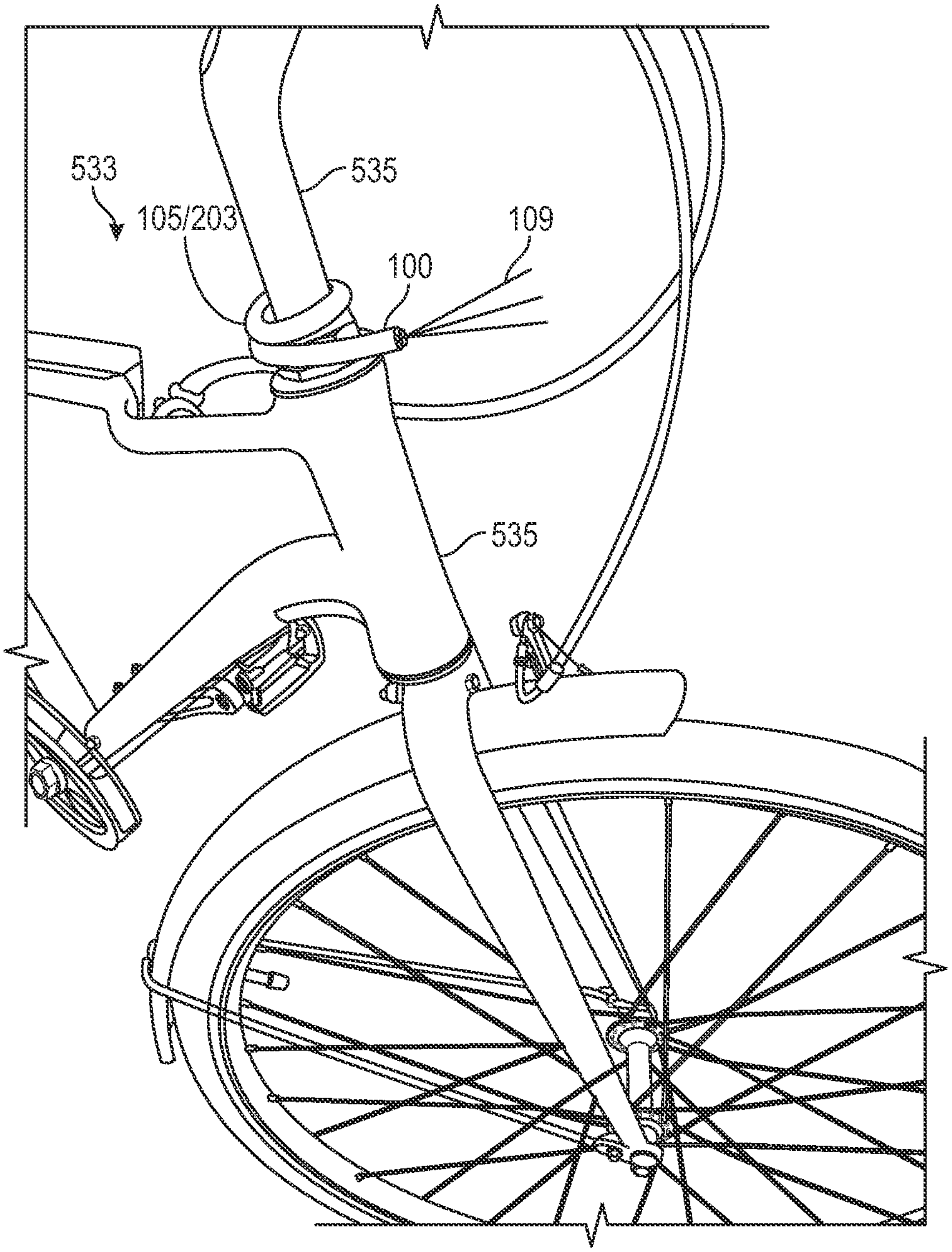
FIG. 5S shows the light assembly from FIG. 1 that is removably attached to a given article, namely, a vehicle, such as, but not limited to a bicycle.
Figure 5T:
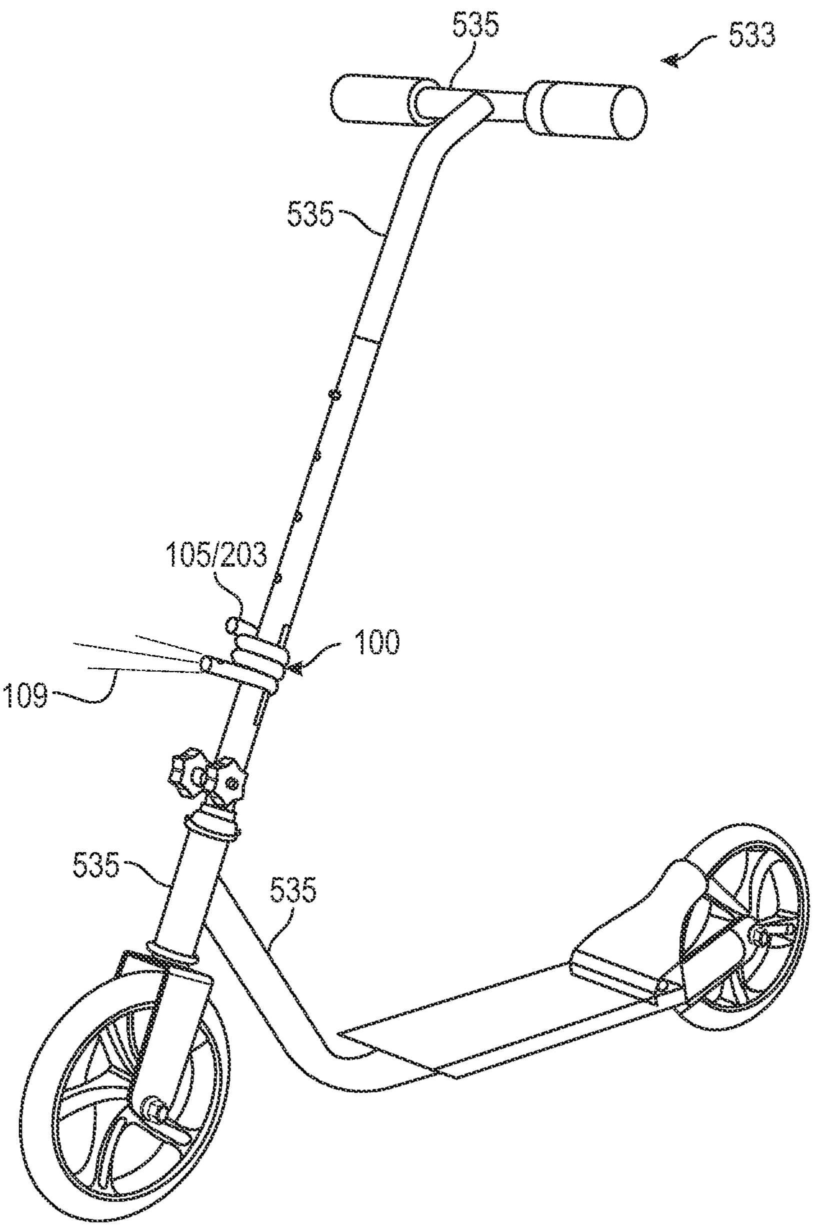
FIG. 5T shows the light assembly from FIG. 1 that is removably attached to a given article, namely, a vehicle, such as, but not limited to, a scooter.
Figure 5U:
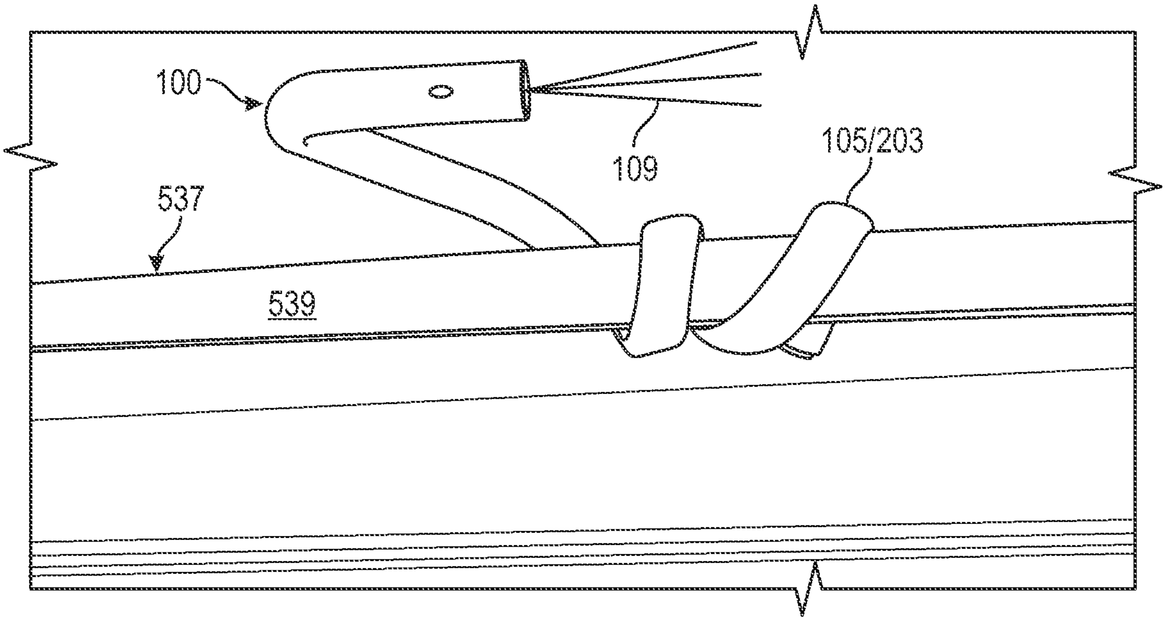
Figure 5V:
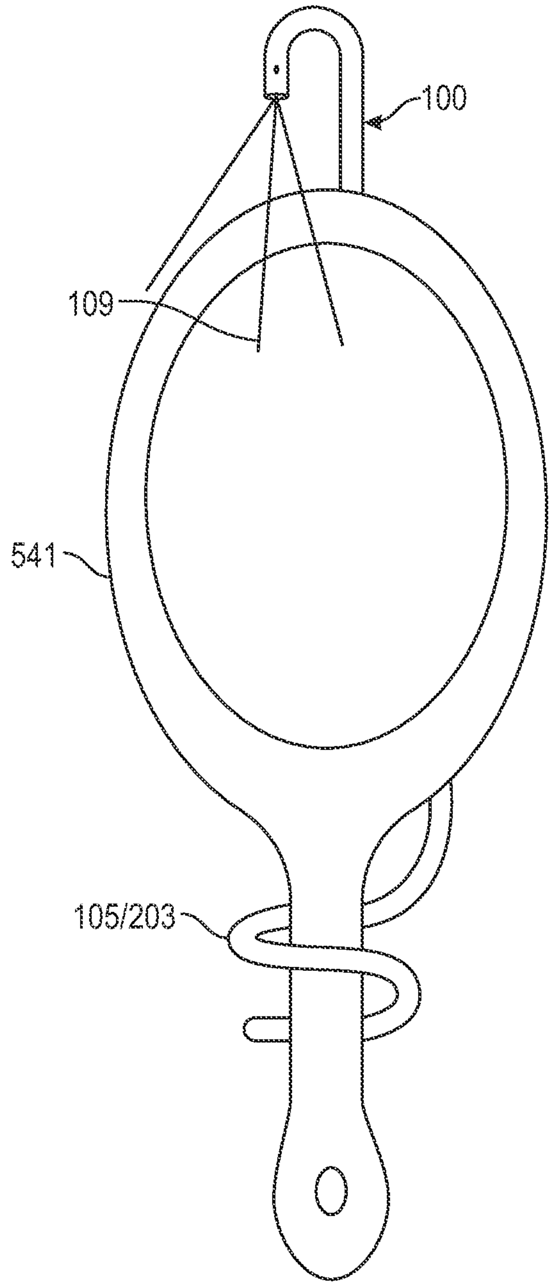
FIG. 5V shows the light assembly from FIG. 1 that is removably attached to a given article, namely, a hand-held mirror.
Figure 5W:
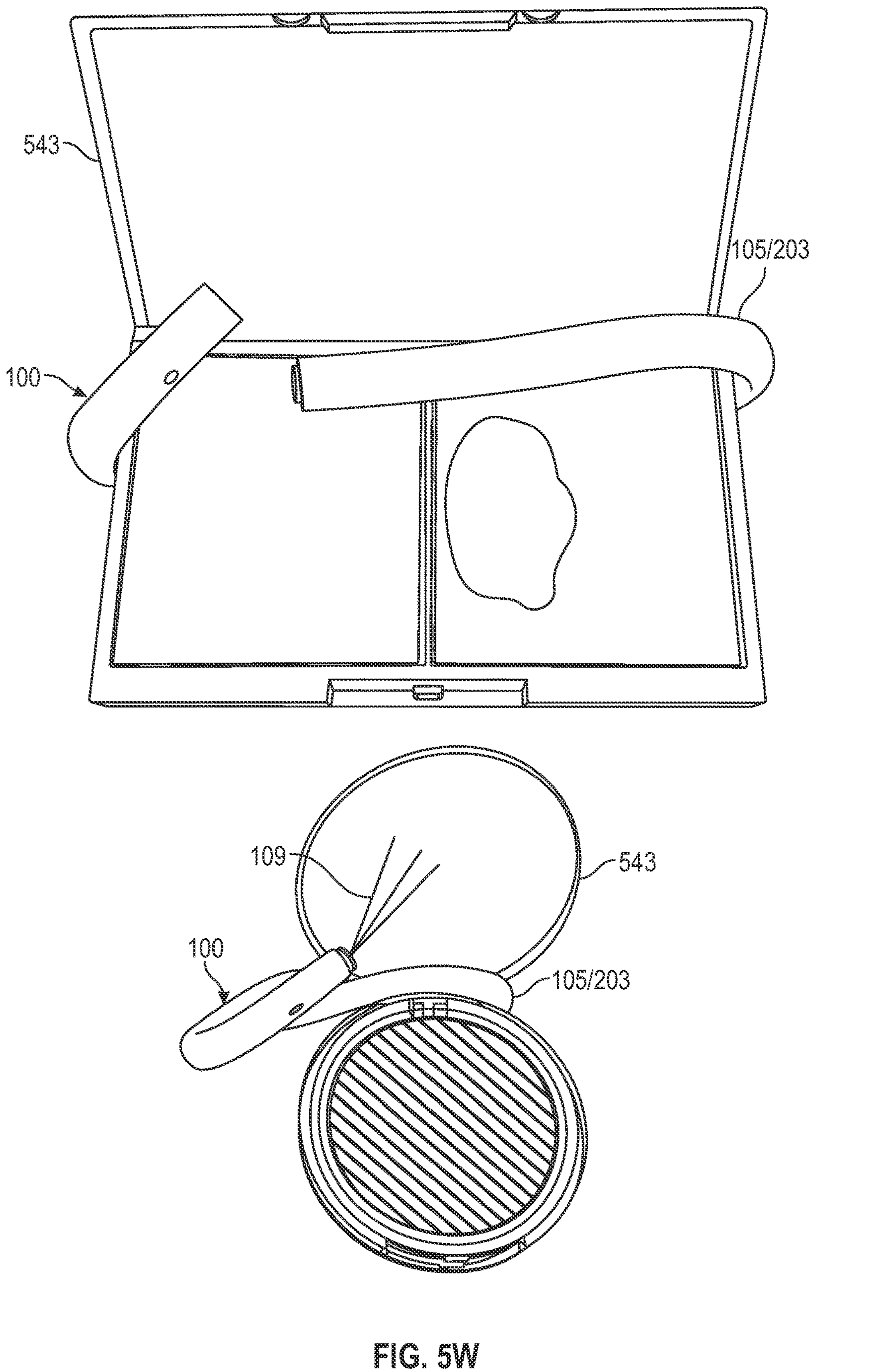

FIG. 5A through FIG. 5W show a given light assembly 100 attached to a variety of example different (hand-held or wearable) articles (tools, implements, and/or the like). Note, the different use applications of light assembly 100 with various example different (hand-held or wearable) articles (tools, implements, and/or the like) shown in FIG. 5A through FIG. 5W are merely non-exhaustive examples. It should be understood that light assembly 100 (because of self-supporting-elongate-member 203) may be removably attached to other different articles that are not shown herein, but that still fall within the scope of the present invention. In general, as long as the given article has a handle, an elongate member portion, a hole (aperture), and/or the like, then a particular light assembly 100 may be constructed that is sized to be removably attachable to that particular given article.

FIG. 5A shows a given light assembly 100 that is removably attached to a given article, namely, a marking implement 501, such as, but not limited to, a pencil, a pen, a marker, a paint brush, a makeup pencil, an eyeliner pencil, and/or the like. In some embodiments, the self-supporting-elongate-member 203 portion of the light assembly 100 may be wrapped around an elongate-member portion of the marking implement 501 to implement the removable attachment of the light assembly 100 to the marking implement 501; and further, the light-module 101 end, of the light assembly 100, may be articulated to shine light in the desired direction.

FIG. 5B shows a given light assembly 100 that is removably attached to a given article, namely, a nail clippers 503. In some embodiments, the self-supporting-elongate-member 203 portion of the light assembly 100 may be wrapped around an elongate-member portion of the nail clippers 503 to implement the removable attachment of the light assembly 100 to the nail clippers 503; and further, the light-module 101 end, of the light assembly 100, may be articulated to shine light in the desired direction. In some embodiments, removable attachment of light assembly 100 to nail clippers 503 may aid in the operation (application) of trimming (cutting) fingernails (and/or toenails), without cutting the skin and/or harming the person who is having their nails trimmed (cut), because light may be shined from light assembly 100 onto the given target work area, particularly for those with small and/or fragile fingernails (and/or toenails), such as, but not limited, to children, small children, babies, infants, toddlers, the elderly, those who benefit from corrective eyewear, and/or the like.

FIG. 5C shows a given light assembly 100 that is removably attached to a given article, namely, a nail polish 505 lid (which is essentially a paint brush). In some embodiments, the self-supporting-elongate-member 203 portion of the light assembly 100 may be wrapped around an elongate-member portion of the nail polish 505 lid to implement the removable attachment of the light assembly 100 to the nail polish 505 lid; and further, the light-module 101 end, of the light assembly 100, may be articulated to shine light in the desired direction.

FIG. 5D shows a given light assembly 100 that is removably attached to a given article, namely, an eye lash curling tool 507. In some embodiments, the self-supporting-elongate-member 203 portion of the light assembly 100 may be wrapped around an elongate-member portion of the eye lash curling tool 507 to implement the removable attachment of the light assembly 100 to the eye lash curling tool 507; and further, the light-module 101 end, of the light assembly 100, may be articulated to shine light in the desired direction.

FIG. 5E shows a given light assembly 100 that is removably attached to a given article, namely, a spray bottle 509. In some embodiments, the self-supporting-elongate-member 203 portion of the light assembly 100 may be wrapped around a neck portion of the spray bottle 509 to implement the removable attachment of the light assembly 100 to the spray bottle 509; and further, the light-module 101 end, of the light assembly 100, may be articulated to shine light in the desired direction.

In some embodiments, the self-supporting-elongate-member 203 portion of the light assembly 100 could also have been be wrapped around a head portion of the spray bottle 509 to implement the removable attachment of the light assembly 100 to the spray bottle 509.

FIG. 5F shows a given light assembly 100 that is removably attached to a given article, namely, scissors 511. In some embodiments, the self-supporting-elongate-member 203 portion of the light assembly 100 may be wrapped around a handle portion of the scissors 511 to implement the removable attachment of the light assembly 100 to the scissors 511; and further, the light-module 101 end, of the light assembly 100, may be articulated to shine light in the desired direction.

In some embodiments, the self-supporting-elongate-member 203 portion of the light assembly 100 could also have been wrapped around an elongate-member portion of the scissors 511 to implement the removable attachment of the light assembly 100 to the scissors 511.

FIG. 5G shows a given light assembly 100 that is removably attached to a given article, namely, shears (snips) 513. In some embodiments, the self-supporting-elongate-member 203 portion of the light assembly 100 may be wrapped around an elongate-member portion of the shears (snips) 513 to implement the removable attachment of the light assembly 100 to the shears (snips) 513; and further, the light-module 101 end, of the light assembly 100, may be articulated to shine light in the desired direction.

In some embodiments, the self-supporting-elongate-member 203 portion of the light assembly 100 could also have been wrapped around a handle portion of the shears (snips) 513 to implement the removable attachment of the light assembly 100 to the shears (snips) 513.

FIG. 5H shows a given light assembly 100 that is removably attached to a given article, namely, (cutting) pliers 515. In some embodiments, the self-supporting-elongate-member 203 portion of the light assembly 100 may be wrapped around an elongate-member portion (and/or handle portion) of the (cutting) pliers 515 to implement the removable attachment of the light assembly 100 to the (cutting) pliers 515; and further, the light-module 101 end, of the light assembly 100, may be articulated to shine light in the desired direction.

FIG. 5I shows a given light assembly 100 that is removably attached to a given article, namely, (gripping) pliers 517. In some embodiments, the self-supporting-elongate-member 203 portion of the light assembly 100 may be wrapped around an elongate-member portion (and/or handle portion) of the (gripping) pliers 517 to implement the removable attachment of the light assembly 100 to the (gripping) pliers 517; and further, the light-module 101 end, of the light assembly 100, may be articulated to shine light in the desired direction.

FIG. 5J shows a given light assembly 100 that is removably attached to a given article, namely, an elongate handheld tool 519, such as, but not limited to, a (manual) screwdriver, a chisel, an awl, a letter opener, a knife, and/or the like. In some embodiments, the self-supporting-elongate-member 203 portion of the light assembly 100 may be wrapped around an elongate-member portion (and/or handle) of the elongate handheld tool 519 to implement the removable attachment of the light assembly 100 to the elongate handheld tool 519; and further, the light-module 101 end, of the light assembly 100, may be articulated to shine light in the desired direction.

FIG. 5K shows a given light assembly 100 that is removably attached to a given article, namely, a wrench 521. In some embodiments, the self-supporting-elongate-member 203 portion of the light assembly 100 may be wrapped around an elongate-member portion (and/or handle) of the wrench 521 to implement the removable attachment of the light assembly 100 to the wrench 521; and further, the light-module 101 end, of the light assembly 100, may be articulated to shine light in the desired direction.

FIG. 5L shows a given light assembly 100 that is removably attached to a given article, namely, a saw 523. In some embodiments, saw 523 may be a manual (or a powered) saw. In some embodiments, a portion of the self-supporting-elongate-member 203 portion of the light assembly 100 may be passed through a hole (aperture) in the saw 523 to implement the removable attachment of the light assembly 100 to the saw 523; and further, the light-module 101 end, of the light assembly 100, may be articulated to shine light in the desired direction.

In some embodiments, the self-supporting-elongate-member 203 portion of the light assembly 100 could also have been wrapped around a handle (and/or elongate member) portion of the saw 523 to implement the removable attachment of the light assembly 100 to the saw 523.

FIG. 5M shows a given light assembly 100 that is removably attached to a given article, namely, a drill 525. In some embodiments, drill 525 may be a powered (or a manual) drill. In some embodiments, the self-supporting-elongate-member 203 portion of the light assembly 100 may be wrapped around an elongate-member portion (handle portion, neck portion, and/or head portion) of the drill 525 to implement the removable attachment of the light assembly 100 to the drill 525; and further, the light-module 101 end, of the light assembly 100, may be articulated to shine light in the desired direction.

FIG. 5N shows a given light assembly 100 that is removably attached to a given article, namely, eyeglasses 527 (such as, but not limited to, corrective eyeglasses, reading glasses, sunglasses, protective eyeglasses, eye loop, and/or the like). In some embodiments, the self-supporting-elongate-member 203 portion of the light assembly 100 may be wrapped around an elongate-member portion (and/or frame) of the eyeglasses 527 to implement the removable attachment of the light assembly 100 to the eyeglasses 527; and further, the light-module 101 end, of the light assembly 100, may be articulated to shine light in the desired direction. In this manner, light assembly 100 may be turned into a reading light.

FIG. 5O and FIG. 5P show a given light assembly 100 that is removably attached to a given article, namely, a hat (cap) 529 (such as, but not limited to, a baseball hat [cap]). In some embodiments, the self-supporting-elongate-member 203 portion of the light assembly 100 may be wrapped around an elongate-member portion (and/or through a hole) of the hat (cap) 529 to implement the removable attachment of the light assembly 100 to the hat (cap) 529; and further, the light-module 101 end, of the light assembly 100, may be articulated to shine light in the desired direction. In this manner, light assembly 100 may be turned into a headlamp. FIG. 5O and FIG. 5P show this hat (cap) 529 with removably attached light assembly 100 from two different perspective viewing angles.

FIG. 5Q shows a given light assembly 100 that is removably attached to a given article, namely, a door-handle-or-knob 531. In some embodiments, at least a portion of the self-supporting-elongate-member 203 portion of the light assembly 100 may be wrapped around an elongate-member portion of the door-handle-or-knob 531 (or that the door-handle-or-knob 531 is attached to) to implement the removable attachment of the light assembly 100 to the doorhandle-or-knob 531; and further, the light-module 101 end, of the light assembly 100, may be articulated to shine light in the desired direction, such as, but not limited to, at a lock 532 for that door (which may make it easier to use that lock 532 in the dark). In some embodiments, door-handle-or-knob 531 may be a door handle, a door knob, a door lever, or the like for interacting with a given door.

FIG. 5R shows a given light assembly 100 that is removably attached to a given article, namely, a door-handle-or-knob 531. In some embodiments, at least a portion of the self-supporting-elongate-member 203 portion of the light assembly 100 may be wrapped around an elongate-member portion of the door-handle-or-knob 531 (or that the door-handle-or-knob 531 is attached to) to implement the removable attachment of the light assembly 100 to the doorhandle-or-knob 531; and further, the light-module 101 end, of the light assembly 100, may be articulated to shine light in the desired direction, such as, but not limited to, at a lock 532 for that door. In some embodiments, door-handle-or-knob 531 may be a door handle, a door knob, a door lever, or the like for interacting with a given door.

FIG. 5S shows a given light assembly 100 that is removably attached to a given article, namely, a vehicle 533. In some embodiments, at least a portion of the self-supporting-elongate-member 203 portion of the light assembly 100 may be wrapped around an elongate-member 535 portion of the vehicle 533 to implement the removable attachment of the light assembly 100 to the vehicle 533. In some embodiments, the light-module 101 end, of the light assembly 100, may be articulated to shine light in a desired direction, to be used as a flashlight, vehicle headlight, taillight, and/or to make a user (rider) of vehicle 533 more visible (such as, but not limited to, at nighttime or in the dark). In some embodiments, vehicle 533 may be a vehicle that is ridden by a user (e.g., a person and/or a rider). In some embodiments, vehicle 533 may be a unicycle, a bicycle, a tricycle, a quadricycle, a scooter, and/or the like. In some embodiments, any wheels of vehicle 533 may be replaced with sleds, skis, skids, and/or tracks. In some embodiments, vehicle 533 may be person (rider) powered, battery and electrical motor powered, solar and electrical motor powered, wind powered, combustion fuel and engine powered, combinations thereof, and/or the like. In some embodiments, elongate-member 535 may be an elongate member portion of vehicle 533, such as, but not limited to, a portion of: a frame, a tube, a wire, a handlebar, a stem, a fork, a down tube, a top tube, a seat tube, a seat stay, a chain stay, a spoke, a fender, a portion thereof, combinations thereof, and/or the like.

FIG. 5S shows a given light assembly 100 that is removably attached to a given article, namely, a vehicle 533. In some embodiments, at least a portion of the self-supporting-elongate-member 203 portion of the light assembly 100 may be wrapped around an elongate-member 535 portion of the vehicle 533 to implement the removable attachment of the light assembly 100 to the vehicle 533. In some embodiments, the light-module 101 end, of the light assembly 100, may be articulated to shine light in a desired direction, to be used as a flashlight, vehicle headlight, taillight, and/or to make a user (rider) of vehicle 533 more visible (such as, but not limited to, at nighttime or in the dark). In some embodiments, vehicle 533 may be a vehicle that is ridden by a user (e.g., a person and/or a rider). In some embodiments, vehicle 533 may be a scooter, a unicycle, a bicycle, a tricycle, a quadricycle, and/or the like. In some embodiments, any wheel of vehicle 533 may be replaced with sleds, skis, skids, and/or tracks. In some embodiments, vehicle 533 may be person (rider) powered, battery and electrical motor powered, solar and electrical motor powered, wind powered, combustion fuel and engine powered, combinations thereof, and/or the like. In some embodiments, elongate-member 535 may be an elongate member portion of vehicle 533, such as, but not limited to, a portion of: a handle, a handle grip, an upper steering column, a lower steering column, a headtube, a deck, a clamp, a frame, a tube, a wire, a handlebar, a stem, a fork, a down tube, a top tube, a seat tube, a seat stay, a chain stay, a spoke, a fender, a portion thereof, combinations thereof, and/or the like.

FIG. 5U shows a given light assembly 100 that is removably attached to a given article, namely, an animal-tack 537 (or tack 537 for use with animal(s)). Note, in FIG. 5U only a portion of animal-tack 537 may be shown. In some embodiments, animal-tack 537 may be selected from at least one of: a leash, a lead, a gentle lead, a collar, a harness, a bridle, a halter, a saddle, a saddlebag, a stirrup, a strap, a girth, a yoke, a muzzle, a portion thereof, and/or the like. In some embodiments, at least a portion of the self-supporting-elongate-member 203 portion of the light assembly 100 may be wrapped around an elongate-member 539 portion of the animal-tack 537 to implement the removable attachment of the light assembly 100 to the animal-tack 537. In some embodiments, the light-module 101 end, of the light assembly 100, may be articulated to shine light in a desired direction, to be used as a flashlight and/or to make the given animal more visible (such as, but not limited to, at nighttime or in the dark). In some embodiments, removable attachment of light assembly 100 to elongate-member 539 of animal-tack 537 may make nighttime walking of the given animal (pet) safer. In some embodiments, the given animal (pet) that may use animal-tack 537 may be selected from: a vertebrate animal, a mammal, a dog, a cat, a horse, a livestock animal, a reptile, a bird, a primate, a human, and/or the like. In some embodiments, the given animal may be a pet. In some embodiments, elongate-member 539 may be an elongate member portion of the animal-tack 537. In some embodiments, elongate-member 539 may be an elongate member portion of the animal-tack 537 that is flexible, bendable, and/or the like.

FIG. 5V shows a given light assembly 100 that is removably attached to a given article, namely, a hand-held-mirror 541 (or hairbrush). In some embodiments, at least a portion of the self-supporting-elongate-member 203 portion of the light assembly 100 may be wrapped around an elongate-member portion of hand-held-mirror 541 (or hairbrush) to implement the removable attachment of the light assembly 100 to the hand-held-minor 541 (or hairbrush); and further, the light-module 101 end, of the light assembly 100, may be articulated to shine light in a desired direction.

FIG. 5W shows two side by side makeup compact cases 543 (or wallets 543) (a rectangular one and a circular one) or the like, with each having its own light assembly 100 that is removably attached to the given makeup compact case 543 (or wallet 543) or the like. In some embodiments, at least a portion of the self-supporting-elongate-member 203 portion of the light assembly 100 may be wrapped around a portion of the makeup compact case 543 (or wallet 543) or the like to implement the removable attachment of the light assembly 100 to the makeup compact case 543 (or wallet 543) or the like; and further, the light-module 101 end, of the light assembly 100, may be articulated to shine light in a desired direction.

In some embodiments, with respect to a given article that a given light assembly 100 may be removably attached to, such as, but not limited to the articles shown in FIG. 5A through FIG. 5W, the given article may be selected from: a hand tool, a marking implement, a pencil, a pen, a marker, a highlighter, a brush, a makeup brush, a nail clipper, a lid of a nail polish container, an eyelash curler, a spray bottle, a cutting implement, scissors, shears, pliers, a screwdriver, a chisel, a wrench, a saw, a power tool, a drill, eyeglasses, sunglasses, a hat, a cap, a door-handle, a door-knob, a door-lever, a vehicle, a bicycle, a scooter, tack for an animal, a leash, a lead, a gentle lead, a collar, a harness, a bridle, a halter, a saddle, a saddlebag, a stirrup, a strap, a girth, a yoke, a muzzle, a hand held mirror, a makeup compact case, a wallet, an elongate-member, a frame member, a tube (tubular member), a wire, a portion thereof, combinations thereof, and/or the like.

Figure 6A:
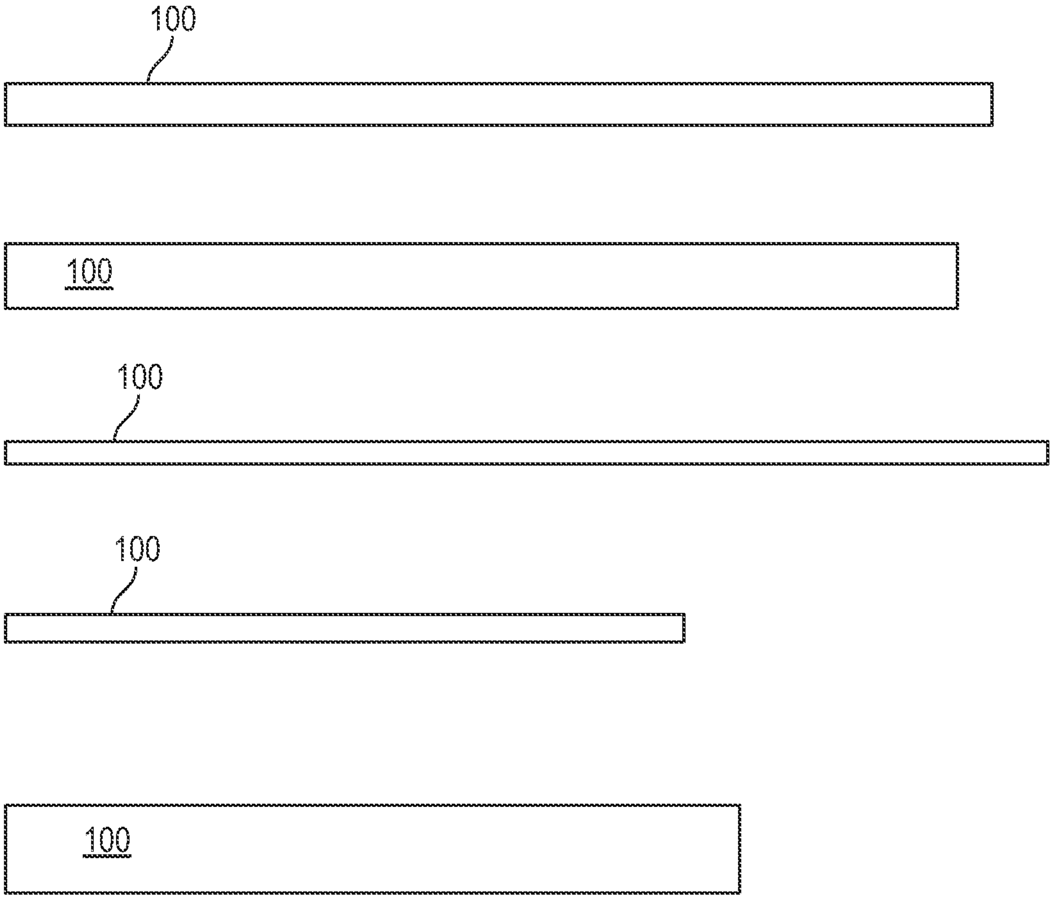
FIG. 6A is a schematic block diagram showing a plurality of light assemblies of different sizes (dimensions) with respect to overall length and/or with respect to overall width (diameter [gauge]).

FIG. 6A is a schematic block diagram showing a plurality of light assemblies 100 of different sizes (dimensions) with respect to overall length and/or with respect to overall width (diameter [gauge]). In some embodiments, once a given light assembly 100 has been manufactured, its overall length and/or its overall width (diameter [gauge]) may be at least one of: fixed, finite, predetermined, non-variable, combinations thereof, and/or the like. However, two or more different light assemblies 100 of may be manufactured such that the overall lengths and/or the overall widths (diameters [gauges]) may be different from each other, but otherwise, still fixed, finite, predetermined, non-variable, combinations thereof, and/or the like.

In some embodiments, a given light assembly 100 may be manufactured to have an overall length selected from: twenty-four (24) inches to eight (8) inches, when the intended application cases are for removable attachment to handheld and/or wearable articles (e.g., as shown in FIG. 5A to FIG. 5W)—anything longer or shorter than this range may be undesirable for such application use cases.

In some embodiments, a given light assembly 100 may be manufactured to have an overall length selected from: eighteen (18) inches to twelve (12) inches, when the intended application cases are for removable attachment to handheld and/or wearable articles (e.g., as shown in FIG. 5A to FIG. 5W)—anything longer or shorter than this range may be undesirable for such application use cases.

In some embodiments, a given light assembly 100 may be manufactured to have an overall outside diameter (width) selected from: one-eighth (⅛ [0.125]) inches to three-eighths (⅜ [0.375]) inches, when the intended application cases are for removable attachment to handheld and/or wearable articles (e.g., as shown in FIG. 5A to FIG. 5W)—anything wider or thinner than this range may be undesirable for such application use cases.

Figure 6B:
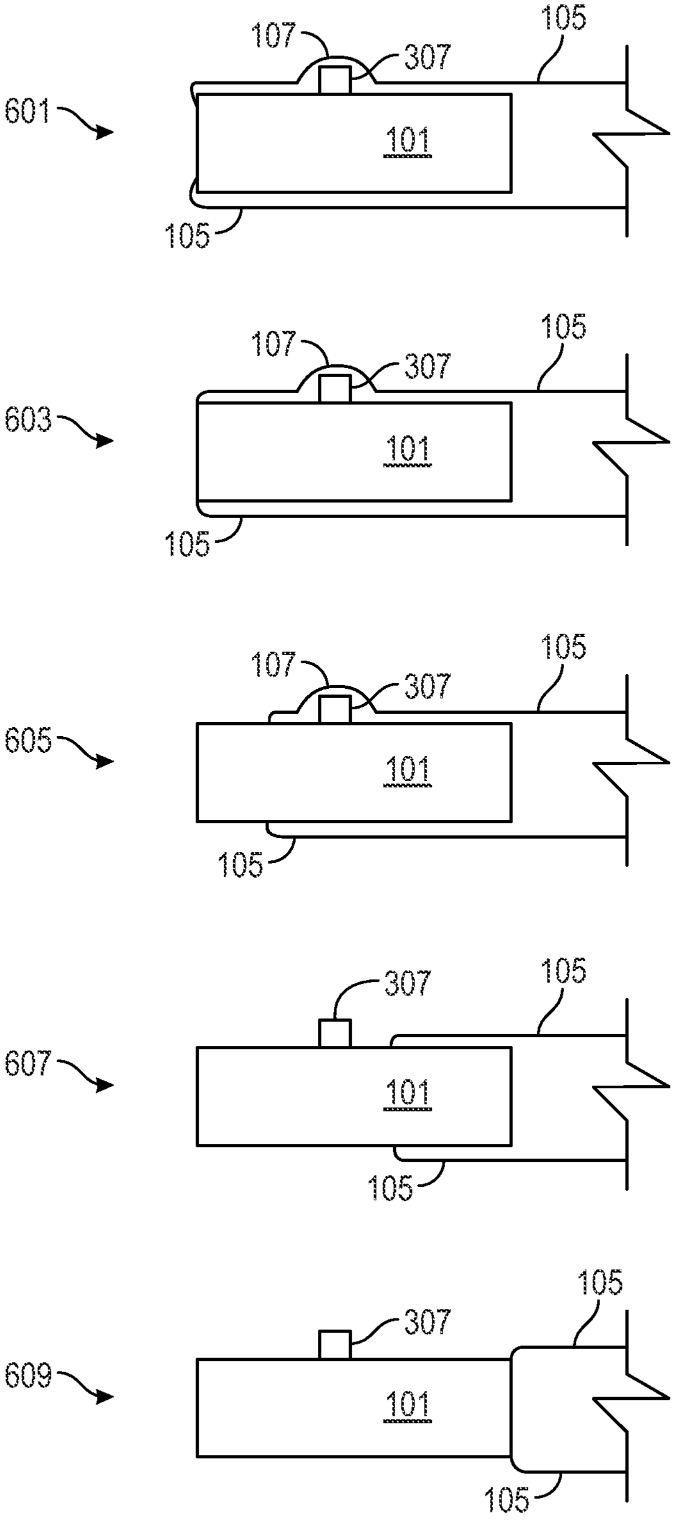
FIG. 6B is a schematic block diagram showing a plurality of different light-modules terminal ends portions of a plurality of different light assemblies.

FIG. 6B is a schematic block diagram showing a plurality of different light-modules 101 terminal ends portions of a plurality of different light assemblies 100. In FIG. 6B only the different light-modules 101 terminal ends portions of the plurality of different light assemblies 100 may be shown; i.e., FIG. 6B does not focus on showing the portions of the coverings (sheaths) 105 that may be covering over the different self-supporting-elongate-members 203 of each of the plurality of different light assemblies 100. At least one purpose of FIG. 6B may be to show relationships between how covering (sheath) 105 might cover over at least a portion of a given light-module 101 in various embodiments of light assemblies 100.

Continuing discussing FIG. 6B, in some embodiments, in a first-embodiment 601, covering (sheath) 105 may be entirely cover over all of the sidewalls of a light-module 101, i.e., covering (sheath) 105 may cover over all of that light-module 101 except for a region of that light-module 101 that emits light (from its light-source(s) 301). In some embodiments, in the first-embodiment 601, a portion of the covering (sheath) 105 may extend past a terminal end of light-module 101 that emits light (from its light-source(s) 301) from that particular terminal end. In some embodiments, in the first-embodiment 601, covering (sheath) 105 may cover over at least a portion of interface 307 of that light-module 101, to form bulge 107 on an exterior location of covering (sheath) 105.

Continuing discussing FIG. 6B, in some embodiments, in a second-embodiment 603, covering (sheath) 105 may be entirely cover over the sidewalls of a light-module 101, i.e., covering (sheath) 105 may cover over all of that light-module 101 except for the region of that light-module 101 that emits light (from its light-source(s) 301). In some embodiments, in the second-embodiment 603, a portion of the covering (sheath) 105 may extend up to (but not past) the terminal end of light-module 101 that emits light (from its light-source(s) 301) from that particular terminal end. In some embodiments, in the second-embodiment 603, covering (sheath) 105 may cover over at least a portion of interface 307 of that light-module 101, to form bulge 107 on an exterior location of covering (sheath) 105.

Continuing discussing FIG. 6B, in some embodiments, in a third-embodiment 605, covering (sheath) 105 may be entirely cover over most, but all of, the sidewalls of a light-module 101, i.e., covering (sheath) 105 may cover over most, but not all, of that light-module 101 and the region of that light-module 101 that emits light (from its light-source(s) 301) may remain devoid of covering (sheath) 105. In some embodiments, in the third-embodiment 605, a portion of the covering (sheath) 105 may cover over at least most of the exterior sidewalls of light-module 101. In some embodiments, in the third-embodiment 605, covering (sheath) 105 may cover over at least a portion of interface 307 of that light-module 101, to form bulge 107 on an exterior location of covering (sheath) 105. In some embodiments, the first-embodiment 601, the second-embodiment 603, and/or the third-embodiment 605 may support that covering (sheath) 105 may cover over at least most of an exterior (of sidewalls) of a given light-module 101.

Continuing discussing FIG. 6B, in some embodiments, in a fourth-embodiment 607, covering (sheath) 105 may be entirely cover over at least a portion of the sidewalls of a light-module 101, i.e., covering (sheath) 105 may cover over at least a portion of that light-module 101 and the region of that light-module 101 that emits light (from its light-source(s) 301) may remain devoid of covering (sheath) 105. In some embodiments, in the fourth-embodiment 607, a portion of the covering (sheath) 105 may cover over some of the exterior sidewalls of light-module 101. In some embodiments, in the fourth-embodiment 607, a portion of the covering (sheath) 105 may cover over some, such as half or less, of the exterior sidewalls of light-module 101. In some embodiments, in the fourth-embodiment 607, covering (sheath) 105 may not cover over at least a portion of interface 307 of that light-module 101, such that in the fourth-embodiment 607 there may be no bulge 107 on an exterior location of covering (sheath) 105.

Continuing discussing FIG. 6B, in some embodiments, in a fifth-embodiment 609, covering (sheath) 105 may run to and abut a terminal end of light-module 101 that is disposed away from the terminal end of that light-module 101 that emits light. In some embodiments, in the fifth-embodiment 609, covering (sheath) 105 may not cover over light-module 101. In some embodiments, in the fifth-embodiment 609, covering (sheath) 105 may not cover any exterior portion of light-module 101. In some embodiments, in the fifth-embodiment 609, covering (sheath) 105 may not cover over at least a portion of interface 307 of that light-module 101, such that in the fourth-embodiment 607 there may be no bulge 107 on an exterior location of covering (sheath) 105.

Figure 6C:
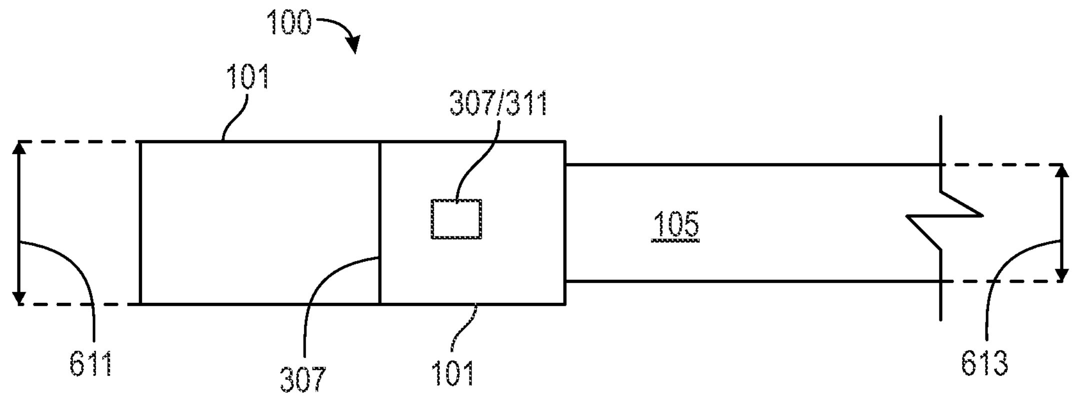
FIG. 6C shows a schematic block diagram of one terminal end region (portion of a given) light assembly (light-with-adjustable-tail-for-articles) that only shows the light-module 101 end and its attached covering (sheath) portion according to an embodiment of the present invention (i.e., the entirety of the light assembly is now shown in FIG. 6C).

FIG. 6C shows a schematic block diagram of one terminal end region (portion of a given) light assembly 100 (light-with-adjustable-tail-for-articles 100) that only shows the light-module 101 end and its attached covering (sheath) 105 portion according to an embodiment of the present invention. The opposing terminal end of light assembly 100 (i.e., the other end of covering (sheath) 105) is not shown in FIG. 6C. In some embodiments, a diameter 611 of light-module 101 may be the same or larger than a diameter 613 of covering (sheath) 105. In some embodiments, interface 307 and/or port 311 may be located and/or accessible from an exterior side wall portion(region) of light-module 101. In some embodiments, interface 307 may be interfaced by twisting (e.g., clockwise or counterclockwise) one terminal end of light-module 101 in an opposite direction from the other end of light-module 101 (such a twisting operation of interface 307 is also shown in FIG. 9).

FIG. 7A through FIG. 7I shows a variety of prior art light devices that differ from light assembly 100.

Figure 7A:
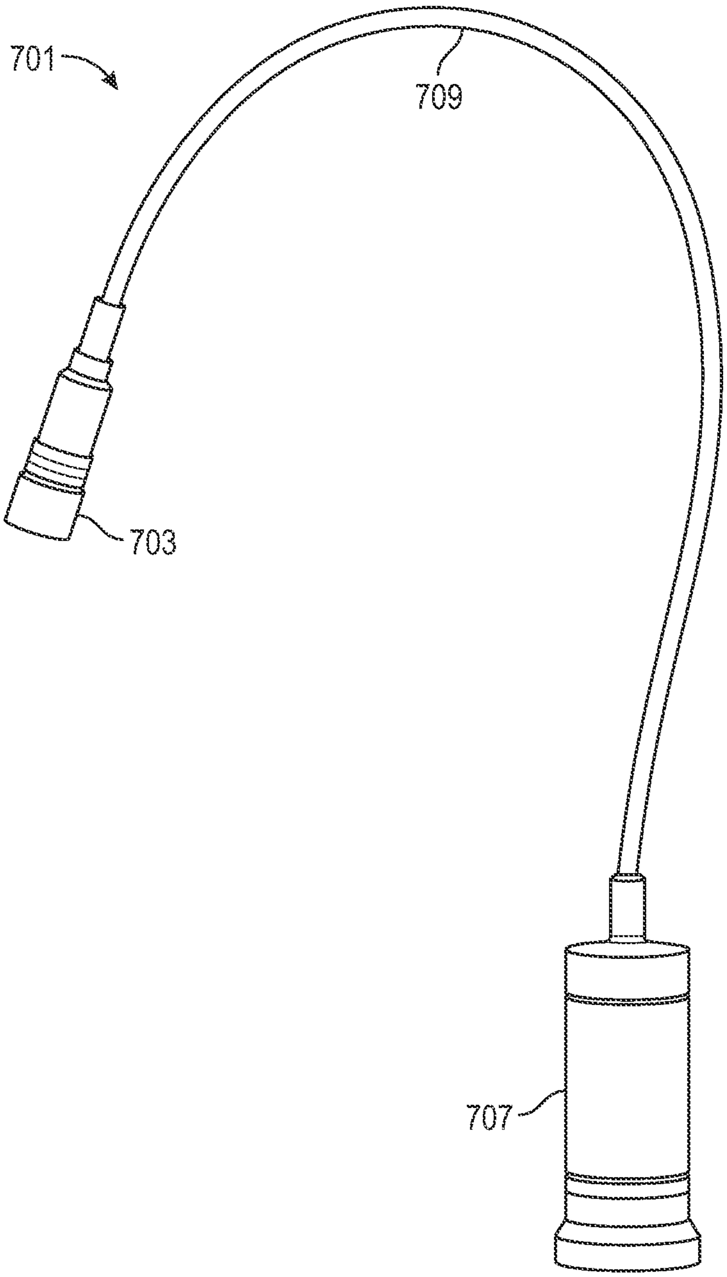
FIG. 7A (Prior Art)
FIG. 7A shows a prior art light device, that has its light-source separated from its power-source in a base-member, via a flexible-neck.
Figure 7B:
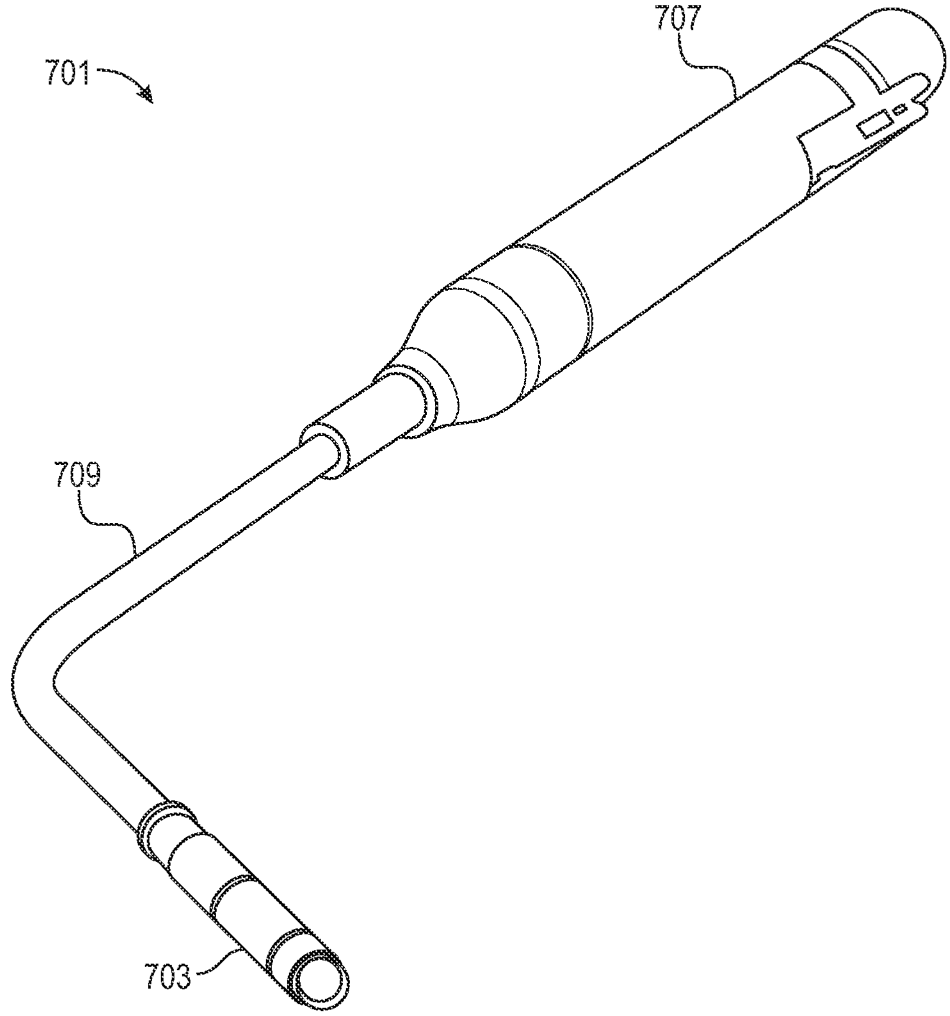
FIG. 7B (Prior Art)
FIG. 7B shows a prior art light device, that has its light-source separated from its power-source in a base-member, via a flexible-neck.

FIG. 7A and FIG. 7B show essentially a same prior art light device 701, that has its light-source 703 separated from its power-source in a base-member 707, via a flexible-neck 709. In light device 701, light-source 703 is located at one terminal end region and its base-member 707, with its power-source therein, are located at the other oppositely disposed terminal end region, and with its flexible-neck 709 then linking light-source 703 to base-member 707. Flexible-neck 709 is elongate, flexible, and houses electronics of light device 701, such as, wires and/or cables.

Prior art light device 701 differs from light assembly 100 in several ways. First, in light device 701, there are electronics, such as, wires and/or cables, within the flexible-neck 709. In light device 701, its electronics spans the entire length of light device 701. Whereas, the self-supporting-elongate-member 203 in light assembly 100 is completely devoid of any electronics; and/or the self-supporting-elongate-member 203 in light assembly 100 never carries any electrical current and is never operatively connected to power-source 305. In light assembly 100, its electronics are asymmetrically disposed, only occupying one terminal end region of the overall light assembly 100, with the majority of the overall length of light assembly 100 being completely devoid of electronics. In some embodiments, a length of light-module 101 may be selected from three (3) inches to one-half (0.5) inch, and with the remained of length of that light assembly 100 being for the self-supporting-elongate-member 203, which may have a length selected from five (5) inches to twenty-three and one-half (23.5) inches.

Second, in light device 701, the electronics enclosures have varying diameters, that is, the flexible-neck 709 (with its electronics) is skinnier than both the light-source 703 and the base-member 707, and the light-source 703 is skinnier than the base-member 707. Whereas, in light assembly 100 its light-module 101 (the only component with electronics) has a uniform, constant, consistent, non-varying diameter, and/or the like (aside for possibly interface 307, bulge 107, and/or port 311). In light assembly 100 its light-module 101 enclosure 309 has a diameter that is at least substantially (mostly) uniform, constant, consistent, non-varying diameter, and/or the like.

Third, in light device 701, with respect to an overall length of light device 701, its outside diameter varies considerably along that overall length, with a diameter of its light-source 703 that is wider than a diameter of its flexible-neck 709, and with a diameter of the base-member 707 that is wider than the diameter of its light-source 703 and also wider than the diameter of its flexible-neck 709. Whereas, in light assembly 100, with respect to its overall length, its outside diameter is fixed, constant, consistent, and/or non-varying along at least most (a majority) of its overall length.

Fourth, in light device 701, the entirety of light device 701 may be vertically self-supported by its base-member 707, i.e., a bottom of its base-member 707 may rest on top of flat substrate (like a tabletop) and the rest of light device 701 may be held self-supporting in a vertical upright manner by its base-member 707. Whereas, light assembly 100 has no such equivalent base structure, i.e., a terminal end of light assembly 100 cannot rest on top of a flat surface with its remainder being held vertically upright—light assembly 100 would simply just fall over if this were attempted.

Fifth, in light device 701, its base-member 707, that occupies one terminal end region disposed oppositely from its light-source 703, is not able to be bent, flexed, and/or articulated; rather, its base-member 707 is completely rigid and elongate. Whereas, the terminal end disposed opposite from the light-module 101 in light assembly 100 is configured to be bent, flexed, and/or articulated.

Sixth, in light device 701, its covering (sheath) only covers over its flexible-neck 709 and not its light-source 703 nor its base-member 707 (and not its power-source). Whereas, in light assembly 100 its covering (sheath) 105 covers at least most to all of its self-supporting-elongate-member 203 and also may at least partially to mostly cover over its light-module 101.

Figure 7C:
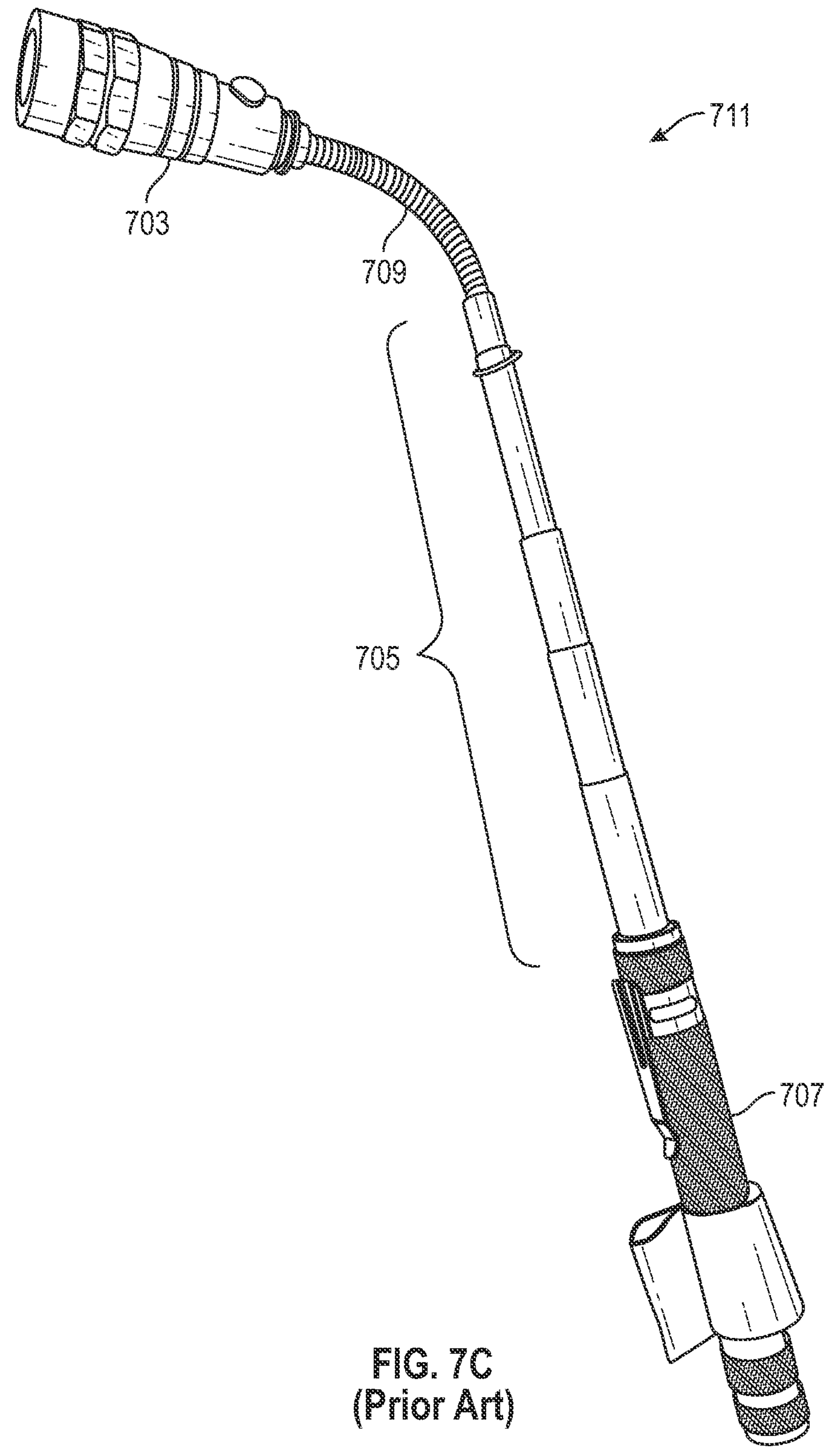
FIG. 7C (Prior Art)
FIG. 7C shows a prior art light device, that has its light-source separated from its power-source in a base-member, via both a flexible-neck region and a telescoping-neck region.

FIG. 7C shows a prior art light device 711, that has its light-source 703 separated from its power-source in a base-member 707, via a flexible-neck 709 region and via a telescoping-neck 705 region. In light device 711, light-source 703 is located at one terminal end region and its base-member 707, with its power-source therein, are located at the other oppositely disposed terminal end region, and with its flexible-neck 709 and its telescoping-neck 705 then linking light-source 703 to base-member 707. Flexible-neck 709 is attached to light-source 703 at one terminal end and to telescoping-neck 705 at the other terminal end of flexible-neck 709. Telescoping-neck 705 is attached to flexible-neck 709 at one terminal end of telescoping-neck 705 and to base-member 707 at the other terminal end of telescoping-neck 705. Telescoping-neck 705 is a linear member that is configured to telescope (expand) or retract. Thus, the overall length of light device 711 is variable.

Prior art light device 711 differs from light assembly 100 in several ways. First, in light device 711, there are electronics, such as, wires and/or cables, within the flexible-neck 709 and in telescoping-neck 705. In light device 711, its electronics spans the entire length of light device 711. Whereas, the self-supporting-elongate-member 203 in light assembly 100 is completely devoid of any electronics; and/or the self-supporting-elongate-member 203 in light assembly 100 never carries any electrical current and is never operatively connected to power-source 305. In light assembly 100, its electronics are asymmetrically disposed, only occupying one terminal end region of the overall light assembly 100, with the majority of the overall length of light assembly 100 being completely devoid of electronics.

Second, in light device 711, the electronics enclosures have varying diameters, that is, the flexible-neck 709 (with its electronics) is skinnier than both the light-source 703 and the base-member 707, and the light-source 703 is wider than the base-member 707. In light device 711, the telescoping-neck 705 diameter is skinnier than both the diameters of light-source 703 and of the base-member 707. Whereas, in light assembly 100 its light-module 101 (the only component with electronics) has a uniform, constant, consistent, non-varying diameter, and/or the like (aside for possibly interface 307, bulge 107, and/or port 311). In light assembly 100 its light-module 101 enclosure 309 has a diameter that is at least substantially (mostly) uniform, constant, consistent, non-varying diameter, and/or the like.

Third, in light device 711, with respect to an overall length of light device 711, its outside diameter varies considerably along that overall length, with a diameter of its base-member 707 that is wider than a diameter of its flexible-neck 709, and with a diameter of the light-source 703 that is wider than the diameter of its base-member 707 and also wider than the diameter of its flexible-neck 709. And a diameter of the telescoping-neck 705 has yet other different diameters. Whereas, in light assembly 100, with respect to its overall length, its outside diameter is constant, consistent, and/or non-varying along at least most (a majority) of its overall length.

Fourth, in light device 711, the entirety of light device 711 may be vertically self-supported by its base-member 707, i.e., a bottom of its base-member 707 may rest on top of flat substrate (like a tabletop) and the rest of light device 711 may be held self-supporting in a vertical upright manner by its base-member 707. Whereas, light assembly 100 has no such equivalent base structure, i.e., a terminal end of light assembly 100 cannot rest on top of a flat surface with its remainder being held vertically upright—light assembly 100 would simply just fall over if this were attempted.

Fifth, in light device 711, its base-member 707, that occupies one terminal end region disposed oppositely from its light-source 703, is not able to be bent, flexed, and/or articulated; rather, its base-member 707 is completely rigid and elongate. Whereas, the terminal end disposed opposite from the light-module 101 in light assembly 100 is configured to be bent, flexed, and/or articulated.

Sixth, in light device 711, its covering (sheath) only covers over its flexible-neck 709 and not its light-source 703 nor its base-member 707 (and not its power-source). Whereas, in light assembly 100 its covering (sheath) 105 covers at least most to all of its self-supporting-elongate-member 203 and also may at least partially to mostly cover over its light-module 101.

Seventh, in light device 711, its flexible-neck 709 region only makes up a minority of the overall length of light device 711. Whereas, in light assembly 100 its self-supporting-elongate-member 203 makes up a majority of the overall length of light assembly 100.

Eighth, light device 711 because of its telescoping-neck 705 has a variable length. Whereas, the overall length of light assembly 100 is fixed, finite, predetermined, and/or non-variable.

Figure 7D:
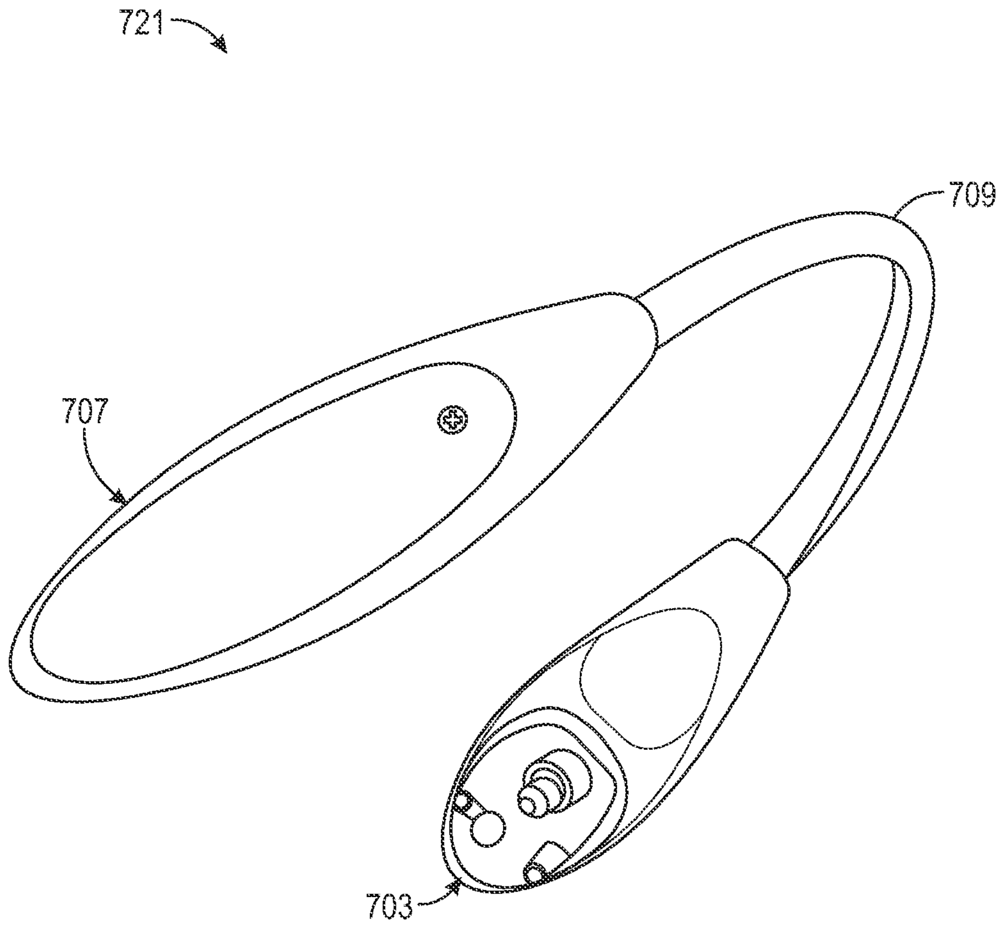
FIG. 7D (Prior Art)
FIG. 7D shows a prior art light device, that has its light-source separated from its power-source in a base-member, via a flexible-neck.

FIG. 7D shows a prior art light device 721, that has its light-source 703 separated from its power-source in a base-member 707, via a flexible-neck 709. In light device 721, light-source 703 is located at one terminal end region and its base-member 707, with its power-source therein, are located at the other oppositely disposed terminal end region, and with its flexible-neck 709 then linking light-source 703 to base-member 707. Flexible-neck 709 is elongate, flexible, and houses electronics of light device 721, such as, wires and/or cables.

Prior art light device 721 differs from light assembly 100 in several ways. First, in light device 721, there are electronics, such as, wires and/or cables, within the flexible-neck 709. In light device 721, its electronics spans the entire length of light device 721. Whereas, the self-supporting-elongate-member 203 in light assembly 100 is completely devoid of any electronics; and/or the self-supporting-elongate-member 203 in light assembly 100 never carries any electrical current and is never operatively connected to power-source 305. In light assembly 100, its electronics are asymmetrically disposed, only occupying one terminal end region of the overall light assembly 100, with the majority of the overall length of light assembly 100 being completely devoid of electronics.

Second, in light device 721, the electronics enclosures have varying widths, that is, the flexible-neck 709 (with its electronics) is skinnier than both the light-source 703 and the base-member 707. Whereas, in light assembly 100 its light-module 101 (the only component with electronics) has a uniform, constant, consistent, non-varying diameter, and/or the like (aside for possibly interface 307, bulge 107, and/or port 311). In light assembly 100 its light-module 101 enclosure 309 has a diameter that is at least substantially (mostly) uniform, constant, consistent, non-varying diameter, and/or the like.

Third, in light device 721, with respect to an overall length of light device 721, its outside width varies considerably along that overall length, with a width of its flexible-neck 709 being skinnier than widths of both the light-source 703 and the base-member 707. Whereas, in light assembly 100, with respect to its overall length, its outside diameter is constant, consistent, and/or non-varying along at least most (a majority) of its overall length.

Fourth, in light device 721, its base-member 707, that occupies one terminal end region disposed oppositely from its light-source 703, is not able to be bent, flexed, and/or articulated; rather, its base-member 707 is completely rigid and elongate. Whereas, the terminal end disposed opposite from the light-module 101 in light assembly 100 is configured to be bent, flexed, and/or articulated.

Fifth, in light device 721, its covering (sheath) only covers over its flexible-neck 709 and not its light-source 703 nor its base-member 707 (and not its power-source). Whereas, in light assembly 100 its covering (sheath) 105 covers at least most to all of its self-supporting-elongate-member 203 and also may at least partially to mostly cover over its light-module 101.

Figure 7E:
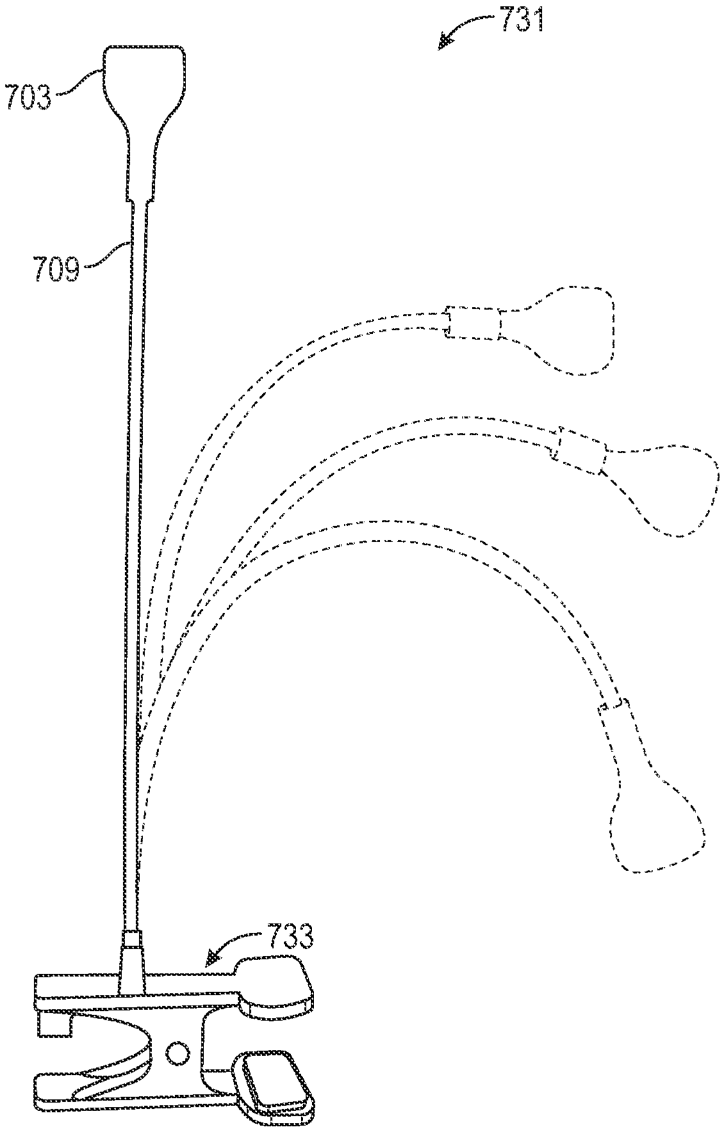
FIG. 7E (Prior Art)
FIG. 7E shows a prior art light device, that has its light-source separated from a clamp, via a flexible-neck.

FIG. 7E shows a prior art light device 731, that has its light-source 703 separated from a clamp 733, via a flexible-neck 709. In light device 731, light-source 703 is located at one terminal end region and its clamp 733 is located at the other oppositely disposed terminal end region, and with its flexible-neck 709 then linking light-source 703 to clamp 733. Flexible-neck 709 is elongate, flexible, and houses electronics of light device 731, such as, wires and/or cables. This clamp 733 can be clamped onto a tabletop, a desktop, or a shelf. Also running through or attached to clamp 733 is a power cable with a plug that attaches to an electrical power outlet (receptacle).

Prior art light device 731 differs from light assembly 100 in several ways. First, in light device 731, there are electronics, such as, wires and/or cables, within the flexible-neck 709. In light device 731, its electronics spans the entire length of light device 731. Whereas, the self-supporting-elongate-member 203 in light assembly 100 is completely devoid of any electronics; and/or the self-supporting-elongate-member 203 in light assembly 100 never carries any electrical current and is never operatively connected to power-source 305. In light assembly 100, its electronics are asymmetrically disposed, only occupying one terminal end region of the overall light assembly 100, with the majority of the overall length of light assembly 100 being completely devoid of electronics.

Second, in light device 731, the electronics enclosures have varying diameters and/or widths, that is, the flexible-neck 709 (with its electronics) is skinnier than both the light-source 703 and the clamp 733, and the light-source 703 is skinnier than the clamp 733. Whereas, in light assembly 100 its light-module 101 (the only component with electronics) has a uniform, constant, consistent, non-varying diameter, and/or the like (aside for possibly interface 307, bulge 107, and/or port 311). In light assembly 100 its light-module 101 enclosure 309 has a diameter that is at least substantially (mostly) uniform, constant, consistent, non-varying diameter, and/or the like.

Third, in light device 731, with respect to an overall length of light device 731, its outside diameter varies considerably along that overall length, with a diameter of its light-source 703 that is wider than a diameter of its flexible-neck 709, and with a width of the clamp 733 that is wider than the diameter of its light-source 703 and also wider than the diameter of its flexible-neck 709. Whereas, in light assembly 100, with respect to its overall length, its outside diameter is constant, consistent, and/or non-varying along at least most (a majority) of its overall length.

Fourth, in light device 731, the entirety of light device 731 may be vertically selfsupported by its clamp 733, when attached to some structure (e.g., a desktop, tabletop, or shelf). Whereas, light assembly 100 has no such equivalent clamp structure, i.e., a terminal end of light assembly 100 cannot rest on top of a flat surface with its remainder being held vertically upright—light assembly 100 would simply just fall over if this were attempted.

Fifth, in light device 731, the two main halves of its clamp 733, that occupies one terminal end region disposed oppositely from its light-source 703, are not able to be bent, flexed, and/or articulated; rather, the two main halves of its clamp 733 are completely rigid and elongate. Whereas, the terminal end disposed opposite from the light-module 101 in light assembly 100 is configured to be bent, flexed, and/or articulated.

Sixth, in light device 731, its covering (sheath) only covers over its flexible-neck 709 and not its light-source 703 nor its base-member 707 (and not its power-source). Whereas, in light assembly 100 its covering (sheath) 105 covers at least most to all of its self-supporting-elongate-member 203 and also may at least partially to mostly cover over its light-module 101.

Figure 7F:
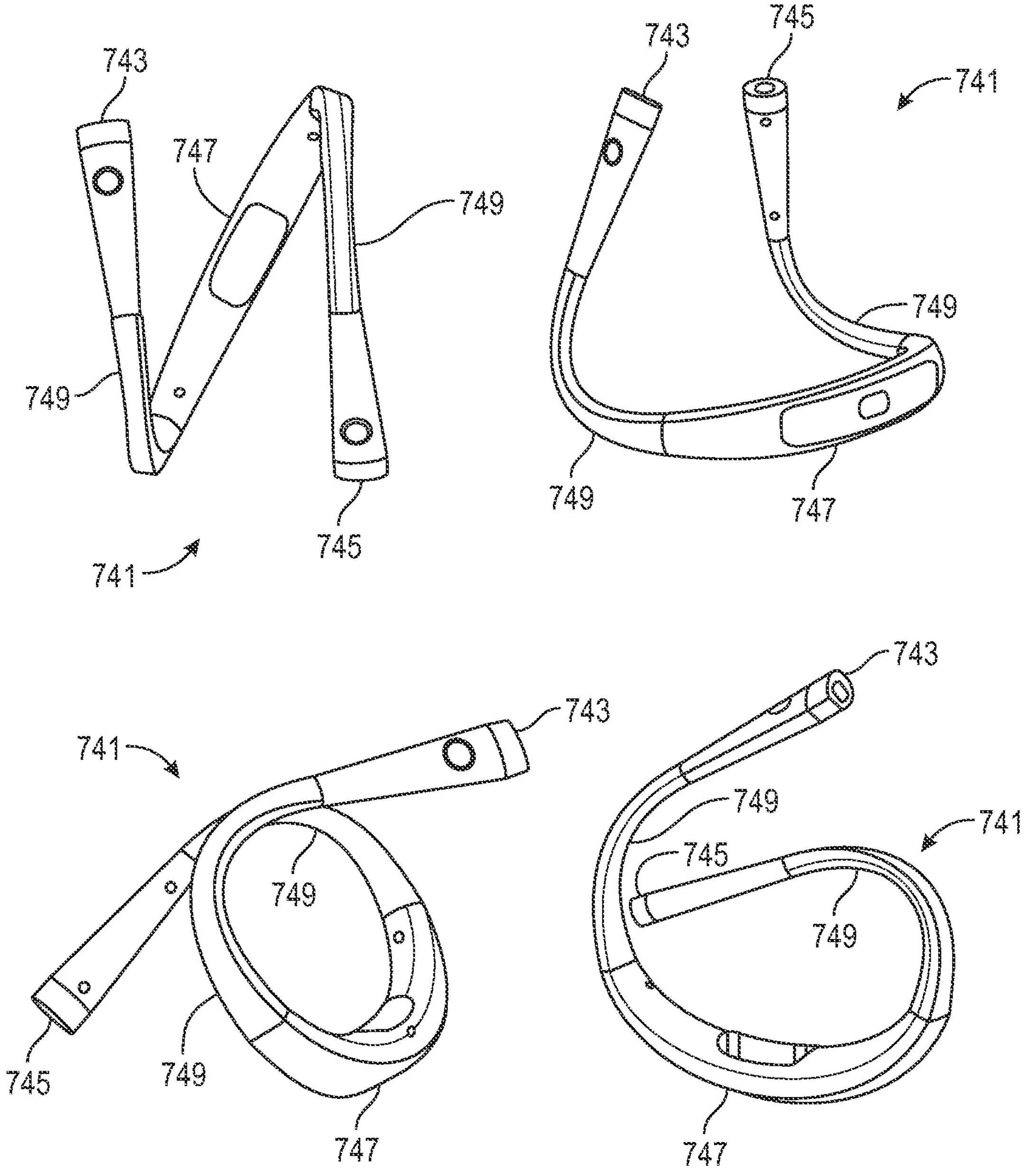
FIG. 7F (Prior Art)
FIG. 7F shows a prior art light device, that has two different opposing light sources, namely, a first-light-source and a second-light-source, that are separated from each other by two different flexible-neck portions and one rigid middle-portion (that is fixedly curved).

FIG. 7F shows a prior art light device 741, that has two different opposing light sources, namely, a first-light-source 743 and a second-light-source 745, that are separated from each other by two different flexible-neck 747 portions and one rigid middle-portion 749. The single middle-portion 749 is elongate, rigid, curved, and with a predetermined fixed, finite, and non-variable length. At each of the two opposing terminal ends of the middle-portion 749 is attached one of the two flexible-neck 747 portions. And then each of the two flexible-neck 747 portions terminates in one of the two lights, the first-light-source 743 and the second-light-source 745, respectively. A power-source is housed in the single middle-portion 749 such that wires (cables) run from the power-source in the middle-portion 749 and entirely through each of the two different flexible-neck 747 portions to communicatively reach and connect to the each of the two lights, the first-light-source 743 and the second-light-source 745, respectively. Each the each of the two lights, the first-light-source 743 and the second-light-source 745, respectively, has its own on/off button that is not covered over by either of the two different flexible-neck 747 portions.

Prior art light device 741 differs from light assembly 100 in several ways. First, in prior art light device 741, there are electronics, such as, wires and/or cables, within each of the two different (and separated) flexible-neck 747 portions. In prior art light device 741, its electronics spans the entire length of prior art light device 741. Whereas, the self-supporting-elongate-member 203 in light assembly 100 is completely devoid of any electronics; and/or the self-supporting-elongate-member 203 in light assembly 100 never carries any electrical current and is never operatively connected to power-source 305 (or any other power-source). In light assembly 100, its electronics are asymmetrically disposed, only occupying one terminal end region of the overall light assembly 100, with the majority of the overall length of light assembly 100 being completely devoid of electronics. Whereas, in prior art light device 741, its electronics are symmetrically disposed with respect to the overall length of prior art light device 741.

Second, in prior art light device 741, the electronics enclosures have varying widths, that is, the (two) flexible-neck 747 (portions) (with its electronics) is skinnier than both the two lights, the first-light-source 743 and the second-light-source 745, and skinnier than the middle-portion 749. Also, the width of middle-portion 749 is larger than the width of the two light, the first-light-source 743 and the second-light-source 745. Whereas, in light assembly 100 its light-module 101 (the only component with electronics) has a uniform, constant, consistent, non-varying diameter, and/or the like (aside for possibly interface 307, bulge 107, and/or port 311). In light assembly 100 its light-module 101 enclosure 309 has a diameter that is at least substantially (mostly) uniform, constant, consistent, non-varying diameter, and/or the like.

Third, in prior art light device 741, with respect to an overall length of prior art light device 741, its outside width varies considerably along that overall length, with a width of its (two) flexible-neck 747 (portions) being skinnier than widths of both the two lights, the firstlight-source 743 and the second-light-source 745, and being skinnier than the middle-portion 749. On each portion (region) of prior art light device 741, the width (diameter) varies along a length of the given portion (region). For example, the width (diameter) varies along a length of: the first-light-source 743, the second-light-source 745, the two flexible-neck 747 portions, middle-portion 749, and/or combinations thereof. Whereas, in light assembly 100, with respect to its overall length, its outside diameter is constant, consistent, and/or non-varying along at least most (a majority) of its overall length. In some embodiments, in light assembly 100 its self-supporting-elongate-member 203 and/or its covering (sheath) 105, its diameter (width) thereof may be (at least substantially [mostly]) uniform, constant, consistent, non-varying, and/or the like.

Fourth, in prior art light device 741, its middle-portion 749, that occupies a middle portion of the overall length of prior art light device 741 is not able to be bent, flexed, and/or articulated; rather, its middle-portion 749 is completely rigid, elongate, and fixedly curved. Whereas, a middle portion (region) of light assembly 100, which may be a portion of self-supporting-elongate-member 203 may be configured to be bent, flexed, and/or articulated.

Fifth, in prior art light device 741, its flexible covering (sheath) only covers over each of its two separate and different flexible-neck 747 portions and not its two lights, the first-light-source 743 and the second-light-source 745, and also not its middle-portion 749 (and not its power-source). Whereas, in light assembly 100 its covering (sheath) 105 covers at least most to all of its self-supporting-elongate-member 203 and also may at least partially to mostly cover over its light-module 101.

Sixth, prior art light device 741 has two different, separate, and disposedly opposite lights, its first-light-source 743 and the second-light-source 745, respectively. Whereas, in some embodiments, light assembly 100 may only have one (1) single light-module 101. Note, in some embodiments, the one (1) single light-module 101 may comprise one or more light-sources 301; however, such one or more light-sources 301 are not disposedly opposite lights.

Seventh, prior art light device 741 has two different, separate, and disposedly opposite flexible-neck 747 portions, that are each separated from the other by middle-portion 749.

Whereas, light assembly 100 may only have one (1) single self-supporting-elongate-member 203; and even in embodiments, when the single one (1) self-supporting-elongate-member 203 may comprise two or more or (parallel) wires, these two or more wires are not separated from each other by some structure similar to the middle-portion 749 of prior art light device 741.

Figure 7G:
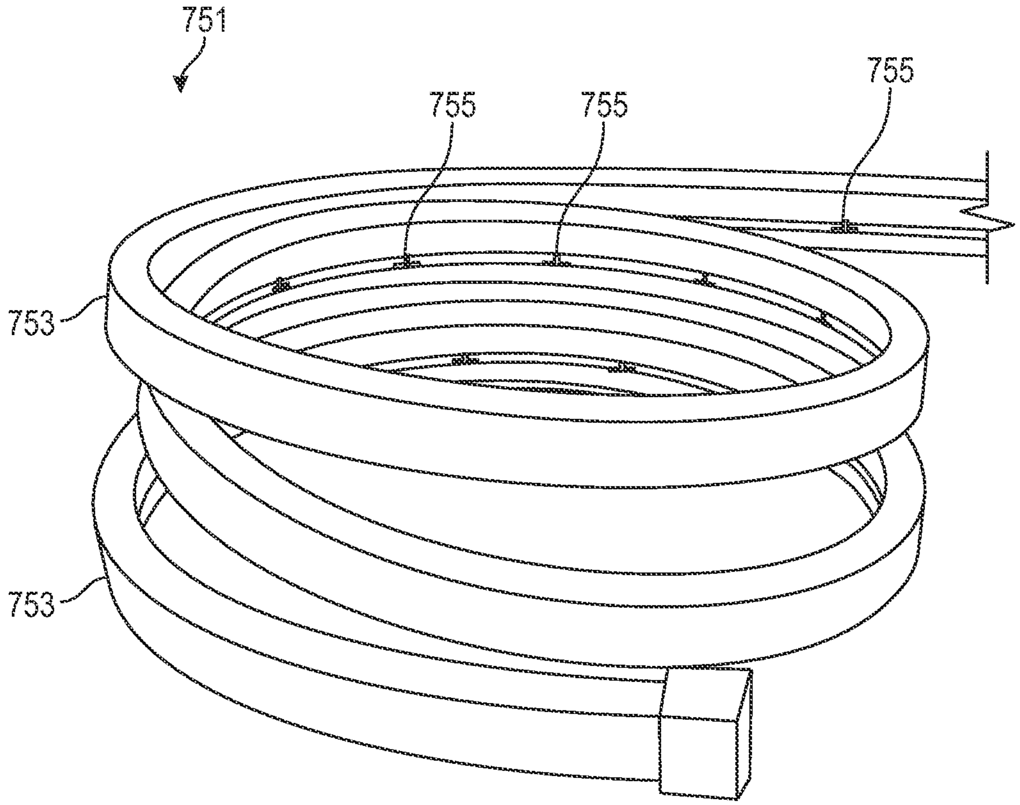
FIG. 7G (Prior Art)
FIG. 7G shows a prior art light device, that is a LED (light emitting diode) light strip.

FIG. 7G shows a prior art light device 751, that is a LED (light emitting diode) light strip, that is a strip of an elongate-flexible-member 753 that has a plurality of LEDs 755 disposed along a length of that elongate-flexible-member 753, generally at some predetermined and fixed interval (spacing).

Prior art light device 751 differs from light assembly 100 in several ways. First, in prior art light device 751, there are electronics, such as, wires, cables, and/or LEDs, within and/or all along an entire length of prior art light device 751 (flexible-elongate-member 753). In prior art light device 751, its electronics spans the entire length of prior art light device 751. Whereas, the self-supporting-elongate-member 203 in light assembly 100 is completely devoid of any electronics; and/or the self-supporting-elongate-member 203 in light assembly 100 never carries any electrical current and is never operatively connected to power-source 305. In light assembly 100, its electronics are asymmetrically disposed, only occupying one terminal end region of the overall light assembly 100, with the majority of the overall length of light assembly 100 being completely devoid of electronics.

Second, the entire length of prior art light device 751 (flexible-elongate-member 753) is not self-supporting in the same manner (context) as self-supporting-elongate-member 203 of light assembly 100 is self-supporting. No portion, region, and/or section of any length of prior art light device 751 (flexible-elongate-member 753) is self-supporting in the same manner (context) as self-supporting-elongate-member 203 of light assembly 100 is self-supporting.

Third, prior art light device 751 has its plurality of LEDs 755 that are disposed uniformly and consistently along a length of prior art light device 751 (flexible-elongate-member 753). Whereas, light assembly 100 does not have a plurality of lights (light sources) that are disposed uniformly and consistently along a length of light assembly 100. Additionally, light emitted from prior art light device 751 is emitted in a different direction than light emitted by light assembly 100. Prior art light device 751 emits lights in an orthogonal direction away from its longitudinal length and does so generally all along its longitudinal length; whereas, light assembly 100 only emits light out one of its terminal ends, not its length and not its other terminal end.

Figure 7H:
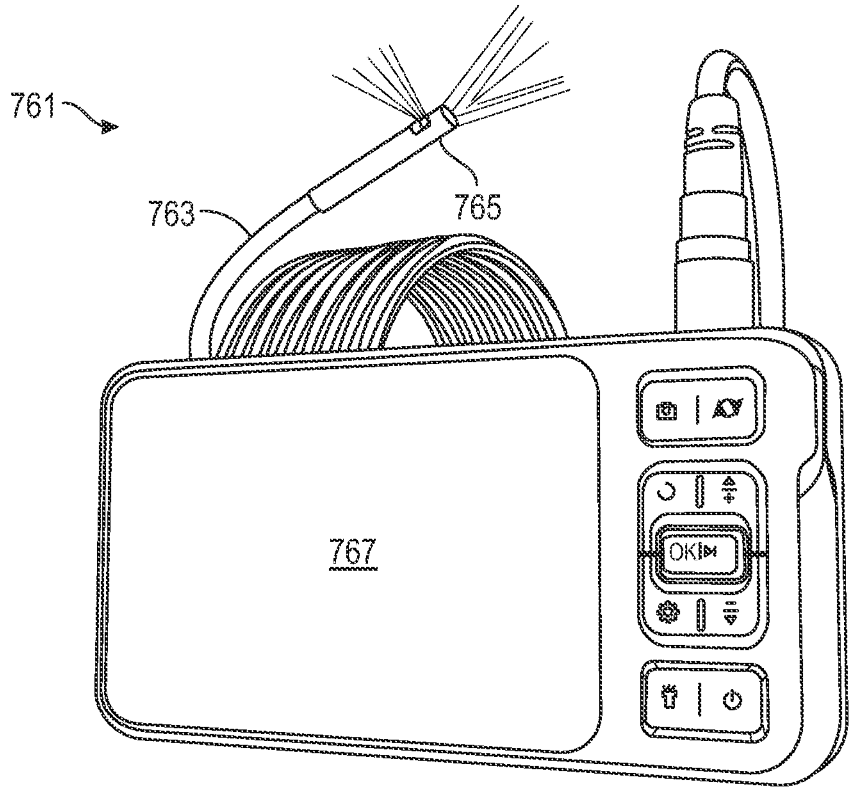
FIG. 7H (Prior Art)
FIG. 7H shows a prior art light device, namely an endoscope.
Figure 7I:
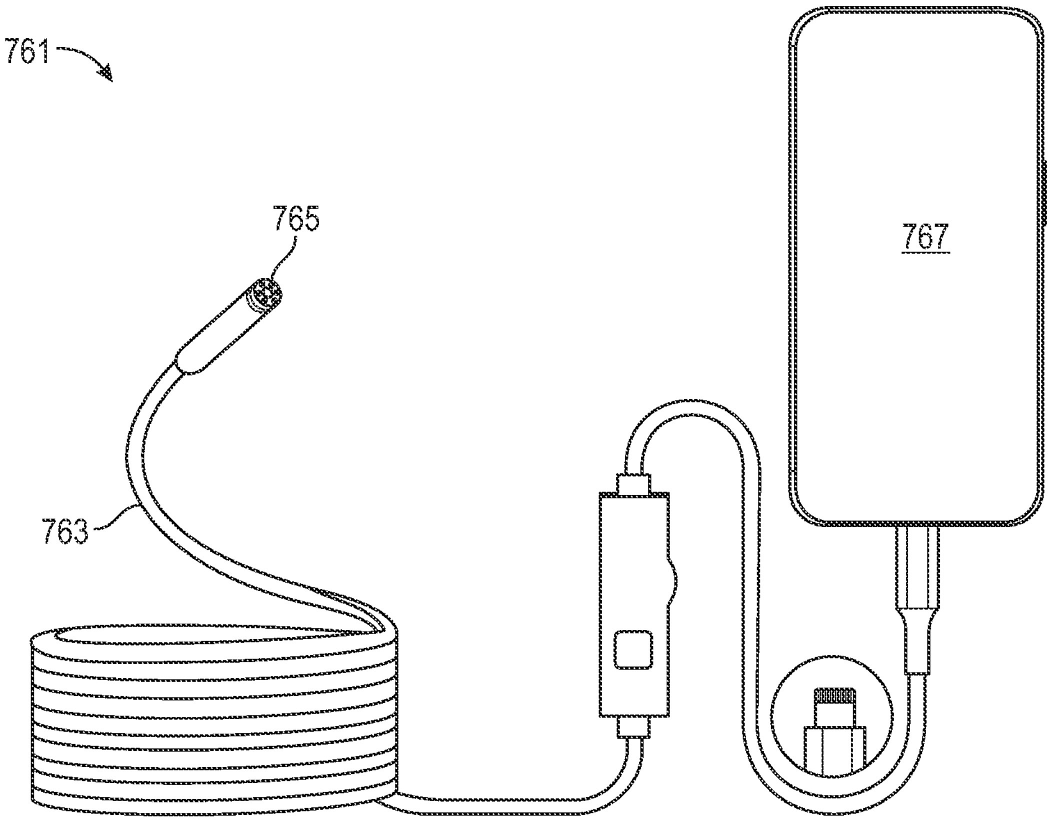
FIG. 7I (Prior Art)
FIG. 7I shows a prior art light device, namely an endoscope.

FIG. 7H and FIG. 7I show essentially a same prior art light device 761, namely endoscopes, that have a main (longest) member that is an elongate-flexible-member 763, a video-and-light 765 that is attached to one terminal end of its elongate-flexible-member 763, and generally have an opposing terminal end of its elongate-flexible-member 763 that is attached to some sort of screen 767 and/or display 767. The video-and-light 765 emits light and also captures video imagery. Running through an entirety of the length of the elongate-flexible-member 763 are wire(s), cable(s), and/or fiber-optic(s), to provide electrical power to the video-and-light 765 and to convey video imagery from video-and-light 765 back to the screen 767 and/or display 767. Endoscopes 761 are used to illuminate and video hard to reach places, such as, within bodies of animals, during surgery, within machines, within pipes, within wall assemblies, and/or the like.

Prior art light device 761 differs from light assembly 100 in several ways. First, in prior art light device 761, there are electronics, such as, wires, cables, and/or fiber optics, within and/or all along an entire length of prior art light device 761 (elongate-flexible-member 763). In prior art light device 761, its electronics spans the entire length of prior art light device 761. Whereas, the self-supporting-elongate-member 203 in light assembly 100 is completely devoid of any electronics; and/or the self-supporting-elongate-member 203 in light assembly 100 never carries any electrical current and is never operatively connected to power-source 305 (or to any other power-source). In light assembly 100, its electronics are asymmetrically disposed, only occupying one terminal end region of the overall light assembly 100, with the majority of the overall length of light assembly 100 being completely devoid of electronics.

Second, the entire length of prior art light device 761 (elongate-flexible-member 763) is not self-supporting in the same manner (context) as self-supporting-elongate-member 203 of light assembly 100 is self-supporting. No portion, region, and/or section of any length of prior art light device 761 (elongate-flexible-member 763) is self-supporting in the same manner (context) as self-supporting-elongate-member 203 of light assembly 100 is self-supporting.

Third, self-supporting-elongate-member 203 of light assembly 100 is more flexible than elongate-flexible-member 763 of prior art light device 761. For example, a bend radius of elongate-flexible-member 763 often is selected from a 2.5 inch bend radius to a 4.5 inch bend radius for a given prior art light device 761. Whereas, a bend radius of self-supporting-elongate-member 203 (of light assembly 100) may be less than 2.5 inches, i.e., self-supporting-elongate-member 203 is more flexible than elongate-flexible-member 763.

Fourth, in some prior art light devices 761, its video-and-light 765 emits light in at least two orthogonal (and/or perpendicular) directions simultaneously. Whereas, in light assembly 100, its emitted light is only in one (1) (single) direction at any given moment in time. In some embodiments, light assembly 100 does not simultaneously emit light in multiple directions at once. In some embodiments, light assembly 100 does not simultaneously emit light in orthogonal (perpendicular) directions at once.

Fifth, prior art light device 761 has a camera (e.g., video-and-light 765); whereas, light assembly 100 does not have any camera(s). In some embodiments, light assembly 100 does not comprise any cameras and/or the like.

Sixth, prior art light device 761 has a screen (display) 767 and/or is configured to have video imagery from its video-and-light 765 be displayed upon such a screen (display) 767. Whereas, light assembly 100 does not have any screen(s) (display(s)). In some embodiments, light assembly 100 does not comprise any screen(s) (display(s)) and/or the like. In some embodiments, light assembly 100 does not generate any video imagery for display upon screen(s) (display(s)) and/or the like.

Figure 8A:
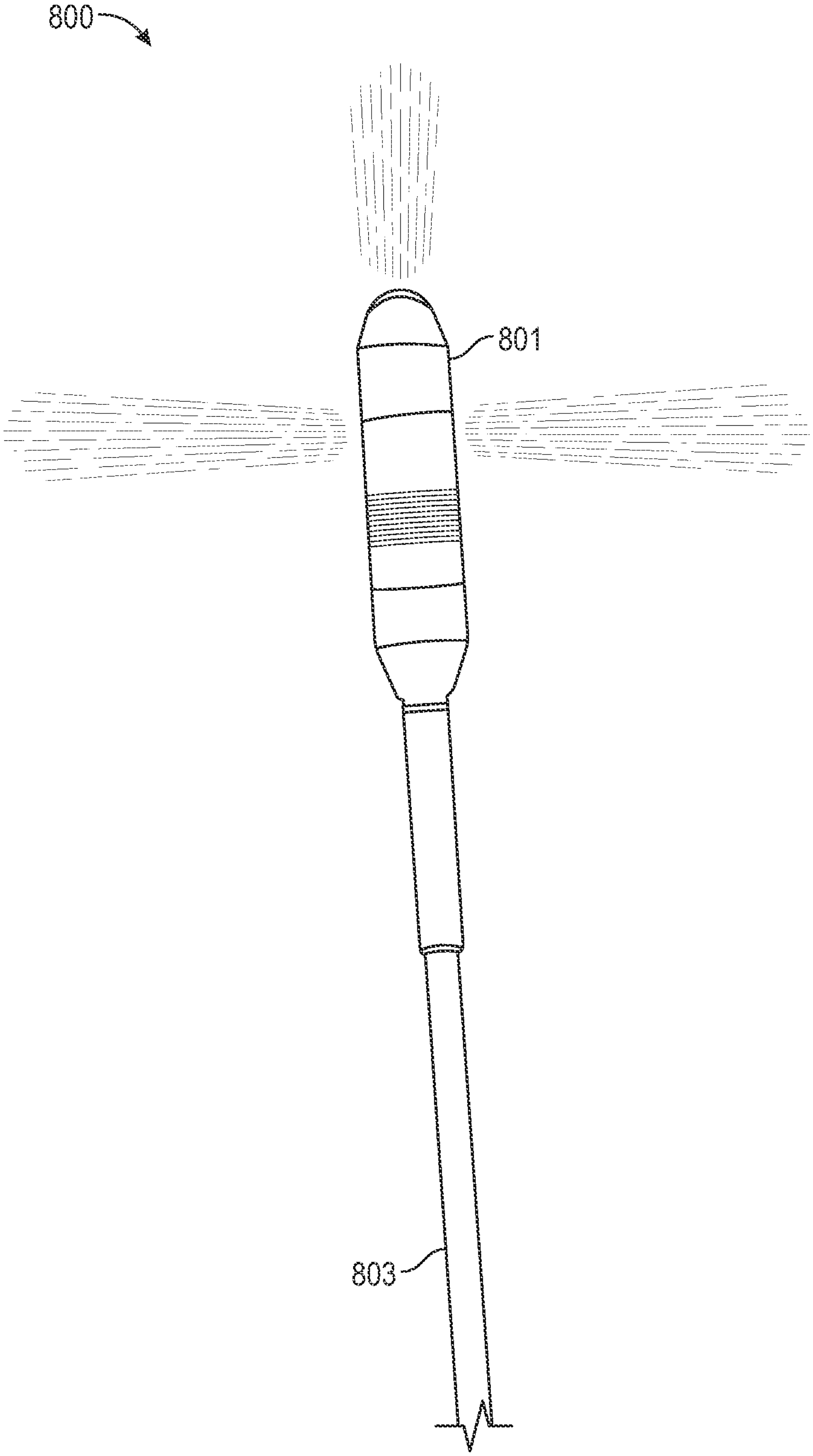
FIG. 8A (Prior Art)
FIG. 8A shows a terminal end portion of a prior art electrical-fish-rod that has a light-source attached to that shown terminal end.

FIG. 8A shows a terminal end portion of a prior art electrical-fish-rod 800 that has a light-source 801 attached to that terminal end. Prior art electrical-fish-rods 800 are for pulling wires and/or cables through walls, conduit, pipes, and the like. The wires and/or cables being pulled by prior art electrical-fish-rods 800 may place considerable loads on prior art electrical-fish-rods 800. The pulling load capacity for prior art electrical-fish-rods 800 may range from 300 pounds (lbs.) to 750 pounds (lbs.). The rod 803 portion of a given prior art electrical-fish-rod 800 if often made of a fiberglass reinforced polyester core (or the like) with a protective polypropylene coating (or the like), which means prior art electrical-fish-rods 800 have some limited flexibility but are not self-supporting in the same manner as self-supporting-elongate-member 203 (of light assembly 100); i.e., prior art electrical-fish-rods 800 cannot be bent into a given shape (e.g., with one or more angles in that bent shape) and have such a resulting shape be self-supporting and maintain the resulting shape. Recall, FIG. 4A to FIG. 4C and FIG. 5A to FIG. 5W, which show self-supporting-elongate-member 203 (of light assembly 100) being self-supporting in a variety of different bent shapes.

Figure 8B:
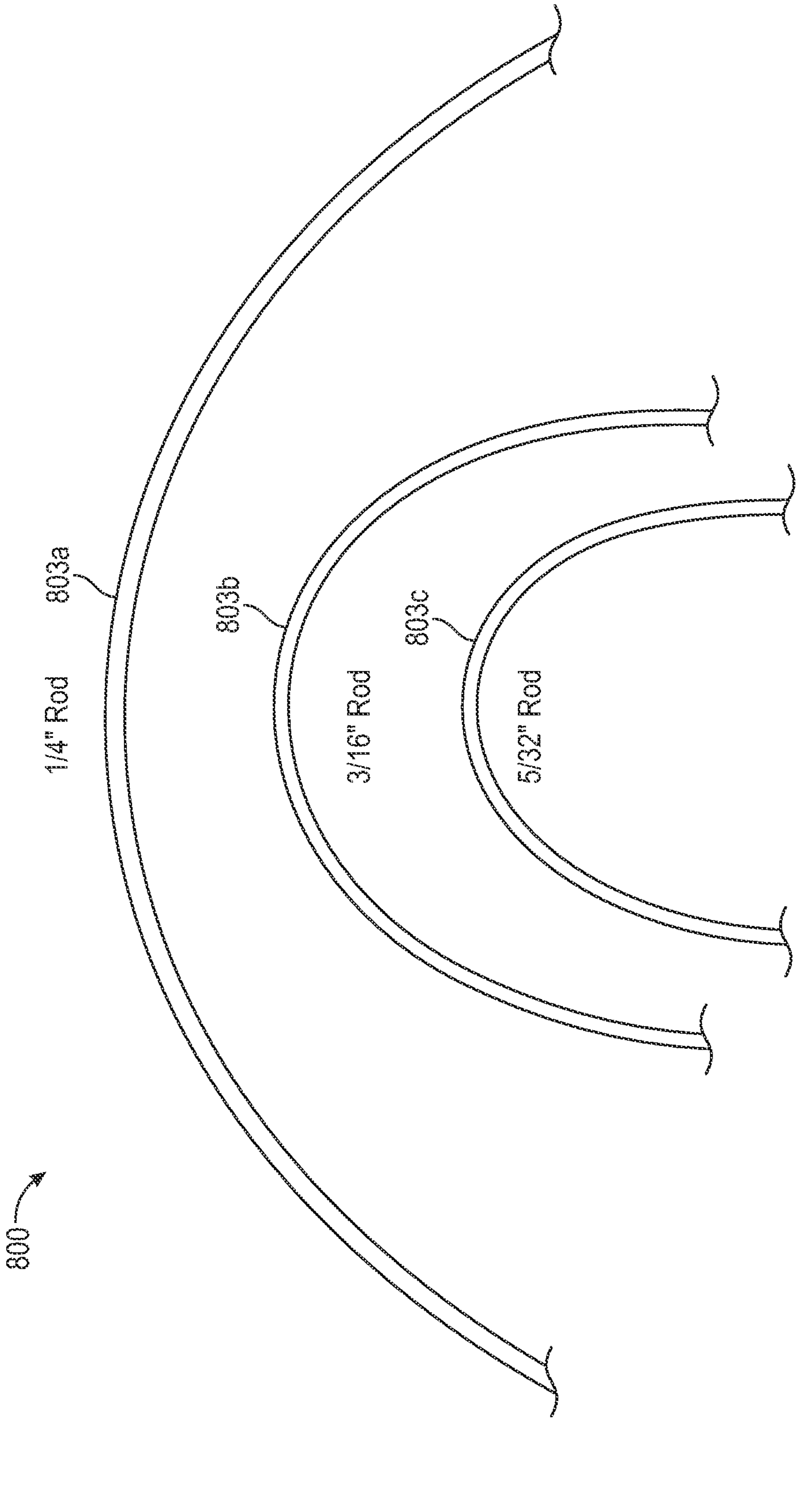
FIG. 8B (Prior Art)
FIG. 8B shows a middle portion (region) of three different prior art electrical-fish-rods, with each of three shown prior art electrical-fish-rod middle portions having a different outer diameter; and a bend radius for each of the shown electrical-fish-rod middle portions is also shown.

FIG. 8B shows a middle portion (region) of three different prior art electrical-fish-rods 800, with each prior art electrical-fish-rod 800 having a (outer) different diameter, namely, of: a ¼ (0.25) inch outer diameter rod 803*a*, a 3⁄16 (0.1875) outer diameter rod 803*b*, and 5⁄32 (0.15625) inch outer diameter rod 803*c*. Note, the reference numeral suffixes of "a," "b," and "c," for rods 803 portions is merely to distinguish rods 803 portions of different diameters. Note, the ¼ (0.25) inch outer diameter rod 803*a*, has a minimum bend radius of 4.5 inches (which is its maximum flexibility). Note, the ¼ (0.25) inch outer diameter rod 803*a* can pull loads up to 750 pounds (lbs.). Note, the 3⁄16 (0.1875) inch outer diameter rod 803*b*, has a minimum bend radius of 3 inches (which is its maximum flexibility). Note, the 3⁄16 (0.1875) inch outer diameter rod 803*b* can pull loads up to 500 pounds (lbs.). Note, the 5⁄32 (0.15625) inch outer diameter rod 803*c*, has a minimum bend radius of 2.5 inches (which is its maximum flexibility). Note, the 5⁄32 (0.15625) inch outer diameter rod 803*c* can pull loads up to 300 pounds (lbs.).

Prior art electrical-fish-rod 800 differs from light assembly 100 in several ways. First, the rod 803 portion of a given prior art electrical-fish-rod 800 is very long in comparison to a length of light assembly 100. In some embodiments, light assembly 100 may be two (2) feet (twenty-four inches) or less in total length. The rod 803 portion of a given prior art electrical-fish-rod 800 is often ten (10) feet, fifteen (15) feet, twenty (20) feet, twenty-five (25) feet, or more, in total (overall length). Such comparably very long lengths of prior art electrical-fish-rod 800, would render prior art electrical-fish-rods 800 impossible to infeasible to use in the same manner as light assembly 100 as shown in FIG. 5A to FIG. 5W. In some embodiments, light assemblies 100 are too short to operate as electrical fishing rods.

Second, the entire length of prior art electrical-fish-rods 800 is not self-supporting in the same manner (context) as self-supporting-elongate-member 203 of light assembly 100 is self-supporting. No portion, region, and/or section of any length of prior art electrical-fish-rods 800 is self-supporting in the same manner (context) as self-supporting-elongate-member 203 of light assembly 100 is self-supporting. Prior art electrical-fish-rods 800 cannot be bent into a given shape (e.g., with one or more angles in that bent shape) and have such a resulting shape be self-supporting and maintain the resulting shape. After flexing (bending) prior art electrical-fish-rods 800, that prior art electrical-fish-rods 800 will want to return to its original un-flexed (unbent) configuration; i.e., prior art electrical-fish-rods 800 will only maintain a given bent configuration if an external force operates on prior art electrical-fish-rods 800 to maintain that shape. In complete contrast, recall, FIG. 4A to FIG. 4C and FIG. 5A to FIG. 5W, which show self-supporting-elongate-member 203 (of light assembly 100) being self-supporting in a variety of different bent shapes.

Third, self-supporting-elongate-member 203 of light assembly 100 is more flexible than the rod 803 portion of a given prior art electrical-fish-rod 800. For example, a bend radius of the rod 803 portion of a given prior art electrical-fish-rod 800 often is selected from a 2.5 inch bend radius to a 4.5 inch bend radius. Whereas, a bend radius of self-supporting-elongate-member 203 (of light assembly 100) may be less than 2.5 inches, i.e., self-supporting-elongate-member 203 is more flexible than the rod 803 portion of a given prior art electrical-fish-rod 800.

Fourth, in some prior art electrical-fish-rods 800, its light-source 801 emits light in at least two orthogonal (and/or perpendicular) directions simultaneously. In some prior art electrical-fish-rods 800, its light-source 801 emits light simultaneously in an omnidirectional manner towards both a front of light-source 801 and to the surrounding sides of that light-source 801. Whereas, in light assembly 100, its emitted light is only in one (1) (single) direction at any given moment in time. In some embodiments, light assembly 100 does not simultaneously emit light in multiple directions at once. In some embodiments, light assembly 100 does not simultaneously emit light in orthogonal (perpendicular) directions at once. In some embodiments, light emitted from a given light-module 101 (light-source 301) is not omnidirectional light emission in the same way (manner) as light-source 801 of a given prior art electrical-fish-rod 800. In some embodiments, light emitted from a given light-module 101 (light-source 301) is only from its end (front) and no light is directly emitted from sides of that light-module 101 (light-source 301).

Fifth, prior art electrical-fish-rods 800 are for pulling wires and/or cables through walls, conduit, pipes, and the like. The wires and/or cables being pulled by prior art electrical-fish-rods 800 may place considerable loads on prior art electrical-fish-rods 800. The pulling load capacity for prior art electrical-fish-rods 800 may range from 300 pounds (lbs.) to 750 pounds (lbs.). Whereas, light assemblies 100 are not configured for pulling loads, such as, but not limited to, wires and/or cables. In some embodiments, the light-with-adjustable-tail-for-articles 100 (light assembly 100), may not be configured to pull any load of one hundred (100) pounds or more. In some embodiments, the light-with-adjustable-tail-for-articles 100 (light assembly 100), may not be configured to pull any load of fifty (50) pounds or more.

Additionally, light assemblies 100 are too short to operate as electrical fishing rods.

Sixth, the light-source 801 of a given prior art electrical-fish-rod 800 has an attachment means at its distal terminal end, that is for attaching to various electrical fishing attachment tools, such as, a hook tool, a bullet tip, or a threaded tip. Whereas, the distal terminal end of light-module 101 does not have any such attachment means. In some embodiments, the distal terminal end of light-module 101 may only be for emitting light from its light-source(s) 301.

Seventh, the polypropylene protective covering on the rod 803 portion of a given prior art electrical-fish-rod 800 does not cover any portion of its light-source 801. Whereas, the covering (sheath) 105 of a given light assembly 100, may cover over at least some to most of light-module 101.

FIG. 9 may depict a schematic block diagram of a light assembly 100 whose terminal end that is disposed opposite from the light-module 101 terminal end region, may terminate in a tool 901 and/or an attachment 901; or that may comprise a tool 901 and/or an attachment 901. In some embodiments, this tool and/or attachment may be a cover 901. In some embodiments, cover 901 may be a gripping cover 901. In some embodiments, gripping cover 901 may be configured to removably stretch, fit over, and/or grab onto an exterior of lid 903. In some embodiments, gripping cover 901 may be made at least substantially (mostly) of at least one elastomer, such as, but not limited to, silicone, nitrile, rubber, natural rubber, synthetic rubber, a stretchy plastic, combinations thereof, a portion thereof, and/or the like. In some embodiments, the physical connection between gripping cover 901 and lid 903 may be removable. In some embodiments, light assembly 100 may be removably attached to lid 903 via use of gripping cover 901. In some embodiments, lid 903 may be lid to a container, such as, but not limited to, a nail polish container 905. In some embodiments, removable attachment of gripping cover 901 to lid 903 may permit a user to shine light specifically onto the nails that may be intended to receive nail polish and/or the like to aid in this process.

Continuing discussing FIG. 9, in some embodiments, cover 901 may be sized, shaped, and/or dimensioned to removably fit over, cover, and/or seal a container, bottle, flask, carafe, cup, beaker, glass, and/or the like. In some embodiments, cover 901 may be a lid. In some embodiments, cover 901 may be sized, shaped, and/or dimensioned to replace a lid for a given container, bottle, flask, carafe, cup, beaker, glass, and/or the like. In some embodiments, cover 901 may be sized, shaped, and/or dimensioned to removably fit over and/or cover a lid 903 of a nail polish container 905 (or the like). In some embodiments, cover 901 may be sized, shaped, and/or dimensioned to replace a lid 903 of a nail polish container 905 (or the like). In some embodiments, covering 901 may have only one (1) largest (main) opening. In some embodiments, covering 901 may have a secondary minor opening (e.g., to satisfy safety regulations) so that the largest (main) opening of covering 901 cannot form a vacuum and/or to minimize airway obstruction if covering were inhaled and/or ingested. In some embodiments, when light assembly 100 may be in a at least substantially linear (straight) bent configuration, then the terminal end of light assembly 100 that emits lights may be facing opposite from an opening to cover 901. In some embodiments, tool 901 and/or attachment 901 may be at least one magnet. In some embodiments, tool 901, attachment 901, and/or cover 901 may be removably attachable (via an attachment means) to a terminal end of light assembly 100 that is disposed opposite from the terminal end of light assembly 100 that emits lights. In some embodiments, this attachment means may be a threaded connection.

Continuing discussing FIG. 9, in some embodiments, the interface 307 of light-module 101 may be a twist button (or twist switch), such that by a twisting motion 907 (e.g., either clockwise or counterclockwise) interface 307 may be user engaged to turn on or off light-module 101 and/or to change light shining intensity of light-module 101.

Note, the overall length of light assembly 100 may be best determined (measured) when light assembly 100 may be in a linear (straight) configuration. In some embodiments, with respect to the overall length of the light-with-adjustable-tail-for-articles 100 (light assembly 100), along at least most of that overall length, an outside diameter of the light-with-adjustable-tail-for-articles 100 (light assembly 100) may be consistent, constant, fixed, finite, and/or non-varying. In some embodiments, with respect to the overall length of the light-with-adjustable-tail-for-articles 100 (light assembly 100), a majority of that overall length may be from the length of the self-supporting-elongate-member 203 and not from the length of the light-module 101. In some embodiments, with respect to the overall length of the light-with-adjustable-tail-for-articles 100 (light assembly 100), that overall length may be fixed, finite, predetermined, and/or non-variable; and/or that overall length may not be variable, extendable, telescopic, collapsible, and/or the like. In some embodiments, with respect to the overall length of the light-with-adjustable-tail-for-articles 100 (light assembly 100), that overall length may be selected from a range of: twenty-four (24) inches to eight (8) inches (including selecting from either endpoint of that range). In some embodiments, with respect to the overall length of the light-withadjustable-tail-for-articles 100 (light assembly 100), the self-supporting-elongate-member 203 may at least occupy a middle portion of that overall length. In some embodiments, the 203 may also extend to either side of such a middle portion of that overall length of light assembly 100.

Lights-with-adjustable-tails-for-articles (light assemblies) have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A light-with-adjustable-tail-for-articles that comprises:

a light-module that is configured to emit light out of one terminal end of the light-module;

a self-supporting-elongate-member that forms a tail of the light-with-adjustable-tail-for-articles; wherein the self-supporting-elongate-member is flexible and is configured to be repeatably bent into shapes, wherein a particular shape of the self-supporting-elongate-member that resulted from bending of the self-supporting-elongate-member is self-supporting without external sources of support; wherein the self-supporting-elongate-member is configured to be removably attached to a given article; and a sheathing that covers over at least most of the self-supporting-elongate-member s wherein the sheathing is an outermost exterior surface of at least most of the light-with-adjustable-tail-for-articles, wherein the sheathing and the at least most of the self-supporting-elongate-member are in direct physical communication with each other;

wherein with respect to lengths of the light-module and of the self-supporting-elongate-member, the light-module and the self-supporting-elongate-member are arranged end-to-end with each other, such that when the self-supporting-elongate-member is in a linear configuration, these two individual lengths combine to form an overall length of the light-with-adjustable-tail-for-articles.

2. The light-with-adjustable-tail-for-articles according to claim 1, wherein the light-module comprises at least one of: a light-source, a circuit, and a power-source; wherein the circuit is operatively connected to both the light-source and to the power-source; wherein the power-source is configured to electrically power the light-source, wherein the light-source is configured to emit the light out of the one terminal end of the light-module.

3. The light-with-adjustable-tail-for-articles according to claim 1, wherein the light emitted from the light-module only exits from the one terminal end of the light-module and not from sidewalls nor an other terminal end of the light-module that is closest to the self-supporting-elongate-member.

4. The light-with-adjustable-tail-for-articles according to claim 1, wherein all electronics of the light-with-adjustable-tail-for-articles are either housed entirely within the light-module or wherein at least most of the electronics are housed within the light-module with only a user-interface of the light-module partially protruding from the light-module.

5. The light-with-adjustable-tail-for-articles according to claim 4, wherein the light-module has a consistent and non-varying outside diameter along the length of the light-module.

6. The light-with-adjustable-tail-for-articles according to claim 1, wherein the self-supporting-elongate-member is comprised of at least one wire.

7. The light-with-adjustable-tail-for-articles according to claim 6, wherein the at least one wire is made from at least one of: a metal or an alloy.

8. The light-with-adjustable-tail-for-articles according to claim 6, wherein the at least one wire is not operatively connected to any electronics of the light-with-adjustable-tail-for-articles.

9. The light-with-adjustable-tail-for-articles according to claim 1, wherein the self-supporting-elongate-member has no electronics.

10. The light-with-adjustable-tail-for-articles according to claim 1, wherein at least a portion of the self-supporting-elongate-member and the sheathing are configured to be repeatably bent into spiral shapes.

11. The light-with-adjustable-tail-for-articles according to claim 10, wherein with respect to a length of the spiral shape, six centimeters of the length of the spiral shape has at least six turns of the spiral shape.

12. The light-with-adjustable-tail-for-articles according to claim 1, wherein the self-supporting-elongate-member is devoid of separately distinct articulable joints.

13. The light-with-adjustable-tail-for-articles according to claim 1, wherein the self-supporting-elongate-member does not have parts that move with respect to each other.

14. The light-with-adjustable-tail-for-articles according to claim 1, wherein the self-supporting-elongate-member has a bend radius that is less than two and half (2.5) inches.

15. The light-with-adjustable-tail-for-articles according to claim 1, wherein the sheathing is selected from at least one of: an elastomer, a silicone, a rubber, a flexible plastic, or a dry foam.

16. The light-with-adjustable-tail-for-articles according to claim 1, wherein with respect to the overall length of the light-with-adjustable-tail-for-articles, along at least most of that overall length, an outside diameter of the light-with-adjustable-tail-for-articles is consistent, constant, fixed, finite, and non-varying.

17. The light-with-adjustable-tail-for-articles according to claim 1, wherein with respect to the overall length of the light-with-adjustable-tail-for-articles, a majority of the overall length is from the length of the self-supporting-elongate-member and not from the length of the light-module.

18. The light-with-adjustable-tail-for-articles according to claim 1, wherein with respect to the overall length of the light-with-adjustable-tail-for-articles, the overall length is fixed, finite, predetermined, and non-variable.

19. The light-with-adjustable-tail-for-articles according to claim 1, wherein with respect to the overall length of the light-with-adjustable-tail-for-articles, the overall length is selected from a range of twenty-four (24) inches to eight (8) inches.

20. The light-with-adjustable-tail-for-articles according to claim 1, wherein with respect to the overall length of the light-with-adjustable-tail-for-articles, the self-supporting-elongate-member at least occupies a middle portion of that overall length.

21. The light-with-adjustable-tail-for-articles according to claim 1, wherein the light-with-adjustable-tail-for-articles is not configured to pull any load of one hundred (100) pounds or more.

22. The light-with-adjustable-tail-for-articles according to claim 1, wherein the given article is selected from: a hand tool, a marking implement, a pencil, a pen, a marker, a nail clipper, a lid of a nail polish container, an eyelash curler, a spray bottle, a cutting implement, scissors, shears, pliers, a screwdriver, a chisel, a wrench, a saw, a power tool, a drill, eyeglasses, sunglasses, a hat, a vehicle, a bicycle, a scooter, a door knob, a door handle, animal tack, an animal collar, an animal harness, a hand held mirror, a makeup compact case, or a wallet.

* * * * *